US005724413A

United States Patent [19]
Suffern et al.

[11] Patent Number: 5,724,413
[45] Date of Patent: *Mar. 3, 1998

[54] HOST COMPUTER DIGITAL SIGNAL PROCESSING SYSTEM FOR COMMUNICATING OVER VOICE-GRADE TELEPHONE CHANNELS

[75] Inventors: Robert C. Suffern, Chicago, Ill.; Andrew L. Norrell, Nevada City, Calif.

[73] Assignee: U.S. Robotics, Inc., Skokie, Ill.

[*] Notice: The term of this patent shall not extend beyond the expiration date of Pat. No. 5,646,983.

[21] Appl. No.: 466,079

[22] Filed: Jun. 6, 1995

Related U.S. Application Data

[63] Continuation of Ser. No. 37,075, Mar. 25, 1993.

[51] Int. Cl.[6] .................................................. H04M 11/00
[52] U.S. Cl. ............................ 379/98; 379/90; 379/93; 375/222
[58] Field of Search ........................... 379/93, 94, 96, 379/97, 98, 100; 375/222

[56] References Cited

U.S. PATENT DOCUMENTS

| | | | |
|---|---|---|---|
| 4,085,449 | 4/1978 | Walsh et al. | 375/222 |
| 4,455,661 | 6/1984 | Qureshi | 378/8 |
| 4,518,823 | 5/1985 | Kessler | 179/2 |
| 4,646,320 | 2/1987 | Krishnan | 375/8 |
| 4,680,773 | 7/1987 | Amundson | 375/8 |
| 4,700,358 | 10/1987 | Duncanson et al. | 375/8 |
| 4,890,136 | 12/1989 | Walsh et al. | 375/222 |
| 4,965,641 | 10/1990 | Blackwell et al. | 375/7 |
| 5,008,901 | 4/1991 | Wallach et al. | 375/222 |
| 5,170,470 | 12/1992 | Pindar et al. | 375/222 |
| 5,175,633 | 12/1992 | Saito et al. | 375/222 |
| 5,283,638 | 2/1994 | Engberg et al. | 379/93 |
| 5,359,709 | 10/1994 | Blanc et al. | 375/222 |
| 5,365,545 | 11/1994 | Blackwell et al. | 375/8 |

OTHER PUBLICATIONS

CCITT Recommendation T.4 on "Standardization of Group 3 Facsimile Apparatus for Document Transmission." The Theory and Practice Modem Design, by John A.C. Bingham, pp. 1660167, 226–231, and 282–286, (1988).

Primary Examiner—Curtis Kuntz
Assistant Examiner—Stephen Palan
Attorney, Agent, or Firm—McDonnell Boehnen Hulbert & Berghoff

[57] ABSTRACT

A conventional computer is coupled to an analog telephone transmission link by an analog/digital conversion interface adapter. Modem transmission is accomplished by performing the modulation and demodulation functions digitally in the computer's existing processor which executes programs which transfer data between the computer's memory and the interface adapter. Using the same interface adapter and existing processor, the arrangement may be used to send and receive images in the form of standard V.29 format facsimile data, to send and receive data operating as a synchronous IBM 3270 compatible terminal device, or to record and play back conventional voice transmissions rather than data to implement a telephone answering, voice message handling, and telemarketing systems.

14 Claims, 3 Drawing Sheets

5,724,413

HOST COMPUTER DIGITAL SIGNAL PROCESSING SYSTEM FOR COMMUNICATING OVER VOICE-GRADE TELEPHONE CHANNELS

This is a continuation of application Ser. No. 08/037,075, filed Mar. 25, 1993.

COPYRIGHT NOTICE

A portion of the disclosure of this patent document contains material which is subject of copyright protection. The copyright owner has no objection to the facsimile reproduction by anyone of the patent document or the Patent and Trademark Office patent file or records, but otherwise rescues all copyright rights whatsoever. Copyright 1993 U.S. Robotics, Inc.

FIELD OF THE INVENTION

This invention relates to electronic communications systems and more particularly to a system for enabling a computer to transmit and receive information over an analog communications link.

BACKGROUND OF THE INVENTION

Computers typically use modems to communicate digital information over voice-grade telephone lines. Such modems translate digitally expressed information from the computer into analog tone signals suitable for transmission over the voice-grade telephone facility, and convert such tones back into digital form when received from the telephone line.

High speed modems may advantageously employ digital signal processing techniques for translating outgoing digital data into a sequence of digital values each representing a desired analog output signal sample amplitude. These digital sample values may then be converted into analog form by a digital-to-analog converter for transmission over the telephone facility. Correspondingly, at the receiving station, the incoming analog signal may be converted into a train of digital sample amplitude values which are then processed to reconstruct the original digital data.

The processing of the digital sample values is complex and has heretofor been accomplished by one or more dedicated microprocessors which form the heart of the digital modem. For example, the 9600 baud HST modem manufactured by U.S. Robotics Corporation and described in U.S. Pat. No. 5,008,901 issued on Apr. 16, 1991 employs three microprocessors: (1) a transmitting microprocessor dedicated primarily to the translation of digital data into digital sample values; (2) a receiving microprocessor devoted primarily to the translation of sample amplitude values back into digital data; and (3) a supervisory microprocessor which serves as the interface to the computer to which the modem is connected.

SUMMARY OF THE INVENTION

The present invention, like the digital modems described above, employs, analog/digital conversion methods to convert received analog signals into digitally expressed analog sample values and, during transmission, to convert digitally expressed sample values into analog form. Unlike prior digital modems, however, in the present invention the digital sample value signals are not processed by a separate processor or processors within the modem unit, but are rather processed by the microprocessor already present in the connected computer. As a consequence, the cost of the modem is substantially reduced because the need for separate processors is eliminated.

The arrangement contemplated by the invention is implemented by the combination of a conventional host computer employing a microprocessor and a low-cost interface unit consisting of telephone line adaptor circuitry, an analog/digital converter, and a direct digital interface to the host computer's system I/O bus. The telephone interface unit exchanges digitally-expressed analog sample amplitude values directly with the connected host computer, and the microprocessor within the host computer handles the remainder of the digital processing.

When operating as a modem, digital data can be processed into a sequence of digitally expressed sample values in accordance with a selected one of several accepted modem formats and transmission speeds. Given processors of speeds typically available, such modem processing can take place in real time to eliminate the need for storing the digital sample data in memory; for example, using the preferred embodiment of the invention to be described, a relatively slow Intel 80286 (IBM-AT class) processor operating at 12 mhertz has been shown to have adequate computational capability to perform the modulation and demodulation processing needed for 2400 baud full-duplex modem operation.

Without requiring any additional hardware, the system may be programmed to send and receive graphical data as standard V.29 format facsimile data, or to send and receive data synchronously operating, for example, as an IBM 3270 compatible terminal device. Moreover, when the digital sample values represent conventional voice transmissions rather than data, the system may be used to provide automated voice recording and playback functions to implement a telephone answering, voice message handling, and telemarketing systems.

These and other functions may be added or revised without requiring any hardware modifications by simply changing standard programs which execute on the host processor in standard ways.

These and other features and advantages of the present invention will become more apparent by considering the following detailed description of a preferred embodiment of the invention. In the course of this description, reference will frequently be made to the attached drawings.

DETAILED DESCRIPTION

Figure 1:
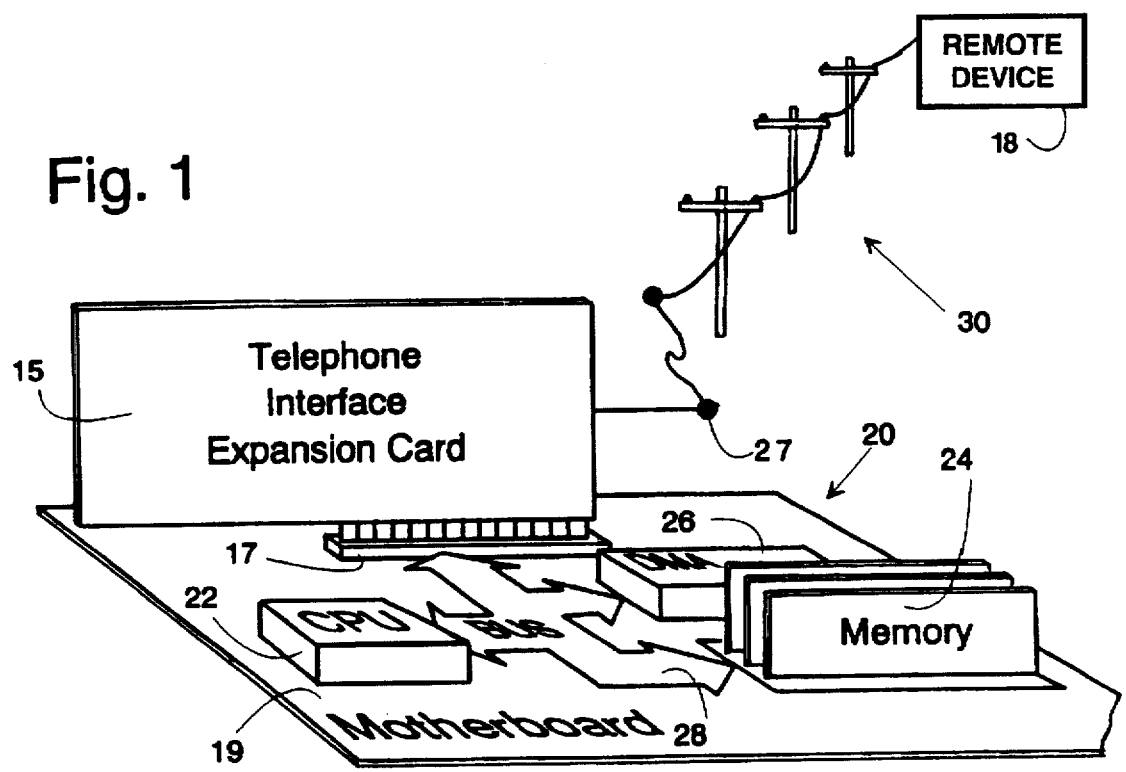
FIG. 1 illustrates the major hardware components of the preferred embodiment of the invention.

The preferred embodiment of the invention as illustrated in FIG. 1 consists of auxiliary components mounted on an expansion card 15 which plugs into an available socket 17 on the motherboard 19 of a conventional IBM-compatible Personal Computer indicated generally at 20. The host computer 20 includes a conventional single-chip integrated microprocessor 22 which executes programs stored in a RAM memory unit which is depicted in FIG. 1 as a group of SIMM (single inline memory module) devices 24 mounted on the motherboard 19. The RAM memory 24 is typically loaded with programs to be executed by the microprocessor 22 from their permanent storage location on a magnetic disk drive (not shown). The programs described which will be described below in connection with this preferred embodiment of the invention are executable on any IBM-compatible personal computer using the MS-DOS operating system. In order to provide adequate computational capacity, the microprocessor 22 is preferably be selected from the Intel 80286, Intel386 or Intel486 families of processors, or their functional equivalents, and should operate at a clock rate of at least 12 megahertz. In the description to follow, reference will also be made to the host computer's standard DMA (direct memory access) controller seen at 26 in FIG. 1. The host computer 20 includes an internal system bus 28 which interconnects the microprocessor 22, the random access memory 24, the DMA controller 26 and the expansion card 15 via the expansion socket 17.

Figure 2:
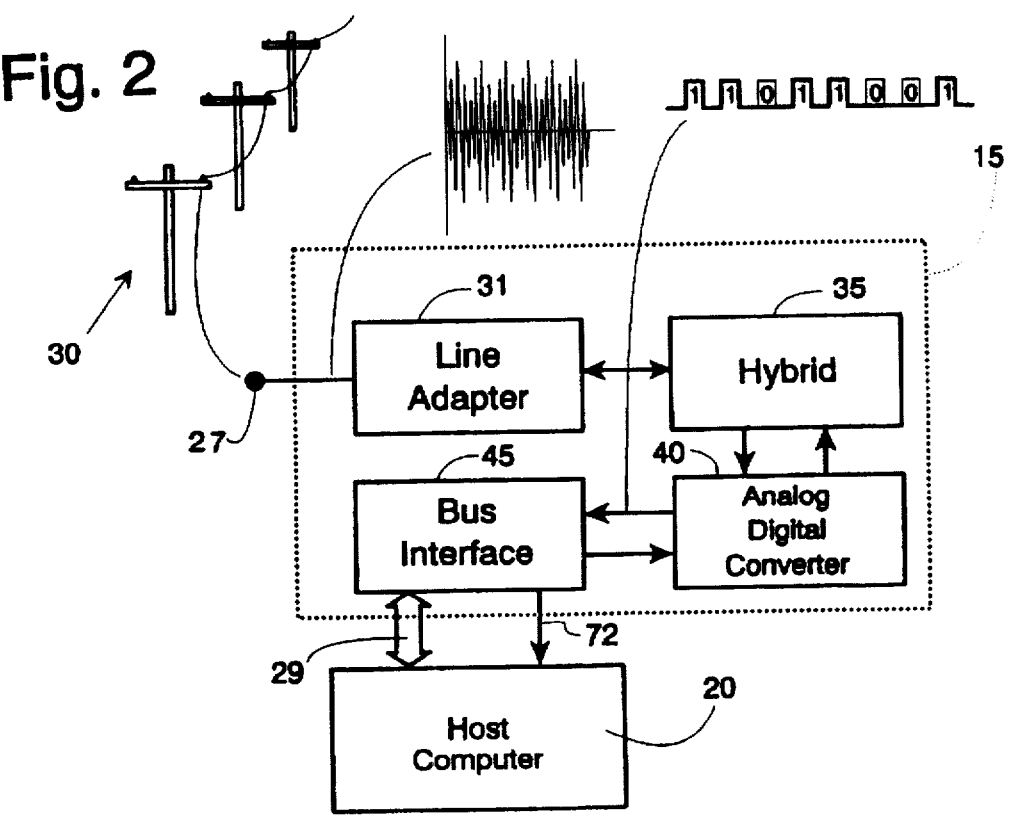
FIG. 2 is a block diagram of the major components of the interface card.

As seen in both FIGS. 1 and 2, the auxiliary or expansion card 15 is provided with a standard telephone jack 27 through which a connection is made to a conventional voice-grade analog communication link, also referred to as a telephone line or telephone line 30, which may be connected, in turn, to a remote device 18, such as a remote modem or a facsimile transmission device, with which the host computer 20 communicates. The major components included on the interface card 15 are seen FIG. 2. The card 15 takes the form of a standard "half-size adapter card" which plugs into an available expansion slot 17 on the host computer 20 to connect to the host computer's internal bus Detailed information on the structure and operation of the interface bus 28, as well as other aspects of the personal computer system 20, maybe found in the applicable *IBM Technical Reference Manual*, IBM Corporation, Boca Raton, Fla. 33432. Details concerning the Intel family of microprocessors and their companion DMA controllers appears in the *Intel Microprocessor and Peripheral Handbook* (1990), Intel Corporation, Santa Clara, Calif.

The interface card sends and receives analog signals over a voice-grade analog telephone line which is connected at the terminal 27. Two standard RJ11 telephone jacks (not show) may be used to provide convenient external connections to standard telephone equipment, one jack accepting a plug from the telephone line and the second a plug from a telephone station set which may share use of the line.

As seen in FIG. 2, the interface card includes a line adaptor circuit 31 which interconnects the telephone terminal 27 with a hybrid circuit 35 which splits the analog voice-band signal into inbound and outbound components which are respectively sent to and received from the analog ports of an analog/digital converter 40 (also called the "AIC" or "analog interface chip"). Converter 40 samples received voice-band signals, encodes the sample amplitudes into digitally-expressed values, and sends these values via bus interface circuitry seen at 45 in FIG. 2 to the host computer 20. As described in more detail below, the conventional processor within the host computer 20 processes incoming digitally-expressed sample values to perform one of a variety of functions, depending on the nature of the incoming signal.

Outbound communications originate within the host computer 20 which processes the information to be sent to create a sequence of digitally-expressed sample amplitude values which are sent via the interface circuitry to the converter 40 which transforms the digital sample values into the corresponding voice band analog signal which is applied via the hybrid circuit 35 and the line adapter 31 to the telephone line connected to terminal 27.

SIGNAL RECEPTION

Figure 3:
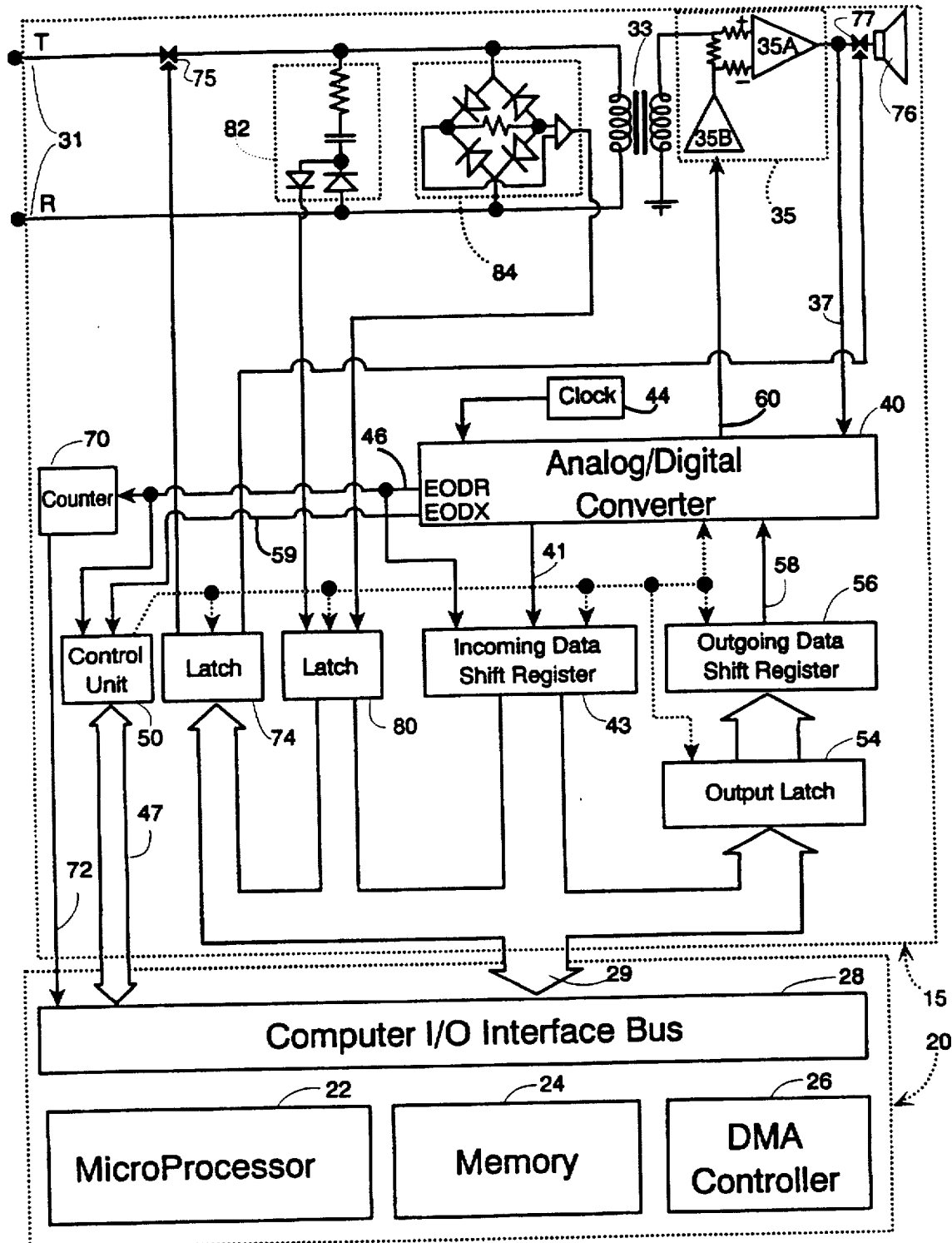
FIG. 3 is a detailed block diagram of the interface card.

The processing of the incoming voice-grade signal in the interface card is shown in more detail in FIG. 3. The incoming voice-band signal arriving at line adaptor terminals 31 seen in FIG. 3 may be a conventional telephone voice signal, a modulated-tone data signal from a modem, a facsimile signal, or some other signal capable of being transmitted over conventional telephone links. See also FIG. 1. Regardless of their content, incoming and outgoing signals are processed in the same way by the interface card 15.

Arriving signals from the telephone link are applied directly via a transformer 33 to the input of an amplifier 35A within a hybrid network 35. The signal appearing at the output of amplifier 35A is applied to the analog input terminal 37 of a two-way analog/digital converter 40. The hybrid network 35 is of conventional design and includes a transmit amplifier 35B which is interconnected with the input to amplifier 35A by means of a resistive network which is arranged such that the transmitted signal from amplifier 35B is greatly reduced in magnitude at the output of the receiving amplifier 35A.

The converter 40 preferably takes the form of a single integrated circuit device comprising a Model TLC32044 voice band analog interface unit manufactured by Texas Instruments, Dallas, Tex.. Detailed information on the structure and operation of the TLC32044 is contained in Data Sheet D3098 (1988) available from Texas Instruments. The TLC32044 integrates an input analog bandpass filter, an analog-to-digital converter including a sample-and-hold circuit and a successive-approximation encoder which converts the input analog signal on line 37 into a 14-bit resolution digital signal. For processing outbound signals, the TLC32044 includes a 14-bit resolution digital-to-analog converter and a low-pass output reconstruction filter.

The incoming analog signal is applied via line 37 seen in FIG. 3 to the converter 40 and the resulting digitally-expressed sample values are delivered via a bit-serial line 41 into an incoming-data shift register 43. When the converter 40 completes the encoding of a sample of the incoming telephone signal, the shift register 43 holds a 16-bit binary word whose 14 most significant bits specify the amplitude of a sample. The value accumulated in shift register 43 is then transmitted via a data bus 29 to the data port pins of the computer's interface bus 28 during a DMA memory transfer operation as next described.

The analog/digital converter 40 is timed by a clock signal from a clock generator 44 seen in FIG. 3. When the converter has delivered the last (least significant) bit via its bit-serial output 41, an EODR (end of data received) output 46 from converter 40 activated to inform a control unit 50 that the data in the incoming shift register 43 is ready for transmission. Control unit 50 then issues a direct memory access request signal which is transmitted to the interface bus 28 via a control line in the group of control lines depicted in FIG. 1 at 47.

The interface card 15 preferably makes use of two separate DMA channels which are available in IBM-compatible Personal Computers for use by external devices. The receive channel, which moves incoming information via the shift register 43, is activated by a request to DMA channel 6 (DREQ6 at pin D13 on the standard IBM system bus 28). The DMA controller 26 within the personal computer 20 responds with a DMA acknowledge signal which is returned to the control unit 50 via one of the control lines 47 (connected to receive the signal DACK6 at pin D12 on the system bus 28). The control unit 50 responds to the DMA acknowledgement by gating the information from shift register 43 to the computer interface bus 28 via the data bus lines 29.

SIGNAL TRANSMISSION

The analog output signal to be transmitted over the phone line is generated by the analog/digital converter 40 which receives digital words each comprising a 14-bit sample amplitude value and two control bits, from the I/O interface bus 28 via the bus lines 29, an output latch register 54, and an outgoing-data shift register 56. The latch register 54 holds one digital sample while the sample previously received from the bus 28 is being sent, one bit at a time, from the shift register 56 to the analog/digital converter 40 via the bit-serial line 58.

The transfer of information between the bus 28 and the output latch register 54 is also accomplished by means of a DMA transfer. In this case, when the analog/digital converter completes the conversion of a word from the shift register 56, it issue an EODX (end of data transmit) signal on line 59 to the control unit 50 which in turn issues a transfer request to DMA channel 5 by activating one of the lines in the control bus 47 (signal DKEQ5 applied to pin D11 of the interface slot to bus 28). The DMA controller 26 acknowledges that it is ready to handle the request by activating another of the control lines 47 (signal DACK5 at pin D10 of the interface slot). The control unit responds by transferring the contents of output latch 54 into shift register 56, and by enabling the output latch 54 to receive the data from interface bus 28 via the data bus 29.

The bit-serial data applied to converter 40 via line 58 is converted into an analog signal appearing at analog output 60 of the converter 40. The analog output signal on line 60 is then transmitted by the hybrid amplifier 35B and the transformer 33 to the tip and ring terminals 31 of the connected telephone line.

SUPERVISORY CONTROL

The microprocessor 22 within the personal computer 20 is directly connected via the interface bus 28 to the interface card 15 and provides general supervisory control over its operation. To accomplish this, the EODR signal on output 46 (one of which appears each time the translation of an incoming analog sample is completed) is applied to increment a 4-stage counter 70 which issues an output interrupt signal on line 72 for each group of 16 incoming words. The interrupt signal on line 72 is applied to a selected one of the available interrupt request lines on the interface bus 28 (the particular line IRQ3 to IRQ7 at interface slot pins B21–B25 may be jumper-selected at the time of installation to avoid conflicts with other peripherals issuing interrupts).

When data is being sent or received over the telephone line 30, control of the execution of microprocessor 22 is passed to an interrupt handling routine resident in the memory 24. This single routine, the details of which are set forth in the accompanying assembly language listing for the INTS module, calls routines for handling both transmission and reception in accordance with the currently selected mode of operation. These interrupt handling routines process incoming data words from incoming data shift register 43 as those incoming words are assembled in a RAM storage area by the DMA transfer mechanism described above.

Secondly, the interrupt handling routines process outgoing information, assemble the outgoing data words indicative of analog sample amplitudes in a RAM storage area pending the DMA transfers to the output latch 54. Note that the single interrupt from line 72, issued on every 16th received word, triggers the handling of the received data being accumulated in the DMA buffer as well as the assembly, in the transmit DMA buffer, of the outgoing data to be converted into analog sample values.

In addition, the microprocessor has access at any time to information about the status of the telephone line, and may send control commands to the control unit 50 to control that unit's operation. The control lines 47 which exchange control information between the control unit 50 and the interface bus 28 include address lines (at interface slot pins A22–A29 to bus 28) which must contain a particular pattern of bits (in the range 35C to 35F, hexadecimal) designating information to or from the interface unit. When the 20 appropriate address is detected, data from the interface port is placed in the board control latch register 74 to control the line. One bit position of latch 74 may be advantageously used to control an electronic off-hook switch seen at 75 in FIG. 3 (which is closed or placed "off hook" to connect the interface unit to the telephone line). A second bit position in the control latch register 74 may be used to connect a speaker 76 to the output of the amplifier 35A by activating a switch 77. A third bit position may be used to reset the AIC 40.

Correspondingly, a sense latch register 80 includes bit positions which are set by the status of the telephone line. A first bit is set whenever a ringing signal detector 82 connected across the telephone line terminals 31 detects the presence of ringing signals of a predetermined amplitude. A loop current signal detector seen at 84 sets a second bit whenever loop current exceeding a predetermined value is present, indicating an active connection to another system. These status signals may be obtained at any time by a programmed inquiry which places the appropriate I/O address on the address leads within control bus 47.

PROGRAMMING OVERVIEW

In the preferred embodiment of the invention, all digital processing of the digitally-expressed analog sample values which are supplied by and delivered to the interface card 15 are processed by the microprocessor in the host computer. Similarly, the digital information which specifies the telephone line status, as well as control information which takes the telephone line on and off hook, is handled by the host microprocessor. As a consequence, substantially any communication and communication control function using a voice-band channel maybe implemented with the hardware disclosed above (and nothing more) by providing appropriate programming for the host computer 20.

The program listing presented at the conclusion of this specification provides numerous functions which allow the combination of the host computer and the interface card to support a rich assortment of voice and data communications applications. The listed source programs are written in conventional assembly language and may be assembled, linked and executed on any IBM-compatible Personal Computer which has sufficient operating speed and which is equipped with the expansion card described above. The assembly language which defines the program and data structures needed to implement the illustrative embodiment is divided into 12 separately listed modules which are summarized below and depicted in FIG. 4 of the drawings:

MAIN.ASM

Figure 4:
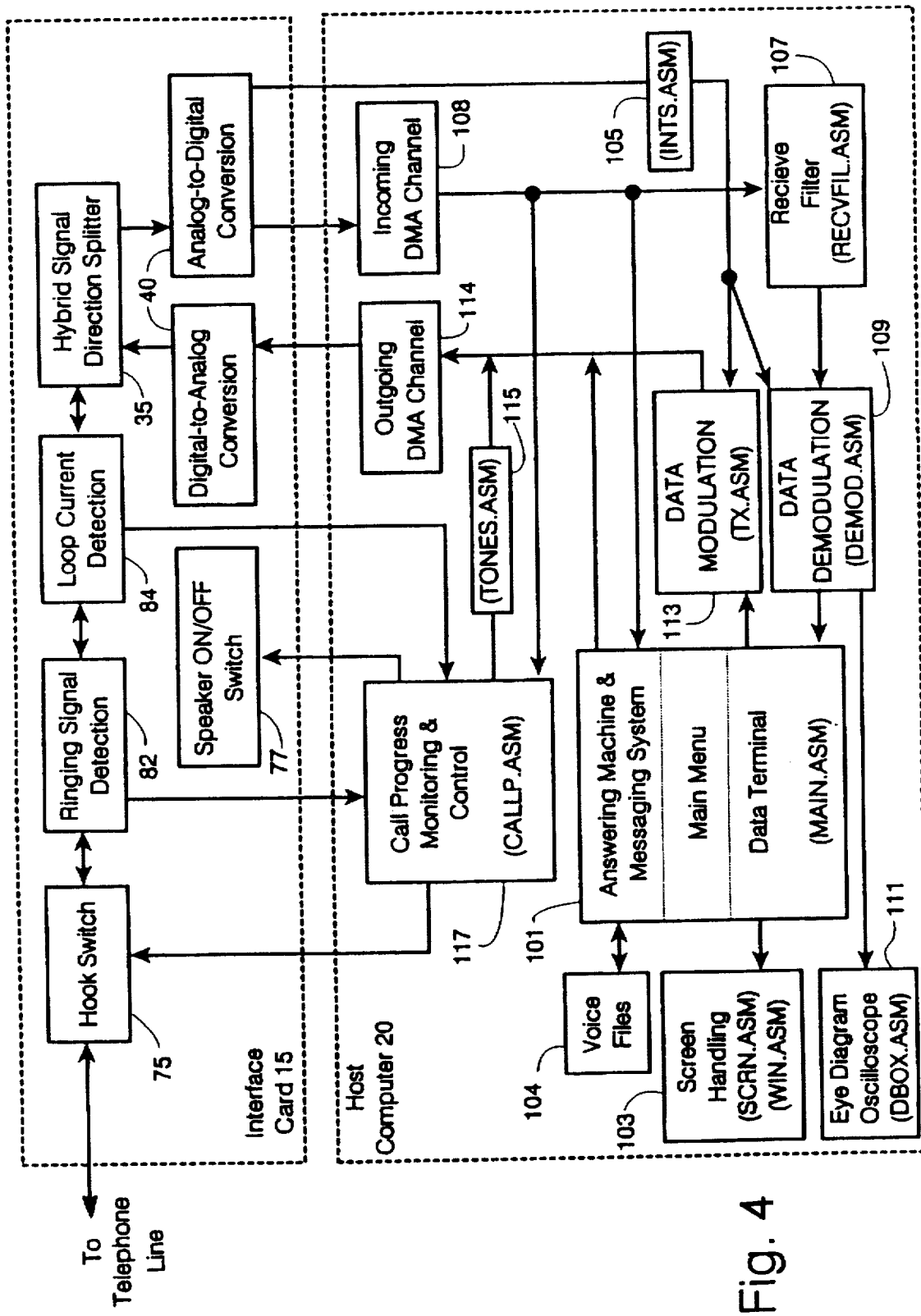
FIG. 4 is a functional block diagram illustrating the interaction of the major functions implemented by the host processor under program control.

The MAIN.ASM module seen at 101 in FIG. 4 initializes the interface card hardware and the screen, transmit and receive buffers in the host computer's RAM memory. It displays the main menu by calling the screen handling routines in SCRN.ASM and WIN.ASM as seen at 103 and decodes any user keystrokes which control the system's operation. In addition, it provides routines capable of answering the phone, recording and playing back voice messages to and from standard DOS disk files as indicated at 104, as well as routines that manage the system when it is operating as a data terminal when keystroke data are directly transmitted and received (via modem processing) over the telephone link.

INTS.ASM

This module indicated at 105 handles the interrupts generated by the interface card each time 16 incoming digital samples have been accumulated in the host computers RAM memory by prior DMA transfers as determined by the counter 70 seen in FIG. 3. The interrupt handler calls routines for handling data transmission and reception. In addition, INT.ASM responds to telephone ringing signals generated by detector 82 and line current indications from loop current detector 84 on the interface card 15 as seen in FIGS. 3 and 4.

RECVFIL.ASM

This module, seen at 107 in FIG. 4, contains the filtering routines used to pre-process the incoming analog signal samples which are received via the incoming DMA channel seen at 108 in FIG. 4. When the system is operating as a 1200/2400 baud modem, the RECVFIL.ASM routines 107 process the accumulated digitally expressed sample values from the interface card and performs band-splitting and phase-splitting digital filtering to create filtered samples for demodulation, as well as automatic gain control and baud rate synchronization.

DEMOD.ASM

This module, shown at 109 in FIG. 4, demodulates the filtered sample value from RECVFIL.ASM into data.

DBOX.ASM

The DBOX.ASM module at 111 provides routines which allow the host computer's screen to provide an oscilloscope-like eye-diagram display useful for monitoring the performance of the system during modem data reception.

TX.ASM

This module, seen at 113, modulates digital data to be transmitted into sample amplitudes which are placed into the transmit buffer from which they are moved via the outgoing DMA channel seen at 114 to the interface card for digital-to-analog conversion into a voice-band analog modem output signal which is transmitted over the phone line. TX.ASM also provides digital filtering to confine the transmitted analog signal to its assigned passband.

TONES.ASM

This module, indicated at 115, generates touch-tones and answer tones used by the system to perform conventional dial-up telephone signalling.

CALLP.ASM
The call progress monitoring and control module seen at 117 provides supervisory control of the telephone link. It performs band-pass filtering of the receive samples from the interface card in order to detect ringing signals, answer tones, and touch-tone signals, and uses the tone generating routines in TONES.ASM at 115 to produce comparable outgoing tones.

WIN.ASM

This module, indicated at 103 along with SCRN.ASM, manages the pop-up windows which appear on the host computer's screen as part of the user interface. This module employs pre-generated character definitions which are specified in the separately listed include file SFT_WINS.INC.

SCRN.ASM

This module provides screen management routines used when the system is operating in terminal mode.

EQUATES

This module defines commonly used numbers and keycodes referred to in the other modules.

The MAIN.ASH module initializes the system and provides the primary user interface. In the discussion of MAIN.ASM and the other modules which follows, unless otherwise noted, the routines being discussed will be identified by their labels and may be found within the listing for the particular module being described.

When the system is started (typically by the entry of the program's name at the operating system's standard command prompt), it is loaded for execution from disk, and execution begins at the label SOFT_MODEM. The amount of memory allocated to the program is reduced to the size of the program plus the size of the stack, and the routine ALLOCATE_BUFFERS is used to create 8k (16-bit word) memory buffers for the both the transmitted and received sample amplitude values. The video display is then initialized and the routines INIT_AIC and INIT_DMA are called to initialize the TLC32044 analog interface circuit 40 on the interface card 15, and to initialize both the transmit and receive DMA channels. A call is then made to the routine WEDGE_INT (listed in INT.ASM) which hooks into the COM2 interrupt (reconfigurable as COM1 through COM4).

A check is then made to determine if the user supplied the name of a voice-recording file to be played back along with the program name when the program was called at the DOS command line. If so, the routine PLAYBACK_MSG (to be discussed) is called immediately, with control thereafter being passed to MAIN_EXIT to terminate the program. In this way, the program can be loaded to play back a recorded voice message without invoking any other functions.

If no recorded message file was specified, ON_HOOK and SPEAKER_OFF are called to insure that hook switch 75 and speaker switch 77 on interface card 15 are both open, and the routine MAIN_SCREEN is begun. The routine INIT_SCREEN (in WIN.ASM) clears the screen and pops up a window for the main menu. The routine at GET_KEY monitors keyboard input and incoming ringing signals.

If ringing signals are detected, the routine ANSWERING_MACHINE is called to take the telephone line off-hook and then call the routine PLAYBACK_MSG to play back a pre-recorded voice message. The routine PLAYBACK_MSG moves the contents of a disk file, which is a sequential file of digitally-expressed voice sample amplitudes, into the transmit buffer, with each transfer being followed by a call to TX_DMA_ON which enables a DMA transfer of the transmit buffer's contents for digital-to-analog conversion by the interface card 15. To conserve disk space, the file of digitally-expressed voice samples may be compressed prior to storage and decompressed prior to playback. After the recorded voice message is played for the caller, SEND_TONES (in TONES.ASM) sends a prompting tone to advise the caller that recording is starting.

The ANSWERING_MACHINE routine then calls RECORD_MSG to record the incoming message. A DOS file is opened to record the message, the routine INIT_AIC is called to ready the analog interface circuit 40 to receive at 9600 samples/second, and the incoming samples from the interface board are moved by DMA transfer to the receive buffer from which they are recorded on disk, in 4 kilobyte blocks, in a standard DOS file.

MAIN MENU FUNCTIONS

The routine in MAIN.ASM beginning at MENU_COMMAND processes user keystrokes to invoke functions selected by the user from the following available options which demonstrate the system's capabilities:

| KEY | OPERATION |
|---|---|
| F1 | Go to data mode by calling ORIGINATE_MODE_INIT followed by COMM_MODE, which takes keystrokes entered by the user and sends them to the transmitter (to be discussed), and looks for characters from the receiver and puts them on the screen. When operating in terminal mode, the user can press the F2 key to enter the display box mode by calling INIT_DBOX (in DBOX.ASM) in which case the received characters are buffered and keystrokes are processed through the display box menu. |
| F2 | Record voice off the telephone line by calling RECORD_MSG discussed above. |
| F3 | Play back a recorded voice message by calling PLAYBACK_MSG discussed above. |
| F4 | Send an answer tone over the phone line by calling SEND_TONES (listed in TONES.ASM) as discussed above. |
| F5 | Perform ORIGINATE_MODE by dialing a phone number (using DIAL in TONES.ASM) and, if answered, attempts to establish a modem link (using CALLP_MAIN in CALLP.ASM which initiates the expansion card and enables the receiving DMA transfers) in 1200 baud originate mode (by calling INIT_RECV in DEMOD.ASM) and then calls COMM_MODE to perform communications with the remote modem. |
| F6 | Execute call progress functions by calling CALLP_MAIN (listed in CALLP.ASM). |
| F7 | Execute tone detection by calling TOUCH_TONE_DETECT (listed in CALLP.ASM). |
| F8 | Execute automated voice message handling by calling MESSAGING_SYSTEM. This routine uses DTMF (listed in TONES.ASM) to produce the dual dial tones for each digit to be dialed in a number taken from a list of numbers to be dialed. MESSAGING_SYSTEM plays back a message asking the person who answers the remote phone to press the touchtone "1" key on their stationset, then waits to accept the response, at which time MESSAGING_SYSTEM plays back a prompting message and then records the called party's response using PLAYBACK_MSG and RECORD_MSG, and then terminates the conversation by calling ON_HOOK. |
| Alt-H | Toggle between on/hook and off/hook using CHK_ON_OFF_HOOK. |
| Alt-S | Toggle the speaker between on and off conditions using CHK_SPKR. |
| Alt-P | Change parity by calling NEW_PARITY. |
| Alt-A | Toggle answering machine enabled/disabled states using CHK_ANSWER_MODE. |
| F10 | Exit the program and return control to DOS after calling DISABLE_INT (listed in INTS.ASM) to restore the original COM2 interrupt vector and disabling DMA transmission and reception. |

SCREEN HANDLING ROUTINES

As seen in the listing WIN.ASM, the routine FILL_SCREEN fills the screen with a background color, WINDOW_UP moves a previously stored window image from a screen buffer to the active screen, and WINDOW_FLIP swaps the active screen memory with the contents of a screen buffer.

The screen is initialized for the terminal mode by a call to INIT_COMM_SCREEN (listed in SCRN.ASM) which is called when data mode is entered. This routine paints the screen blue by calling INIT_SCREEN (in WIN.ASM), which in turn calls WINDOW_UP, brings up data mode windows which indicate speed and parity, and then saves the written screen to a screen buffer for later use.

SCREEN_OUT (listed in SCRN.ASM) performs the terminal mode functions. After checking for special characters, received characters are displayed on the screen. Special characters are the line feed, carriage return and backspace characters, which are handled by the appropriate display-point repositioning functions. If the cursor is on the last line of the screen, a line feed or carriage return character causes the screen lines to scroll upwards. The routine PRINT_PARITY listed in SCRN.ASM is called to place the currently active parity and word length indications on the screen.

The display box mode is entered by calling INIT_DBOX listed in DBOX.ASM. INIT_DBOX calls routines which draw an oscilloscope face on the screen along with a menu of display box options (DBOX_MENU) and initializes the video controller to enable modification of all video planes. The display box may have up to eight points on the screen (POINT0–POINT7) each of which is defined by a data structure of type SCOPE_POINT. The routine PLOT_POINT places yellow dots on the screen using the publicly declared horizontal and vertical coordinates X and Y. Each dot displayed consists of three lines of dots. RESTORE_OLD removes the yellow pixels and replaces them with either light gray, dark gray or blue, depending on whether the pixel is positioned on the blue background of a reference line. DO_COLOR reads the old point out of the data structure and is called three times, once for each color. SAVE_COLOR saves the bits is also performed once for each color and saves the bits where the new dots will go. GET_COLOR reads the video RAM and checks for an intersection between a new oscilloscope dot and the desired color. The eye diagram of the incoming signal is produced by the demodulation routine DEMOD in DEMOD.ASM which, at the label DISPLAY_BOX, sets the variables X and Y and calls PLOT_POINT.

CALL PROGRESS MONITORING

The routines for monitoring and controlling the telephone circuit connected to the interface card 15 are listed in CALLP.ASM which begins by defining various coefficients and delay line values used by the call progress filters.

The routine CALLP_FILTERS executes a filtering algorithm for each input sample value in the received sample buffer, and calculates a mean square output level value for each filter. As indicated by the comment lines in the assembly language listing, the DC component is first removed from the sample value, and the input sample is then processed by the ANSWER_TONE_FILTER routine, at the end of which a check is made to determine if the system is currently waiting for the answer tone to end (which occurs during the originate mode training sequence to be described). The voice filtering algorithm may then performed to obtain a means square voice level indication (in the CALLP.ASM listing, the voice filter algorithm has been commented out to reduce runtime, but is retained here for illustration). Next, the call progress filtering routine is performed to detect dial tones, busy tones, and ringing signals. The mean square level (power level) output from each filter is transferred into a holding location for CALLP_MAIN to test later whenever SAMPLE_COUNT is decremented to zero.

The DTMF_FILTERS algorithm performs basically the same function as the call progress filters described above, except that the dual tones are written. In this illustrative embodiment, a filter for the touch-tones for "1" only are present, and the detection of a received "1" tone is used in the example voice message handling system implemented by the routine MESSAGING_SYSTEM (in MAIN.ASM) described above. The routine GET_TOUCH_TONE detects the "1" touch tone and waits for it to terminate.

The call progress system is initialized by CALLP_INIT which initializes the analog interface circuit 40 and the input counters. The mean square outputs are inspected every 256 sample times (35.5 millisecond intervals) to simplify division of the mean square values.

CALLP_MAIN performs the DMA initialization and waits for 256 samples to be received and the filter outputs to be computed. It then tests the mean square values to determine if an answer tone has a sufficient magnitude (at least 4000 H and also greater than ¼ of the total energy on the line), and that such a tone has been present for a predetermined duration. CALLP_MAIN also calls PRINT_CALLP which displays the mean square filter output levels (useful for testing and debugging). The routines TOUCH_TONE_DETECT and PRINT_DTMF are similarly available to indicate the receive levels coming through the DTMF filters for testing purposes.

The routine GET_END_ATONE is called after a valid answer tone has been detected. It resets the call progress counters to 4.44 milliseconds in order to detect the end of an answer tone more quickly This routine also enables the transmitter DMA to start the 1200 bps transmitter as part of the training sequence leading to 2400 baud transmission. The routine then waits for the remote location to terminate the answer tone, which triggers the beginning of the 1200 bps receiver function. As soon as the end of the answer tone is detected, the AIC is set to receive at 9600 samples per second.

RECEIVER FILTERING, AGC AND INTERPOLATION

The digitally expressed incoming analog sample amplitudes are processed by the microprocessor 22 in the host computer system 20 to filter the desired received signals from other signals outside its passband, to split the incoming signal into its two phase-shifted quadrature components, to regulate the signal level of the incoming signal by means of automatic gain control processing, and to compensate for variations in the baud rate of the incoming data by an interpolation procedure. All of these steps, which occur prior to demodulation, are handled by the module listed in RECVFIL.ASM.

Filtering consists of running the samples through either a high or low bandpass filter to reject the modem's local transmitter. Phase splitting reduces the samples to two sets of complex numbers (real and imaginary) for each baud time of samples (the baud rate being 600 per second), resulting in 1200 complex numbers per second.

The phase splitting occurs at FILTER_PQ in RECVFIL.ASM. FILTER_PQ is a two stage filter specifically designed to reduce the number of multiplication's and thus reduce execution time. Because of the computational burden placed on the host computer's processor when filtering and demodulating the incoming analog samples, it is essential that efficient algorithms be employed if processors which are in widespread use are to be capable of handling the high baud rates employed by conventional modems now in use. The efficiency of the FILTER_PQ routine, when combined with the efficient demodulation scheme to be described, has been shown to be capable of receiving and demodulating a conventional V.22bis, 2400 baud modem transmissions when executed by a conventional IBM-AT class Personal Computer employing an Intel 80286 microprocessor operating at 12 Mhz.

As can be seen at the label FILTER_LOOP, the Cosine and Sine variables are either zero or plus or minus ¼. These values reduce the number of multiplication's and improve operation speed. LOW_STAGE1 and HI_STAGE1 do the pass-band to base-band conversion (4800 and 9600 sample rate conversion down to 2400 samples per second). LOW_STAGE1 performs the front end filtering of the receive low band samples. 4800 samples per second are reduced to 2400 by reading in a single sample and skipping the second because the second Cosine is zero for a total of two samples per loop. HI_STAGE1 reads in the 9600 samples a total of two times, skipping every other one (4 samples per loop) thus reducing the number of samples to 2400. Next the output of the first stage is sent through STAGE2 to be filtered.

At REAL_DONE, the output value of this routine is divided by 128 or 16 depending on the AGC reaction speed (AGC computed over 16 or 128 samples) and then the absolute value is added to the AGC sum. Each output is then AGCed to bring it up to the correct level.

The same samples are then processed in the same way by the imaginary filter, DO IMAGINARY. At IMAG_DONE, the imaginary number is added to the AGC sum variable and the multiplication is performed to yield the automatic gain controlled output value. At this point, one quarter baud times worth of samples (one 2400th of a second) have been computed, and the process proceeds by reducing the sample rate to 1200 through the interpolator. Because two or four samples per loop are being handled, the routine is optimized to reduce the number of delay line shifts needed.

The INTERPOLATOR_ROUTINES perform the baud loop timing for the modem by computing one set of real and imaginary numbers for each two sets of input samples. The routine also looks for differences in timing between the input sample rate and the remote transmitter's sample rate. If the remote transmttter's crystal frequency is a littler faster than the sampling rate established by the analog interface circuit 40 so that, for example, the remote transmitter is sending 1201 real and imaginary pairs per second instead of the standard 1200, the INTERPOLATOR_ROUTINES will generate an additional pair of samples every second. Conversely, one fewer pair will be generated if the remote end is operating at a slower rate than expected. This allows the disclosed arrangement to lock onto the remote end's transmitted baud rate without having to adjust the rate at which samples are delivered via the fixed-rate DMA transfers required by the host computer system.

INTERPOLATOR_ROUTINES is called by a pointer named BAUDLP_VECTOR immediately after the label ADD_IMAGINARY in RECVFIL.ASM. This routine alternates between buffering the first set of samples and secondly, computing the 1200 rate real and imaginary inputs required by the receiver. Inside SAVE_S1 there is a counter called QUAD_COUNT which, when decremented to zero, indicates that it is time to compute new interpolator coefficients by a jump to NEW_COEFF. This routine looks at the BAUD_X variable in DEMOD.ASM for an underflow or an overflow. These conditions indicate it may be time to compute and extra set of real and imaginary numbers or to skip the next pair. The final sets of real and imaginary numbers (Ps and Qs) are stored in buffers called REAL_BUFFER and IMAG_BUFFER. Because the FILTER_PQ routine can return back with anywhere from 1 to 3 sets of Ps and Qs, those sets are buffered so that DEMOD can handle the under flow/overflow.

When INTERPOLATOR_ROUTINES is finished, control is returned to FILTER_PQ which then loops three more times, followed by a check to determine if the end of the receive sample buffer has been reached, and if the filter delay lines are full. If so, the delay line variables are copied from the end of the buffer to the beginning, the pointers are reset, and the routine is exited. By using long buffers for the delay lines, it is unnecessary to constantly shift these numbers within the delay lines, thus saving execution time.

DEMODULATION

When filtering and interpolation are completed, control is returned to label EQUALIZER_BUF_CHECK in DEMOD (listed in DEMOD.ASM). A check is performed to determine if there are two sets of Ps and Qs in the buffers. If present, they are copied to equalizer input buffers named EQR_DELAY and EQI_DELAY. At this time, the BAUD_SUM variable is set for use by the baud loop routine used for interpolation. BAUD_SUM is set by adding the absolute values of the first set of Ps and Qs and subtracting the second set.

The next routine provides automatic gained controlled amplification (AGC). The first thing done is a check of the baud counter to see if four or thirty-two baud times have passed (corresponding to the 16 or 128 divisor used to calculate the AGC average in FILTER_PQ as discussed above). If appropriate, a check is then to determine if the flag that indicates a valid energy level on the phone line has been set. If not, at ENERGY_CHECK, the current energy level (AGC_AVERAGE) is inspected to see if it is above the minimum level (−43 dBm) indicated by ENERGY_THRESHOLD. If there is still no energy, jump (via NO_ENERGY) to EQUALIZER_FULL_CHECK at the end of DEMOD which insures that the equalizer delay lines do not overflow.

If there is energy for the first time, calculate a new AGC multiplier (at NEW_LEVEL) and start up the receiver. This routine is needed when the user has entered F1 from the initial command buffer (direct to data mode) in order not to run the adaptive equalizer with no input signal. If energy has already been detected and the correct number of baud times has been reached, control is passed to AGC_TESTS.

Before the AGC tests are performed, a routine labeled CHECK_ALPHA slows down the equalizer gain term after 256 baud times. The variable ALPHA is high during training so as to bring the receiver up more quickly. After 256 baud times, ALPHA is reduced to increase performance and reduce variability.

If the AGC is in wide band mode (fast reacting), control then passes to WIDEBAND AGC; otherwise, a check is made to see if the new AGC_AVERAGE is either one-half the level or greater than 1.5 times the last AGC_AVERAGE. If it is, control is passed to NEW_LEVEL to compute an AGC multiplier just on that new value. This lets the receiver act quickly to gain hits on the phone line. If neither of these tests pass, the routine adds ⅛th of the new to ⅞ths of the old level, and computes a new multiplier from the sum. In this way the AGC reacts smoothly and does not vary quickly, which improves performance on a line with little signal level variations.

COMPUTE_AGC takes the new AGC_AVERAGE and computes AGC_XSUBE and AGC_MANT, two variables which are used to adjust any receive signal level the optimal level needed by the receiver. Also, the AGC is changed from wide-band to narrow mode after the first 32 baud times (as seen immediately before the label DISPLAY_BOX in the AGC routine).

DISPLAY BOX checks the RECV_FLAGS register to see if the user is in the display box view mode. If so, the current display box variable is gathered by calling the routine pointed to by DBOX ROUTINE and then the appropriate point is plotted on the oscilloscope screen as noted earlier.

The next routine updates the baud loop variables used by the interpolator routine in FILTER_PQ. The baud loop is controlled by two different loops. A first order baud loop does fine tuning and a second order loop makes coarse adjustments to get the baud loop close to the optimal timing. Every eight baud times the sign of BAUD_SUM is checked. Depending on the sign, a decimal 160 is added or subtracted from BAUD_X. Also, BAUD_SUM is divided by 128 and added to LOOP_INT2, the second order baud loop integrator. LOOP_INT2 is then checked to make sure it stays within the bounds of F200 to OEFF, hexadecimal. This puts a maximum limit on how much the baud loop can correct for timing differences between itself and the remote modem.

At BAUD_LOOP2, a counter called LOOP2_CNT is decremented. When it reaches zero, the sign of LOOP_INT2 is checked and 160 is added or subtracted from BAUD_X. At label GET_NEW-COUNT, LOOP2_CNT is reloaded from the table BAUD_LOOP2_TABLE (defined at the beginning of the DEMOD.ASM listing immediately before the code). The value loaded from BAUD_LOOP2_TABLE is determined by an offset into the table which comes from the high order eight bits of LOOP2_INT. As LOOP2_INT grows to bigger levels, LOOP2_CNT is reloaded with a smaller and smaller count, causing the second order baud loop to make more frequent adjustments to BAUD_X. BAUD_X is then used by the interpolator to know when to skip or add an extra set of Ps and Qs to the equalizer delay line.

The routine EQUALIZER_OUTPUT generates the actual receive data point from the incoming Ps and Qs. The algorithm performs a complex number multiplication between the complex numbers in the equalizer delay line and the complex taps. Each of the last 7 baud times (14 taps) of Ps and Qs are multiplied with their respective taps and the results are summed. What results is the complex number RZN+j IZN, which is the data point.

In the following routine, PHASE_ROTATION, the equalizer output is rotated into the correct quadrant by the Cosine and Sine of the phase angle PHI. This is done through the multiplication of RZN+j IZN by negative COSINE+j SINE. The resulting point is RYM+j IYM.

The next routine performs the calculations to determine which point in the signal constellation RYM+j IYM is closest to. Once this is determined, the data pattern associated with this point is known and the demodulation of the analog signal is complete. Also, the nearest perfect point is saved into DEC_R+j DEC_I and an error vector from this point to the point we demodulated is generated and stored into R_ERROR+j I_ERROR. There are separate routines 1200 and 2400 baud because the signal constellations are different.

For 1200 baud, because there is only four possible points, the process is as simple as comparing the signs of both RYM and IYM to determine which of the quadrants the point resides in. At label DECISION_1200, the sign of RYM is tested. If it is positive, the absolute decision point, 49 * 256, is placed in DEC_R, and this value is subtracted from RYM to get the error vector, R_ERROR. Also, the offset into DECISION_TABLE, where the actual data sent from the other end is decoded, is placed into the BL register. This process is repeated for IYM to yield DEC_I and I_ERROR. At the label READ_DECISION, the receive data is read out of DECISION_TABLE and placed into RECV_DATA.

The process for decoding data at 2400 bits per second is a little different in that there are sixteen possible decision points. Consequently, the routine inspects the sign of RYM and j IYM, as well as their magnitudes. Once the error vectors and decision points are determined, the code branches to READ_DECISION and the receive data is read out of DECISION_TABLE as in the 1200 case above.

The next step is to update the taps with the counter-rotated error vector. By doing this, the taps learn what types of errors are being generated by the phone line and they move in a direction that can correct for these errors. The counter-rotated error vector is scaled down by ALPHA so that the taps cannot be significantly changed by any one baud time error. The counter rotation is done my multiplying R_ERROR+j I_ERROR by COSINE−j SINE, and then again multiplied by ALPHA. The results are placed in AREN+j AIEN.

The routine DO_TAP_UPDATE multiplies all fourteen of the taps (RW+j IW) by (AREN+J AIEN). Before this, however, the taps are all "bled" a little to keep them from becoming too big. This is done by repeating the macro BLEED_TAP (defined at the beginning of the DEMO-D.ASM listing) 28 times, each time adding four to a negative tap or subtracting four from a positive tap, thus pulling all taps toward zero. BLEED_TAP is performed for both the real and imaginary parts of all taps.

Next, the phase loop is updated so that it can recalculate COSINE and SINE for the next baud time. To do this, the output of the equalizer RYM+j IYM must be multiplied by the negative of the decision point DEC R−J DEC I. Only the imaginary vector is needed so RERR need not be recalculated. Thus, IERR=(IYM * DEC R)−(RYM * DEC I). Also, the routine multiplies IERR by two to meet the needed gain for PHASE_UPDATE.

PHASE_UPDATE employs a first and second order phase loop which locks onto the phase roll of the remote transmitter. PHI is the new phase angle determined by the code. The upper eight bits of PHI are then used to access a pre-computed COSINE and SINE from the tables listed in TONES.ASM. This algorithm use of tables indexed by the phase angle PHI substantially improves execution speed by eliminating multiplications.

The S1_DETECT routine functions is a matched filter which detects the presence of the S1 digit sequence defined in the V.22bis CCITT specification. The S1 transmit sequence is used to signal the remote receiver that the other end is a 2400 baud modem, or that the other end wants to initiate a 2400 baud retrain. The S1 sequence is composed of unscrambled 11's then 00's at 1200 baud that create a specific tone on the line. S1_DETECT determines the presence of the tone by looking at the numbers in the real equalizer delay two baud times apart. If the difference in these numbers is above a certain threshold a counter, S1_COUNTER, is incremented. If the difference is below the threshold, the counter is decremented by four. If the counter ever reaches 20, S1 has been detected.

The routines starting at DATA_DECODE perform the necessary computations to parse the incoming data stream into ASCII characters.

At 1200 baud, the two received data bits are stored in bits 2 and 3 of RECV_DATA.

At 2400 baud, the incoming data is decoded in accordance with the V.22 and V.22bis specification, bits 0 through 3 are valid data. First, differential decoding is performed by subtracting the previous baud times' bits 2 and 3 from the baud timers data. Next, the Gray decoding process checks bit 3 and, if it is zero, bit 2 is inverted. Descrambling parses four bits at a time so that, at 1200 baud, the first baud times data bits are placed into DATA_1200, the routine waits for the second baud times data, and then combines the two at COMBINE_1200_DATA before descrambling. DESCRAMBLE_4 performs the descrambling routine specified in V.22 and V.22bis.

After the descrambler, the data is now in the same format as sent to the modem by the remote data terminal equipment: asynchronous ASCII data. The routine then searches the incoming data for a start bit, parse the next eight data bits into an ASCII character, and then puts the result into the receive character buffer for the terminal loop to display on the screen.

At RECEIVE_PARSER, a state variable R_PARSE_JMP is tested to see if it's zero and, if it is, the routine jumps to CHECK_FOR_START to look at the four bits out of the descrambler to see if there are any zeros present. If there are, the data is moved into R_PARSE_DATA, and R_PARSE_JMP is set to PARSE_8. The next time into the loop, RECEIVE_PARSER jumps to PARSE 8 where the next four receive bits are combined into R_PARSE_DATA. Four data bits are still needed to complete the ASCII data, so R_PARSE JMP is set to PARSE_12.

At PARSE_12, enough data has been collected to form the character, so it is now necessary to determine where the character is in the received 12 bits of data. This depends on where the start bit is located. PARSE_12 begins by shifting the received 12 bits right until a zero enters the carry flag. Once a zero is detected, the eight data bits of the receive character are in the AL register, from which they can be stored into RX_CHAR_BUF, and the pointers into R_CHAR_BUF are updated. The bit counters are then checked to see how many of the received 12 bits are left. Depending on where the start bit was located there can be up to three data bits left over. These bits are checked to see if there is another start bit. If there is, the routine recreates R_PARSE_DATA so that it has four valid bits in the low order and resets R_PARSE_JMP to PARSE_8. Code outside the interrupt handling routines checks to see if any characters have been placed in RX_CHAR_BUF and displays them in terminal mode.

The last thing done by the receiver, at EQUALIZER_FULL_CHECK, is to make sure that the equalizer delay line buffers are not full. The previous 6 baud times worth of Ps and Qs must always be available; consequently, when the equalizer is full, the last 12 Ps and Qs are copied to the beginning of the EQR_DELAY and EQI_DELAY. Also, the EQUALIZER_IN pointer is reset to point into location 13.

MODULATION

The transmitter routines listed in TX.ASM are substantially less complex than the demodulation routines because modulation is a determinate process.

The first two routines in TX.ASM, INIT_TX and SETUP_SAMPLE_COUNT, initialize the transmitter variables. INIT_TX resets the pointers into the transmitter sample buffers and calls SETUP_SAMPLE_CNT which tests to see if transmission is to be performed in the low band (8 samples per baud time) or high band (16 samples per). SETUP_SAMPLE_COUNT also sets up the transmit buffer threshold, SAMPLE_COUNT, to either 100 samples for low band or 200 for high band. SAMPLE_COUNT insures that there are always enough samples in the buffer to handle the case where the transmitter routine will not receive control for a prolonged period (which occurs, for example, when interrupts are turned off while the PC is changing video modes). This safeguard adds a 20 ms delay into the transmit path.

TX1224, the code which performs the actual transmission, is reached through the transmit vector, TX_VECTOR, in the interrupt handling routine SOFTMO-DEM in INTS.ASM which, as described above, receives control each time the interface card 15 generates an interrupt at every 16th receive sample.

The first thing TX1224 does is check the number of samples in the transmit buffer. If the count is less than SAMPLE_COUNT, another baud times worth of samples is processed. DO_TX is the actual start of the transmitter process. Flags are first checked to see if the system is operating in a forced data mode in which all marks (ones) or the dibit pattern S1 is to be sent. If either of these flags is set, control is passed to SEND_MARKS.

At CHECK_TX_DATA, the routine first checks to see data is being parsed. If so, control is passed to the routine pointed to by T_PARSE_JMP. If not, control is passed to CHECK_TX_CHAR where a test is performed to determine if any ASCII characters to be sent are present in TX_CHAR_BUF. If there are none, control is passed to SEND_MARKS. If characters are ready to be sent, they are read from TX_CHAR_BUF, the pointers to that buffer are updated, and a start bit is inserted into the data before it is stored in SEND_DATA. The parser vector, T_PARSE_JMP, is set to PARSE_4_2_DATA.

The PARSE_DATA routines are listed at the end of TX.ASM. PARSE_4_2_DATA sets the parser vector to PARSE_2_DATA, obtains the next four data bits of the ASCII character and returns. PARSE_2_DATA then takes the last data bit of the character, appends on three stop bits, and checks for another character to be sent. If there are no more characters to be sent, the routine resets T_PARSE_JMP to zero and returns. If there is a character to be sent, the routine gets the character and updates the buffer pointers, and then shifts the character left three bit positions such that this new character is given a start bit. The routine then inserts the two remaining bits of the last character and saves it off. Next, the new character is shifted right by four, a stop bit is inserted, and T_PARSE_JMP to set to PARSE_4_4_DATA. PARSE_4_4_DATA parses the next four bits of the TX char and sets T_PARSE_JMP to PARSE_4_0_DATA. PARSE_4_0_DATA parses the last three bits of the second data byte plus the stop bit and resets T_PARSE_JMP to zero so that the process is returned to state 0.

As seen in TX.ASM at SCRAMBLER, the data is scrambled using the algorithm specified by the V.22 and V.22bis specification. At CHECK_1200, the low order two bits of the scrambler output are saved for the next baud time. The next two processes, GRAY_ENCODE and DIFF_ENCODE perform the appropriate Gray and differential coding defined in the V.22 and V.22bis specification.

The next routines process the transmit data into sample amplitude values which are delivered to the interface card 15 for digital-to-analog translation by the AIC 40. For each possible data value there are six sets of samples, and the pointers to these samples are called AN0_PTR, AN1_PTR, AN2_PTR, BN0_PTR, BN1_PTR, and BN2_PTR. AN0_PTR and BN0_PTR are read from a table at an offset location equal to the current transmit data value. The other four pointers are the AN0 and BN0 pointers saved from the last two baud times. Next, the transmit sample is created by adding the three values pointed to by the AN pointers, multiplying them by 1 or −1 depending on which sample is being formed, and putting the result into TEMP_TX_BUF. Next, the three values pointed to by the BN pointers are added together and the sum is either added or subtracted from the corresponding TEMP_TX_BUF value depending on the 1 or −1 multiplier. This process is done for either 8 or 16 samples, depending on whether transmission is to be made in the low or high band respectively. Once the samples are completely formed in TEMP_TX_BUF, they are copied into the transmit sample buffer making sure to take into account the position of the end of the buffer.

When transmitting low band samples during the training sequence, it is necessary to change the receive sample rate from 7200 samples per second (needed for call progress functions) to 9600 samples per second needed by the receiver code. To change the sampling rate, AIC commands are imbedded into the data stream in the routine SEND_AIC_CMDS. This routines takes a transmit sample, ORs it with binary 3 which tells the AIC there is a command following this data sample., and the puts the command into the next location. To change the sample rate, two consecutive commands are sent.

The process differs during high band transmission. Alternating samples are filled with the sum of the AN's and then the sum of the BN's, and the need to send AIC commands does not arise; consequently, there is always room in the sample buffer for a full baud times worth of samples. Once the TX samples have been moved into the TX sample buffer, the HIGH_BAND_FILTER routine shifts the AN and BN delay lines and returns.

The functions provided to the user by the program described are, of course, merely illustrative of the communications functions which can be implemented by suitably programming the host processor to exchange information with the interface card. In addition to the 1200 baud, originate mode modem communications capability implemented as operational code in the program listing which follows, much of the code necessary to implement 2400 baud V.22bis modem communication is also included in the following listing, although a fully operative 2400 baud system has not been completed and hence the 2400 baud routines that are included have not been fully tested. It should also be noted that the disclosed hardware, suitably programmed, can provide a variety of additional functions, such as facsimile and synchronous data transmission, as well as other modem modulation schemes such as the Bell 208 or U.S. Robotics HST asymmetrical transmission modes. Additional routines for performing more elaborate line equalization, echo suppression, adaptive transmission rate adjustment ("fall forward" and "fall back" to adjust to transmission noise conditions), error correction and data compression algorithms can be readily implemented by programming the host processor to manipulate transmitted and received data, either on either a concurrent, real-time basis, or by processing the data before transmission begins or after it concludes.

It should also be noted that, because the telephone interface operates under direct control of the host processor, it is unnecessary to embed control sequences (e.g. AT command code sequences) within the data stream to provide communications control functions. It is accordingly possible to much more rapidly respond to events which occur, either in the host computer, the telephone link, or at the remote data terminal equipment, so that flow control procedures (for example) can be more rapidly, more transparently, and more effectively handled than is currently possible with separate modems which must be controlled by escape signals imbedded in the data stream, typically with mandatory guard times which accompany the unique pattern of characters forming the escape signal.

Most importantly, however, the present invention is implementing virtually any voice or digital communications function which can be accomplished over voice-grade lines without needing different hardware. This versatility is achieved by transferring substantially all of the functionality from the conventional separate communications processor (which is typically programmed with resident firmware and/or employs special purpose analog or digital circuitry for signal processing functions) to the available processor in the host computer, which can be programmed to perform a suite of functions whether presently available or yet to be developed.

It is to be understood that the arrangement which has been described, and which is implemented by the programs listed below, is merely illustrative of one application of the principles of the invention. Numerous modifications may be made by those skilled in the art without departing from the true spirit and scope of the invention.

PROGRAM LISTING

The assembly language listing for the modules discussed above appears below:

```
        ;************ COPYRIGHT  1993 U.S.ROBOTICS, INC. ****************
        .model small
        .286
        .stack      200h
        ;*******************************************************
        ;
        ;       MAIN (the user interface into the modem)
        ;
        ;       Main sets up the DMA channels and initializes the modem
        ;       interrupts.
        ;
        ;******************************************************* include     equates
                public      vid_mode,rx_sample_segment,tx_sample_segment
                public      ds_segment,tx_dma_ala16,rx_dma_ala16
                public      set_aic_bands,init_dma,speaker_on,speaker_off
                public      on_hook,off_hook,tx_dma_off,rx_dma_off
                public      display_segment,attribute,init_aic
                public      init_aic_tx48_rx72,sreg
                public      init_tx_dma,tx_dma_on
                public      rx_dma_on,main_flags
                extrn   init_dbox:near,init_tx:near,init_recv:near
                extrn   demod:near,tx1224:near,softmodem:near
                extrn   dbox_address:near,init_timer:near
                extrn   disable_int:near,wedge_int:near
                extrn   nul_routine:near,send_tones:near
                extrn   dial:near,init_screen:near,window_flip:near
                extrn   ring_detect:near,no_ring_state:near
                extrn   save_screen:near,restore_screen:near
                extrn   init_comm_screen:near,screen_out:near
                extrn   callp_main:near,print_parity:near
                extrn   touch_tone_detect:near,dtmf:near,init_callp:near
                extrn   get_callp:near,get_touch_tone:near extrn   rx_char_in:word,rx_char_out:word
                extrn   tx_char_in:word,tx_char_out:word
                extrn   rx_char_buf_start:word,rx_char_buf_end:word
                extrn   tx_char_buf_start:word,tx_char_buf_end:word
                extrn   recv_flags:word,rx_out:word,baud_count:word
                extrn   tx_in_ptr:word,tx_flags:word
                extrn   recv_vector:word,tx_vector:word
                extrn   freq:word,ring_state:word extrn   main_menu:byte,start_message:byte,end_message:byte
                extrn   int_flags:byte,outgoing_msg:byte,recording_msg:byte
                buffer_word_size    equ     8192-1
```

```
            stack_length            equ    200h/16
            rx_buf_len       equ    8192 * 2
            tx_buf_len       equ    8192 * 2

     .data
            main_flags    dw    ?
        ;   main_flags.0     = 1   No recv data
        ;   main_flags.1     = 1   Auto-answer in data mode versus voice mode
        ;   main_flags.2     = 1   TX DMA on
        ;   main_flags.3     = 1   Ignore Loop Loss
        ;   main_flags.4     = 1   Loop loss status
        ;   main_flags.5     = 1   Annouce rings ;   main_flags.8     = 1   Odd/Mark = 0  Even/Space
        ;   main_flags.9     = 1   Force parity
        ;   main_flags.10    = 1   Parity ON dbox_ok           db     ?     ; <>0 = graphics adaptor present
            vid_mode    db    ?     ; save the old video state
            out_latch   db    ?     ; image of output latch
            temp_address_low  dw    ?
            temp_address_high dw    ?
            init_AIC_tx96_rx96     dw    9,9,3,0ff47h,03h,1e3ch,03h,0dh
                                   dw    03h,3872h,0,0,0,0,0,0
            init_AIC_voice         dw    9,9,3,0ff47h,03h,1c38h,03h,0dh
                                   dw    03h,50a2h,0,0,0,0,0,0    ; RX 7200
            init_AIC_tx48_rx96     dw    9,9,3,0ff47h,03h,383ch,03h,0dh
                                   dw    03h,3c72h,0,0,0,0,0,0
            init_AIC_tx48_rx72     dw    9,9,3,0ff47h,03h,3838h,03h,0dh
                                   dw    03h,3ca2h,0,0,0,0,0,0 init_AIC_tx96_rx48     dw    9,9,3,0ff47h,03h,1e70h,03h,0dh
                                   dw    03h,387ah,0,0,0,0,0,0
            init_AIC_tx48_rx48     dw    9,9,3,0ff47h,03h,3870h,03h,0dh
                                   dw    03h,3c7ah,0,0,0,0,0,0 ds_segment       dw    ?
            psp_segment      dw    ?     ; program segment prefix
; Dynamically allocated sample buffers
            tx_sample_segment dw   ?
            tx_dma_a1a16           dw    ?
            tx_dma_page      dw    ?

rx_sample_segment dw   ?
45          rx_dma_a1a16           dw    ?
            rx_dma_page      dw    ?

ram_error_msg         db    cr,lf,'Insufficient RAM',cr,lf,'$'
            shrink_error_msg  db  cr,lf,'Error during RAM shrink',cr,lf,'$'
            display_segment       dw    ?
```

```
                attribute           db      ?
        EVEN
                playback_file       db      'msg1.dat',0,0,0,0,0,0,0

; MODEM SPECIFIC REGISTERS
                sreg        dw      1,0,43,13,10,8,2,30,2,17,7,70
        .code
        SOFT_MODEM  PROC    NEAR mov     dx,@data
                mov     ds,dx
                cld
                mov     psp_segment,es
                mov     ds_segment,ds       ; save for further reference ; shrink RAM to the size of the program
                mov     bx,ss               ; find the end of the program
                add     bx,stack_length     ; add length of the stack in paragraphs
                mov     ax,es
                sub     bx,ax               ; subtract start of the program
                inc     bx                  ; add one for good measure
                mov     ah,4ah              ; shrink ram
                int     21h                 ; ES points to PSP
                mov     dx,offset shrink_error_msg
                jc      alloc_error mov     es,ds_segment
                call    allocate_buffers    ; get the two 8K word sample buffers
                jnc     alloc_ok mov     dx,offset ram_error_msg
        alloc_error:
                mov     ah,09h
                int     21h
        exit_jmp:
                jmp     main_exit alloc_ok:
                mov     out_latch,0ffh mov     ah,0fh              ; get the current video mode and save
                int     10h
                mov     vid_mode,al ; presence test for EGA/VGA
                mov     dbox_ok,0
                xor     bx,bx
                mov     ax,1a00h            ; VGA display info
                int     10h
                cmp     al,1ah              ; AL returned as 1ah if supported
```

```
                jne     no_vga
                mov     dbox_ok,0ffh
                jmp     short presence_done
        no_vga:
                mov     ah,12h          ; EGA display info
                mov     bl,10h
                int     10h
                cmp     bl,10h          ; if bl remains the same the no EGA
                je      presence_done
                mov     dbox_ok,0ffh
        presence_done:
        ; get the display segment
                int     11h             ; color or monochrome monitor ?
                and     ax,30h
                cmp     ax,30h
                mov     display_segment,mono
                mov     attribute,07h
                je      mono_disp
                mov     attribute,01bh
                mov     display_segment,color_seg
        mono_disp:

mov     main_flags,0    ;
            IF board
                lea     si,init_aic_tx96_rx96   ; tx 9600 rx 9600
                call    init_aic
                call    init_dma mov     ring_state,offset no_ring_state
                mov     recv_vector,offset ring_detect
                mov     tx_vector,offset nul_routine
                call    wedge_int ; check for any command line options
                mov     es,psp_segment
                mov     bx,80h
                mov     cl,[es:bx]      ; get the command line option count
                xor     ch,ch
                inc     bx
                cmp     cx,0
                je      init_ring
        space_loop:
                mov     al,[es:bx]
                inc     bx
                cmp     al,' '
                jne     got_char
                loop    space_loop
        got_char:
                dec     bx
                lea     si,playback_file
```

36

```
                cmp     cx,12
                jle     get_name
                mov     cx,12
        get_name:
                mov     al,[es:bx]
                inc     bx
                mov     [ds:si],al
                inc     si
        space_off:
                loop    get_name xor     al,al           ; terminate
                mov     [ds:si],al
                call    speaker_on
                lea     dx,playback_file
                call    playback_msg
                call    speaker_off
                jmp     main_exit init_ring:
                push    ds
                pop     es
        ; re-init all the vectors
                mov     ring_state,offset no_ring_state
                mov     recv_vector,offset ring_detect
                mov     tx_vector,offset nul_routine call    on_hook
                call    speaker_off
            ENDIF main_screen:
        ; hide the cursor
                mov     ah,02h
                xor     bh,bh
                mov     dh,25
                mov     dl,0
                int     10h and     main_flags,0700h  ; every thing but parity
                call    init_screen
                call    print_parity main_loop:
            IF board
                call    on_hook
            ENDIF
        no_hangup:
                lea     si,main_menu
```

37

```
                call    window_flip get_key:
                mov     ah,1
                int     16h
                jnz     menu_command test    int_flags,b0
                jz      get_key             ; check for ring and     int_flags,0feh test    main_flags,b0
                jnz     aa_data lea     si,main_menu
                call    window_flip call    answering_machine
                jmp     short main_loop aa_data:
        ;       call    aa_comm_mode
                jmp     short main_loop menu_command:
                mov     ah,0
                int     16h cmp     ax,F1
                jne     chk_record lea     si,main_menu
                call    window_flip call    originate_mode_init
                call    comm_mode
                IF board
                jmp     short init_ring
                ELSE
                jmp     short main_screen
                ENDIF chk_record:
                cmp     ax,F2
                jne     chk_playback lea     si,main_menu
                call    window_flip
```

```
           call    off_hook
           call    speaker_off
           or      main_flags,b3       ; ignore loop loss
          lea     si,start_message
           call    window_flip mov     ah,0                ; get a key
           int     16h
           lea     si,start_message
           call    window_flip lea     si,end_message
           call    window_flip IF board
           lea     dx,out_msg
           call    record_msg
       ELSE
           mov     ah,0
           int     16h
       ENDIF 25         lea     si,end_message
           call    window_flip jmp     main_loop
    chk_playback:
       IF board
           cmp     ax,F3
           jne     chk_tone
           lea     si,main_menu
           call    window_flip call    on_hook
           call    speaker_on
       try_again:
           lea     dx,playback_file
           call    playback_msg
           jc      bad_play
           mov     bx,offset playback_file
           inc     byte ptr [bx+3]

no_files:
           call    speaker_off
```

```
              jmp    main_loop
       bad_play:
              mov    bx,offset playback_file
              cmp    byte ptr [bx+3],'1'
              je     no_files
              mov    byte ptr [bx+3],'1'
              jmp    short try_again
       ENDIF
       chk_tone:
              cmp    ax,F4
              jne    chk_dial
           lea    si,main_menu
              call   window_flip IF board
              call   speaker_on
       ENDIF mov    freq,tone_2225
              mov    ax,1000                    ; ten seconds
              call   send_tones
       IF board
              call   speaker_off
       ENDIF
           jmp    main_loop chk_dial:
              cmp    ax,F5
              je     originate_mode
              jmp    chk_F6 originate_mode:
              lea    si,main_menu
              call   window_flip
              call   dial
       IFE board
              jmp    no_hangup
       ELSE
              mov    sreg+9,17                  ; 600 ms of answer tone
              mov    sreg+7,30                  ; 30 second time out
              call   callp_main
              jnc    got_atone
              jmp    main_loop
       got_atone:
```

40

```
                call    setup_loop_current or      recv_flags,1h           ; recv_high
                call    init_comm_screen and     main_flags,NOT b0
                call    init_recv or      recv_flags,08h          ; data mode
        ;       cmp     dbox_ok,0
        ;       je      no_dbox1
        ;       and     recv_flags,0fff7h
        ;       call    init_dbox
        ;no_dbox1:
                call    init_rx_dma cli
                mov     ax,150
                call    init_timer
                mov     recv_vector,offset demod ; enable DMA channel 2  RECV DMA
                call    rx_dma_on
                sti wait_connect:
                test    recv_flags,b5
                jz      wait_connect
                call    speaker_off
                mov     rx_char_in,offset rx_char_buf_start
                mov     rx_char_out,offset rx_char_buf_start call    comm_mode
                jmp     init_ring
            ENDIF chk_f6:
                cmp     ax,F6
                jne     chk_ttone_detect lea     si,main_menu
                call    window_flip call    callp_main
                jmp     no_hangup chk_ttone_detect:
                cmp     ax,F7
                jne     chk_message_system
```

41

```
              lea     si,main_menu
              call    window_flip call    off_hook
              call    speaker_on call    touch_tone_detect call    on_hook
              call    speaker_off
              jmp     no_hangup chk_message_system:
              cmp     ax,f8
              jne     chk_on_off_hook lea     si,main_menu
              call    window_flip
              call    messaging_system jmp     no_hangup
      chk_on_off_hook:
         IF board
              cmp     ax,ALT_H
              jne     chk_spkr
              mov     dx,modem_board
              xor     out_latch,1
              mov     al,out_latch
              out     dx,al
              jmp     get_key chk_spkr:
              cmp     ax,ALT_S
              jne     chk_parity
              mov     dx,modem_board
              xor     out_latch,8
              mov     al,out_latch
              out     dx,al
              jmp     get_key
         ENDIF chk_parity:
              cmp     ax,ALT_P
              jne     chk_answer_mode
```

42

```
                call    new_parity
                jmp     get_key chk_answer_mode:
                cmp     ax,ALT_A
                jne     chk_exit xor     main_flags,b5           ; change answering machine answer mode
                jmp     get_key
        chk_exit:
                cmp     ax,F10
                je      main_exit
                jmp     get_key main_exit:
                call    disable_int mov     ah,15           ; CLS
                int     10h
                mov     ah,0
                int     10h mov     ah,4ch          ; exit
                xor     al,al
                int     21h SOFT_MODEM      ENDP
        ;
        ;%%%%%%%%%%%%%%%%%%%%%%%%%%%%%%%%%%%%%%%%%%%%%%
        ;
        INIT_DMA        PROC    NEAR call    tx_dma_off
                call    rx_dma_off mov     dx,wr_cmd       ; command register
                mov     al,00000000b
                out     dx,al
                jmp     $+2 mov     dx,wr_mode
                mov     al,01011001b            ; channel 1
                out     dx,al
                jmp     $+2 mov     al,01010110b            ; channel 2
                out     dx,al
                jmp     $+2
```

```
                call    init_tx_dma
                call    init_rx_dma ret

INIT_DMA    ENDP
        ;
        ;**********************************************
        ;
        INIT_TX_DMA PROC    NEAR mov     dx,wr_clr_byte_ptr      ; init flag to low byte
                out     dx,al
                jmp     $+2 mov     ax,tx_dma_a1a16
        ; AX contains A1 - A16 of the tx buffer
                mov     dx,dma_5_address
                out     dx,al
                jmp     $+2
                mov     al,ah
                out     dx,al
                jmp     $+2 mov     ax,tx_dma_page
                mov     dx,dma_5_page
                out     dx,al
                jmp     $+2 mov     dx,wr_clr_byte_ptr      ; init flag to low byte
                out     dx,al
                jmp     $+2

; Write the buffer size to each channel
                mov     ax,buffer_word_size
                mov     dx,dma_5_count
                out     dx,al
                jmp     $+2
                mov     al,ah
                out     dx,al
                jmp     $+2 ret

INIT_TX_DMA ENDP
        ;
        ;**********************************************
        ;
        INIT_RX_DMA PROC    NEAR
```

```
                mov     dx,wr_clr_byte_ptr      ; init flag to low byte
                out     dx,al
                jmp     $+2

       ; setup the receive buffer samples
                mov     ax,rx_dma_ala16
                mov     dx,dma_6_address
                out     dx,al
                jmp     $+2
                mov     al,ah
                out     dx,al
                jmp     $+2 mov     ax,rx_dma_page
                mov     dx,dma_6_page
                out     dx,al
                jmp     $+2 mov     dx,wr_clr_byte_ptr      ; init flag to low byte
                out     dx,al
                jmp     $+2 mov     dx,dma_6_count
                mov     ax,buffer_word_size
                out     dx,al
                jmp     $+2
                mov     al,ah
                out     dx,al
                jmp     $+2
30
                ret INIT_RX_DMA ENDP
        ;
        ;****************************************************
        ;
        INIT_AIC    PROC    NEAR ; disable DMA channels
                call    rx_dma_off
                call    tx_dma_off mov     dx,wr_cmd           ; command register
                mov     al,00000000b
                out     dx,al
                jmp     $+2 mov     dx,wr_mode
                mov     al,01011001b            ; channel 1
50              out     dx,al
```

```
              jmp     $+2 mov     dx,wr_clr_byte_ptr      ; init flag to low byte
              out     dx,al
5             jmp     $+2 mov     ax,tx_dma_a1a16
      ; AX contains A1 - A16 of the tx buffer
              mov     dx,dma_5_address
10            out     dx,al
              jmp     $+2
              mov     al,ah
              out     dx,al
              jmp     $+2
15
              mov     ax,tx_dma_page
              mov     dx,dma_5_page
              out     dx,al
              jmp     $+2
20
              mov     dx,wr_clr_byte_ptr      ; init flag to low byte
              out     dx,al
              jmp     $+2

25    ; Write the buffer size to each channel
              mov     ax,buffer_word_size
              mov     dx,dma_5_count
              out     dx,al
              jmp     $+2
              mov     al,ah
              out     dx,al
              jmp     $+2 end_dma:
      ;   reset the AIC
              mov     dx,modem_board
              and     out_latch,0fbh
              mov     al,out_latch
              out     dx,al
              mov     cx,100
      here2:
              loop    here2
              or      out_latch,4h
              mov     al,out_latch
              out     dx,al ; DS:SI already setup
              xor     di,di
              mov     es,tx_sample_segment
50            mov     cx,16
```

46

```
              rep    movsw

; enable DMA channel 1
              call   tx_dma_on
       wait_aic:
              mov    dx,wr_clr_byte_ptr      ; init flag to low byte
              out    dx,al
              jmp    $+2
              mov    dx,dma_5_count
              in     al,dx
              mov    bl,al
              jmp    $+2
              in     al,dx
              mov    bh,al
              cmp    bx,buffer_word_size - 14
              jge    wait_aic ; disable DMA channel 1
              call   tx_dma_off ; clear out the AIC commands
              mov    es,tx_sample_segment
              xor    di,di
              mov    cx,11
              xor    ax,ax
              rep    stosw ; AIC has been initialized
              ret INIT_AIC    ENDP
       ;
       ;%%%%%%%%%%%%%%%%%%%%%%%%%%%%%%%%%%%%%%%%%%%%%%%%%%
       ;
       MISC_ROUTINES      PROC   NEAR off_hook:
              mov    dx,modem_board
              and    out_latch,0feh
              mov    al,out_latch
              out    dx,al
              ret
       on_hook:
              mov    dx,modem_board
              or     out_latch,1
              mov    al,out_latch
              out    dx,al
              ret
```

```
      speaker_on:
              mov     dx,modem_board
              and     out_latch,0f7h
              mov     al,out_latch
              out     dx,al
              ret speaker_off:
              mov     dx,modem_board
              or      out_latch,8
              mov     al,out_latch
              out     dx,al
              ret
      MISC_ROUTINES   ENDP
      ;
      ;**************************************************
      ;
      ALLOCATE_BUFFERS  PROC  NEAR
      ; get TX buffer first
              mov     ah,48h          ; allocate memory
              mov     bx,400h         ; 16K bytes
              int     21h
              jc      error_exit1

; now find out if the DMA address register will overflow
      ; AX = segment
              mov     tx_sample_segment,ax
              mov     bx,ax
              shl     ax,4
              rol     bx,4
              and     bx,0fh
              shr     bx,1
35            rcr     ax,1 shl     bx,1            ; restore A16 - A23
              mov     tx_dma_page,bx
              mov     tx_dma_a1a16,ax
              cmp     ax,0            ; if the DMA address is positive
                                      ; then don't worry...be happy
              jge     no_problem
              add     ax,2000h        ; word count
              cmp     ax,0
              jl      no_problem      ; still enough words
      ; the last buffer won't work so get the next, it will
              mov     ah,48h          ; allocate memory
              mov     bx,400h         ; 16K bytes
              int     21h
50    error_exit1:
```

```
              jc     error_exit mov    tx_sample_segment,ax
              mov    bx,ax
 5            shl    ax,4
              rol    bx,4
              and    bx,0fh
              shr    bx,1
              rcr    ax,1
10
              shl    bx,1              ; restore A16 - A23
              mov    tx_dma_page,bx
              mov    tx_dma_ala16,ax
       no_problem:
       ; Now get the RX buffer
              mov    ah,48h            ; allocate memory
              mov    bx,400h           ; 16K bytes
              int    21h
              jc     error_exit ; now find out if the DMA address register will overflow
       ; AX = segment
              mov    rx_sample_segment,ax
              mov    bx,ax
              shl    ax,4
              rol    bx,4
              and    bx,0fh
              shr    bx,1
30            rcr    ax,1 shl    bx,1              ; restore A16 - A23
              mov    rx_dma_page,bx
              mov    rx_dma_ala16,ax
              cmp    ax,0              ; if the DMA address is positive
                                       ; then don't worry...be happy
              jge    good_exit
              add    ax,2000h          ; word count
              cmp    ax,0
              jl     good_exit         ; still enough words
       ; the last buffer won't work so get the next, it will
              mov    ah,48h            ; allocate memory
              mov    bx,400h           ; 16K bytes
              int    21h
              jc     error_exit mov    rx_sample_segment,ax
              mov    bx,ax
              shl    ax,4
50            rol    bx,4
```

49

```
                and     bx,0fh
                shr     bx,1
                rcr     ax,1

5              shl     bx,1            ; restore A16 - A23
                mov     rx_dma_page,bx
                mov     rx_dma_ala16,ax good_exit:
                clc
        error_exit:
                ret ALLOCATE_BUFFERS    ENDP
        ;
        ;♦♦♦♦♦♦♦♦♦♦♦♦♦♦♦♦♦♦♦♦♦♦♦♦♦♦♦♦♦♦♦♦♦♦♦♦♦♦♦♦♦♦♦♦♦♦♦
        ;
        RECORD_MSG  PROC    NEAR
        .data
20              in_file         db      'msg1.dat',0
                handle          dw      ?
                end_flag    db  ?
                start_msg   db  cr,lf,'Hit a key to begin recording',cr,lf,'$'
                end_msg         db      cr,lf,'Hit a key to stop recording',cr,lf,'$'
                bad_create  db  cr,lf,'Bad file create',cr,lf,'$'
        .code
                mov     ah,03ch         ; create file
                xor     cx,cx           ; normal access
                int     21h
                jnc     file_ok
                lea     dx,bad_create
                jmp     error_exit
        file_ok:
                mov     handle,ax
                lea     si,init_aic_voice ; tx 9600 rx 9600
                call    init_aic
                call    init_dma
        ; dma is setup
        ; enable DMA channel 2  RECV DMA
                call    rx_dma_on mov     rx_out,0
                mov     end_flag,0
        ; set up the next address
        record_loop:
                mov     dx,wr_clr_byte_ptr  ; init flag to low byte
                out     dx,al
                jmp     $+2
```

```
        ; how many words are there in the receive buffer?
                mov     dx,dma_6_address    ; get RX in
                in      al,dx
                mov     cl,al
 5              jmp     $+2
                in      al,dx
                mov     ch,al
                jmp     $+2

                mov     dx,wr_clr_byte_ptr      ; init flag to low byte
                out     dx,al
                jmp     $+2

; check to see if the low byte rolled over
                mov     dx,dma_6_address
                in      al,dx
                cmp     cl,al
                je      read_ok
                mov     cl,al
20              in      al,dx
                mov     ch,al
        read_ok:
                mov     ax,rx_out
                shr     ax,1            ; words
                add     ax,rx_dma_ala16
                sub     cx,ax
                jns     pos_diff
                add     cx,( rx_buf_len / 2 )
        pos_diff:
        ;       shr     ax,1            ; word count
                cmp     cx,800h         ; 2k words
                jge     save_it cmp     end_flag,0
                jne     record_loop mov     ah,1
                int     16h
                jnz     end_record
                test    main_flags,b3   ; ignore loop loss
                jnz     record_loop test    main_flags,b4   ; loop loss?
                jz      record_loop
        end_record:
                mov     end_flag,0ffh
                jmp     short record_loop 50      save_it:
```

51

```
                push    ds
                mov     cx,1000h            ; 4k bytes
                mov     bx,handle
                mov     dx,rx_out
                mov     ah,040h
                mov     ds,rx_sample_segment
                int     21h
                pop     ds
                mov     ax,rx_out
                add     ax,1000h
                cmp     ax,rx_buf_len
                jne     no_rollover
                xor     ax,ax
        no_rollover:
                mov     rx_out,ax
                cmp     end_flag,0
                jne     end_record_dma
                jmp     record_loop
        end_record_dma:
        ; disable DMA channel 2 RECV DMA
                call    rx_dma_off mov     bx,handle           ; close the file
                mov     ah,03eh
                int     21h ret
        error_out:
                mov     ah,09h
                int     21h
                ret
        RECORD_MSG  ENDP
        ;
        ;%%%%%%%%%%%%%%%%%%%%%%%%%%%%%%%%%%%%%%%%%%%%%%
        ;
        PLAYBACK_MSG    PROC    NEAR
        .data
                out_msg         db      'msg1.dat',0
                bad_open        db      cr,lf,'Bad file open',cr,lf,'$'
        .code
                mov     ah,03dh                 ; open file
                xor     al,al                   ; read access
                int     21h
                jnc     file_open
        ;       lea     dx,bad_open
        ;       mov     ah,09h
50      ;       int     21h

52
```

```
                ret
        file_open:
                mov     handle,ax 5              lea     si,init_aic_voice  ; tx 9600 rx 9600
                call    init_aic
                call    init_dma ; dma is setup
                mov     tx_in_ptr,0
        playback_loop:
                mov     ah,1
                int     16h
                jz      no_abort
                jmp     abort_pb
        no_abort:
                mov     dx,wr_clr_byte_ptr      ; init flag to low byte
                out     dx,al
                jmp     $+2
                mov     dx,dma_5_address
                in      al,dx
                mov     cl,al
                jmp     $+2
25              in      al,dx
                mov     ch,al
                jmp     $+2 mov     dx,wr_clr_byte_ptr      ; init flag to low byte
30              out     dx,al
                jmp     $+2

; check for low byte rollover
                mov     dx,dma_5_address
35              in      al,dx
                cmp     al,cl
                je      tx_address_ok
                mov     cl,al
                jmp     $+2
                in      al,dx
                mov     ch,al
                jmp     $+2 tx_address_ok:
45              mov     ax,tx_in_ptr            ; calculate the tx buffer address
                shr     ax,1            ; word address
                add     ax,tx_dma_ala16
                sub     ax,cx
                jns     pos_diff2
                add     ax,( tx_buf_len / 2 )
```

53

```
pos_diff2:
    ;    shr    ax,1                    ; word count
         cmp    ax,800h                 ; less than 2K words in the buffer?
         jge    playback_loop ; file the tx buffer with 2K words of samples
         mov    ah,03fh                 ; file read
         mov    bx,handle
         mov    cx,1000h                ; 4K bytes
         mov    dx,tx_in_ptr
         push   ds
         mov    ds,tx_sample_segment
         int    21h
         pop    ds push   ax
; enable DMA channel 1  TX DMA
         call   tx_dma_on
         pop    ax cmp    ax,0
         je     file_end
         add    tx_in_ptr,1000h         ; adjust input pointer
         cmp    tx_in_ptr,tx_buf_len
         jne    playback_loop mov    tx_in_ptr,0
         jmp    short playback_loop file_end:
         mov    bx,tx_in_ptr            ; calculate the tx buffer address
         shr    bx,1                    ; word address
         add    bx,tx_dma_ala16 wait_end_loop:
; wait for tx_in_ptr and the DMA 5 address to be the same
         mov    dx,wr_clr_byte_ptr      ; init flag to low byte
         out    dx,al
         jmp    $+2 mov    dx,dma_5_address
         in     al,dx
         mov    cl,al
         jmp    $+2
         in     al,dx
         mov    ch,al
         jmp    $+2 mov    dx,wr_clr_byte_ptr      ; init flag to low byte
```

54

```
                out     dx,al
                jmp     $+2

; check for low byte rollover
                mov     dx,dma_5_address
                in      al,dx
                cmp     al,cl
                je      tx_address_ok2
                mov     cl,al
                jmp     $+2
                in      al,dx
                mov     ch,al
                jmp     $+2

        tx_address_ok2:
                cmp     bx,cx
                jne     wait_end_loop
        abort_pb:
        ; disable DMA channel 1 TX DMA
                call    tx_dma_off ;       call    speaker_off
                mov     bx,handle       ; close the file
                mov     ah,03eh
                int     21h 30              clc
                ret PLAYBACK_MSG    ENDP
35      ;
        ;$$$$$$$$$$$$$$$$$$$$$$$$$$$$$$$$$$$$$$$$$$$$$$$$$$$
        ;
        COMM_MODE       PROC    NEAR
        comm_loop:
            IFE board
        ;       mov     cx,20000
        ;here:
        ;       loop    here
                call    tx1224
                call    demod
            ENDIF
                mov     ah,1            ; any keys hit?
                int     16h
                jz      check_receive
```

```
                jmp     got_key check_receive:
                test    main_flags,b3       ; ignore loop current?
                jnz     chk_dbox_mode test    main_flags,b4
                jz      chk_dbox_mode
                jmp     dbox_check
        chk_dbox_mode:
           IFE board
                test    main_flags,b0
                jnz     data_ok
                cmp     baud_count,300      ; 1.5 seconds
                jle     comm_loop    ; blow off data for 1.5 seconds
                or      main_flags,b0
                mov     rx_char_in,offset rx_char_buf_start
                mov     rx_char_out,offset rx_char_buf_start
        data_ok:
           ENDIF
                test    recv_flags,b3       ; are we in display box mode?
                jz      comm_loop mov     si,rx_char_out      ; check for receive chars
                cmp     si,rx_char_in
                je      comm_loop lodsb
                cmp     si,offset rx_char_buf_end
                jne     save_char_out
                mov     si,offset rx_char_buf_start
        save_char_out:
                mov     rx_char_out,si mov     bx,5b20h            ; ' '
        ; do parity checking
                test    main_flags,b10
                jz      no_parity
                test    main_flags,b9
                jz      check_even_odd
                test    main_flags,b8
                jnz     check_mark
                test    al,80h
                jz      good_receive
                mov     bx,3545h
                jmp     short good_receive
        check_mark:
                test    al,80h
                jnz     good_receive
```

56

```
              mov     bx,3545h
              jmp     short good_receive check_even_odd:
       ; even or odd
              test    main_flags,b8
              jz      check_even
              cmp     al,0
              jpo     good_receive
              mov     bx,3545h
              jmp     short good_receive
       check_even:
              cmp     al,0
              jpe     good_receive
              mov     bx,3545h good_receive:                          ; if parity is wrong turn.. flash parity
              mov     es,display_segment
              mov     di,70
              mov     [es:di],bx
              and     al,7fh
       no_parity:
              call    screen_out
              jmp     comm_loop got_key:
              mov     ah,0
              int     16h cmp     ax,F1
              jne     check_f2 test    recv_flags,b3    ; check if we are in display box mode
              jnz     comm_loop_jmp or      recv_flags,08h   ; turn off the dbox while changing vid modes
              call    dbox_address
              and     recv_flags,0fff7h
              jmp     comm_loop
       check_f2:
              cmp     ax,F2
              jne     check_parity test    recv_flags,b3
              jnz     go_dbox or      recv_flags,08h
              mov     al,vid_mode ; restore the initial video mode
              mov     ah,0
```

57

```
                int     10h
                call    restore_screen
        comm_loop_jmp:
                jmp     comm_loop
        go_dbox:
                cmp     dbox_ok,0
                je      comm_loop_jmp     ; display does not support graphics
                call    save_screen
                call    init_dbox
                and     recv_flags,0fff7h
                jmp     comm_loop check_parity:
                cmp     ax,ALT_P
                jne     check_ascii call    new_parity
                jmp     comm_loop
        check_ascii:
                cmp     al,0         ; ASCII ?
                je      check_exit
        ; set up the correct parity
                test    main_flags,b10
                jz      send_it test    main_flags,b9
                jnz     force_it
                test    main_flags,b8
                jnz     odd_parity
                cmp     al,0         ; set parity bits
                jpe     send_it
                or      al,80h
                jmp     short send_it
        odd_parity:
                cmp     al,0         ; set parity bits
                jpo     send_it
                or      al,80h
                jmp     short send_it force_it:                    ; mark or space parity
                and     al,7fh
                test    main_flags,b8
                jz      send_it
                or      al,80h send_it:
        ; put the key into the transmit buffer

58
```

```
                mov     es,ds_segment
                cli
                mov     di,tx_char_in
                stosb
                cmp     di,offset tx_char_buf_end
                jne     save_di
                lea     di,tx_char_buf_start
        save_di:
                cmp     di,tx_char_out   ; is the buffer full?
                je      loop_end         ; yes so don't update the pointer
                mov     tx_char_in,di
                sti check_exit:
                cmp     ax,F10
                je      dbox_check       ; F10
        loop_end:
                sti
                jmp     comm_loop
        dbox_check:
                test    recv_flags,b3    ; are we data mode ?
                jnz     exit
                or      recv_flags,08h
                mov     al,vid_mode ; restore the initial video mode
                mov     ah,0
                int     10h
        exit:
                call    tx_dma_off
                call    rx_dma_off
                cli
                mov     tx_vector,offset nul_routine
                mov     recv_vector,offset nul_routine
                sti
                ret COMM_MODE       ENDP
        ;
        ;&&&&&&&&&&&&&&&&&&&&&&&&&&&&&&&&&&&&&&&&&&&&&&&&&&&&&
        ;
        SET_AIC_BANDS       PROC   NEAR
        ; set up the AIC
                lea     si,init_aic_tx96_rx96
                test    tx_flags,b0
                jnz     tx96
                lea     si,init_aic_tx48_rx48
                test    recv_flags,b0
```

59

```
                jz      init_interface
                lea     si,init_aic_tx48_rx96
                jmp     short init_interface
        tx96:
                test    recv_flags,b0
                jnz     init_interface
                lea     si,init_aic_tx96_rx48
        init_interface:
                call    init_aic
                ret SET_AIC_BANDS   ENDP
        ;
        ;**********************************************************
        ;
        TX_DMA_OFF      PROC    NEAR IF board
        ; disable DMA channels 1
                mov     dx,wr_single_mask
                mov     al,00000101b            ; mask channel 1
                out     dx,al
                and     main_flags,NOT b2
            ENDIF
                ret TX_DMA_OFF      ENDP
        ;
30      ;**********************************************************
        ;
        RX_DMA_OFF      PROC    NEAR IF board
        ; disable DMA channels 2
                mov     dx,wr_single_mask
                mov     al,00000110b            ; mask channel 2
                out     dx,al
            ENDIF
                ret RX_DMA_OFF      ENDP
        ;
45      ;**********************************************************
        ;
        TX_DMA_ON       PROC    NEAR IF board
                test    main_flags,b2
```

```
                jnz     already_on

; enable DMA channels 1
                mov     dx,wr_single_mask
                mov     al,00000001b            ; unmask channel 1
                out     dx,al
                or      main_flags.b2 already_on:
            ENDIF
                ret

TX_DMA_ON    ENDP
        ;
        ;%%%%%%%%%%%%%%%%%%%%%%%%%%%%%%%%%%%%%%%%%%%%%
        ;
        RX_DMA_ON    PROC    NEAR

IF board
        ; enable DMA channels 2
                mov     dx,wr_single_mask
                mov     al,00000010b            ; unmask channel 2
                out     dx,al
            ENDIF ret RX_DMA_ON    ENDP
        ;
        ;%%%%%%%%%%%%%%%%%%%%%%%%%%%%%%%%%%%%%%%%%%%%%
        ;
        ANSWERING_MACHINE PROC   NEAR
        .data
                record_file   db     'msg1.dat',0
                announce_file db     'announce.dat',0
        .code
                test    main_flags.b5
                jz      yes_answer call    speaker_on lea     dx,announce_file
                call    playback_msg call    speaker_off
                ret yes_answer:
                call    off_hook
```

61

```
                call    speaker_off mov     ax,50
                call    init_timer
        wait_for_timer:
                test    recv_flags,b5
                jz      wait_for_timer lea     si,outgoing_msg
                call    window_flip lea     dx,out_msg
                call    playback_msg mov     freq,tone_1500
                mov     ax,100                  ; 1/2 second
                call    send_tones lea     si,outgoing_msg
                call    window_flip call    setup_loop_current lea     si,recording_msg
                call    window_flip lea     dx,record_file
                call    record_msg lea     si,recording_msg
                call    window_flip call    on_hook lea     bx,record_file
                inc     byte ptr [bx+3]

ret

ANSWERING_MACHINE ENDP
        ;
        ;%%%%%%%%%%%%%%%%%%%%%%%%%%%%%%%%%%%%%%%%%%%%%%%%%%%
        ;
        ORIGINATE_MODE_INIT     PROC    NEAR
                IF board
                and     tx_flags,0fffeh         ; tx low
                or      recv_flags,1h           ; recv_high
                ELSE
        ;       or      tx_flags,1              ; tx high
```

62

```
;       or      recv_flags,1            ; rx high
        and     tx_flags,0fffeh
        and     recv_flags,0fffeh
      ENDIF call    init_comm_screen and     main_flags,NOT b0
        call    init_tx
        call    init_recv or      recv_flags,08h          ; data mode
        cmp     dbox_ok,0
        je      no_dbox
        and     recv_flags,0fff7h
        call    init_dbox
no_dbox:

IF board
        call    off_hook
        call    speaker_on call    set_aic_bands
        call    init_dma call    setup_loop_current cli
        mov     ax,150
        call    init_timer
        mov     tx_vector,offset tx1224
        mov     recv_vector,offset demod
; enable DMA channel 2  RECV DMA
        call    rx_dma_on
        sti wait_timer:
        test    recv_flags,b5
        jz      wait_timer
        call    speaker_off
        mov     rx_char_in,offset rx_char_buf_start
        mov     rx_char_out,offset rx_char_buf_start
    ENDIF
        ret
ORIGINATE_MODE_INIT     ENDP
;
;**************************************************************
;
SETUP_LOOP_CURRENT      PROC    NEAR
```

```
            and     main_flags,NOT( b3 OR b4 )      ; set up loop loss
            mov     dx,modem_board
            in      al,dx
            test    al,b0
            jz      got_loop_current
            or      main_flags,b3                   ; ignore loop loss
        got_loop_current:
            ret
        SETUP_LOOP_CURRENT      ENDP
        ;
        ;%%%%%%%%%%%%%%%%%%%%%%%%%%%%%%%%%%%%%%%%%%%%%%%%%
        ;
        NEW_PARITY  PROC  NEAR
            mov     ax,main_flags
            and     ax,0700h
            inc     ah
            and     ah,07h
            cmp     ah,1
            jne     update_parity
            mov     ah,4            ; make sure parity bit is set
        update_parity:
            and     main_flags,0f8ffh
            or      main_flags,ax
            call    print_parity
            ret NEW_PARITY  ENDP
        ;
        ;%%%%%%%%%%%%%%%%%%%%%%%%%%%%%%%%%%%%%%%%%%%%%%%%%
        ;
        MESSAGING_SYSTEM   PROC   NEAR
        .data
            done            db      0
            phone_number1   db      9,8,2,5,2,4,0,0ffh
        ;   phone_number1   db      9,2,9,9,8,4,4,0ffh
            file_1          db      'file1.dat',0
            file_2          db      'file2.dat',0
            end_file  db    'file3.dat',0
            file_3          db      'casey.dat',0
            response_msg    db      'msg1.dat',0
                            dw      0ffffh
        .code
        ; first dial the number
            lea     si,phone_number1 push    si
        call_loop:
          IF board
```

```
            call    off_hook
            call    speaker_on
            mov     ax,2 * 100        ; 2 sec.
            call    init_timer
    off_hook_wait:
            test    recv_flags,b5
            jz      off_hook_wait pop     si dial_loop:
            lodsb
            cmp     al,0ffh
            je      dial_done
            xor     ah,ah
            mov     bx,ax
            mov     ax,7
            push    si
            call    dtmf
            pop     si
            jc      dial_done mov     ax,7              ; 70 ms
            call    init_timer inter_digit_wait:
            test    recv_flags,b5
            jz      inter_digit_wait jmp     short dial_loop dial_done:
            comment !
            call    init_callp
            mov     cx,28
    get_ring:
            mov     ah,1
            int     16h
            jnz     key_hit
            push    cx
            call    get_callp
            test    al,1
            jz      wait_ring
            pop     cx
            dec     cx
            jcxz    got_ring
            jmp     short get_ring
    wait_ring:
            pop     cx
```

```
                mov     cx,28
                jmp     short get_ring
        got_ring:
        ; wait for 4 seconds of silence
                mov     cx,112
        get_silence:
                mov     ah,1
                int     16h
                jnz     key_hit
                push    cx
                call    get_callp
                test    al,1
                jnz     no_silence
                pop     cx
                dec     cx
                jcxz    got_silence
                jmp     short get_silence
        no_silence:
                pop     cx
                mov     cx,112
                jmp     short get_silence got_silence:
                !
                mov     ah,0
                int     16h lea     dx,file_1
                call    playback_msg call    get_touch_tone lea     dx,file_2
                call    playback_msg lea     dx,file_3
                call    playback_msg lea     dx,end_file
                call    playback_msg mov     freq,tone_1500
                mov     ax,100              ; 1/2 second
                call    send_tones call    setup_loop_current lea     dx,response_msg
                call    record_msg
```

```
                call    on_hook
            ELSE
        key_hit:
            ENDIF
                mov     ah,0
                int     16h
                ret

MESSAGING_SYSTEM  ENDP

END

.model small
        .286
;$$$$$$$$$$$$$$$$$$$$$$$$$$$$$$$$$$$$$$$$$$$$$$$$$$
;
;       INTS is the interrupt routines
;
;       This routine contains the basic interrupt driver for the SOFTMODEM.
;       Tx_vector and rx_vector point to the routines to be performed during
;       the interrupt.  This module also contains the ring detect code.
;
;$$$$$$$$$$$$$$$$$$$$$$$$$$$$$$$$$$$$$$$$$$$$$$$$$$

include     equates public      softmodem,init_timer,timer_10ms
                public      processed,nul_routine
                public      recv_vector,tx_vector,int_flags
                public      wedge_int,disable_int,ring_detect
                public      ring_state,no_ring_state,timer_reload
                public      timer_tic extrn tx_dma_off:near,rx_dma_off:near extrn recv_flags:word,main_flags:word .data
                int_flags       db      ?
;               int_flags.0 = 1 ring detected ring_state      dw      ?       ; ring detect state variable
                state_count     db      ?
                cycle_count     db      ?

old_comint      dd      ?
                recv_vector     dw      ?
                tx_vector       dw      ?

timer_10ms      dw      ?       ; ten MS timer
```

```
            timer_tic       db      ?       ; interrrupt counter
            timer_reload    db      ?
            processed       db      ?       ; data has been sent or received
            in_int          db      0
    .code
    ;
    ;$$$$$$$$$$$$$$$$$$$$$$$$$$$$$$$$$$$$$$$$$$$$$$$$$$$
    ;
    SOFTMODEM       PROC    NEAR pusha                   ; save context
            push    es
            push    ds sti
            mov     al,20h
            out     20h,al mov     dx,@data
            mov     ds,dx cmp     in_int,0
            jne     exit_int mov     in_int,0ffh modem_loop:
            mov     processed,0
            mov     ax,recv_vector
            call    ax
            mov     ax,tx_vector
            call    ax
            cmp     processed,0
            jne     modem_loop mov     dx,modem_board
            in      al,dx
            sal     al,4
            and     ax,b4
            or      main_flags,ax           ; if one then will latch it ; ten MS timer routine
            dec     timer_tic
            jnz     timer_done mov     al,timer_reload
            mov     timer_tic,al dec     timer_10ms
            jnz     timer_done
```

```
                or      recv_flags,20h
        timer_done:
                mov     in_int,0
        exit_int:
                pop     ds              ; restore context
                pop     es
                popa ; interrupt exit
                iret SOFTMODEM       ENDP
        ;
        ;%%%%%%%%%%%%%%%%%%%%%%%%%%%%%%%%%%%%%%%%%%%%%%%%
        ;
        INIT_TIMER      PROC    NEAR cli
                mov     timer_10ms,ax
                and     recv_flags,0ffdfh
                mov     al,6
                test    recv_flags,b0
                jnz     high_band
                shr     al,1
        high_band:
                mov     timer_tic,al
                mov     timer_reload,al
        nul_routine:
                sti
                ret INIT_TIMER      ENDP
        ;
        ;%%%%%%%%%%%%%%%%%%%%%%%%%%%%%%%%%%%%%%%%%%%%%%%%
        ;
        WEDGE_INT       PROC    NEAR
            IF board
        ; wedge int 0bh ---- COM 2 INT
                in      al,21h                  ; set interrupt controller chip
                or      al,00001000b            ; disable com 2 int
                out     21h,al mov     al,0bh                  ; COM 2 interrrupt
                mov     ah,35h                  ; get current vector
                int     21h
                mov     word ptr old_comint,bx
                mov     word ptr old_comint[2],es
                mov     al,0bh
```

```
                mov     ah,25h                  ;set new vector
                lea     dx,softmodem
                push    ds
                push    cs
                pop     ds
                int     21h
                pop     ds in      al,21h                  ; set interrupt controller chip
                and     al,11110111B            ; enable com 2 int
                out     21h,al
            ENDIF
                ret
        WEDGE_INT   ENDP
        ;
        ;%%%%%%%%%%%%%%%%%%%%%%%%%%%%%%%%%%%%%%%%%%%%%%%%%%
        ;
        DISABLE_INT PROC   NEAR
            IF board
                in      al,21h                  ; set interrupt controller chip
                or      al,00001000b            ; disable com 2 int
                out     21h,al
                mov     tx_vector,offset nul_routine
                mov     recv_vector,offset nul_routine mov     dx,word ptr old_comint
                mov     ax,word ptr old_comint[2]
                push    ds
                mov     ds,ax
                mov     al,0bh
                mov     ah,25h                  ;set new vector
                int     21h
                pop     ds call    rx_dma_off
                call    tx_dma_off
            ENDIF
                ret
        DISABLE_INT ENDP
        ;
        ;%%%%%%%%%%%%%%%%%%%%%%%%%%%%%%%%%%%%%%%%%%%%%%%%%%
        ;
        RING_DETECT PROC   NEAR mov     dx,modem_board
                in      al,dx
                mov     bx,ring_state
                call    bx
```

```
                ret no_ring_state:
                mov     cycle_count,5
                test    al,bl
                jnz     no_ring
                mov     ring_state,offset ring1
        no_ring:
                ret
10
        ring1:
                test    al,bl
                jnz     abort_ring              ; got a spike
                mov     state_count,21          ; 35 ms
                mov     ring_state,offset wait_low    ; low long enough
                                                ; 1.667ms to 3.3ms
                ret
        abort_ring:
                mov     ring_state,offset no_ring_state
                ret wait_low:
        ; no manual ring check so can be low for 35ms without a problem
        ; if it stays low for that long then abort the ring and start over
                test    al,bl
                jnz     went_high
                dec     state_count
                jz      abort_ring              ; low for greater than expected
                ret
        went_high:
                mov     ring_state,offset wait_high
                mov     state_count,20          ; can't be high more than 33.3ms
                ret
        wait_high:
                test    al,bl
                jz      count_cycle
                dec     state_count             ; went high before 5 cycles
                jz      abort_ring
                ret count_cycle:
                dec     cycle_count
                jz      got_ring
                mov     ring_state,offset ring1
                ret
        got_ring:
                mov     state_count,105         ; 175ms of no activity for ring to be
                                                ; complete
                mov     ring_state,offset wait_end
```

71

```
                ret wait_end:
                test    al,bl
                jnz     count_it
                mov     state_count,105
                ret
        count_it:
                dec     state_count
                jz      ring_done
                ret
        ring_done:
                or      int_flags,1      ; set got ring flag
                mov     ring_state,offset no_ring_state
                ret RING_DETECT ENDP
                END
        .model small
        .286
        ;%%%%%%%%%%%%%%%%%%%%%%%%%%%%%%%%%%%%%%%%%%%%%%
        ;
        ;       Receive filter
        ;
        ;       This module uses a special filter algorithm for
        ;       band and phase splitting of the receive samples.
        ;
        ;       Receive samples are accumulated at a rate of 9600 per second
        ;       for high band and 4800 per second for the low band.
        ;
        ;       The receive buffer is 8192 words long as is the transmit buffer.
        ;
        ;%%%%%%%%%%%%%%%%%%%%%%%%%%%%%%%%%%%%%%%%%%%%%% include equates public     filter_pq,rx_out,delay_ptr
                public     rx_in,baudlp_vector,save_sl
                public     r_a2_delay,i_a2_delay
                public     buffer_in,buffer_out,interp_a0,interp_a1,quad_count
                public     real_buffer,imag_buffer extrn agc_average:word
                extrn eqr_delay:word
                extrn eqi_delay:word
                extrn rx_sample_segment
                extrn recv_flags:word,baud_x:word
                extrn agc_speed:word
                extrn agc_mant:word
                extrn temp_x:word,temp_y:word
```

```
                extrn   agc_xsube:byte delay_length    equ     256

        .data
                rx_out          dw      ?
                rx_in   dw      ?

; the following are the baud loop interpolator variables
                baudlp_vector   dw      ?       ; jump for baud loop interpolator quad_count      dw      ?       ; update coeff count buffer_in       dw      ?
                buffer_out      dw      ?
                real_buffer     dw      4 dup(?)        ; real equalizer input buffer
                imag_buffer     dw      4 dup(?)        ; imaginary buffer real_sl         dw      ?               ; interpolator delay lines
                imag_sl         dw      ?

interp_a0       dw      ?       ; interpolator coefficients
                interp_a1       dw      ?

                old_x   dw      ?

;       EVENDATA
        ;       rx_samples_start        label word
        ;       rx_sample_buf   dw      8192 dup(?)
        ;       rx_samples_end          label word

; REAL DELAY LINES delay_ptr       dw      ?
35
                r_b1_z1                 dw      ?
                r_b1_z2                 dw      ?

r_a2_delay_z1           dw      ?
                r_a2_delay      dw      delay_length-1 dup(?)
                r_a2_delay_end0         dw      ?
                r_a2_delay_end1         dw      ?

r_b2_delay_z1           dw      ?
                r_b2_delay      dw      delay_length-1 dup(?)
                r_b2_delay_end0         dw      ?
                r_b2_delay_end1         dw      ?

r_a3_delay_z1           dw      ?
                r_a3_delay      dw      delay_length-1 dup(?)
```

73

```
              r_a3_delay_end0    dw      ?
              r_a3_delay_end1    dw      ?

; IMAGINARY DELAY LINES
              i_a1_z1            dw      ?
              i_b1_z1            dw      ?
              i_b1_z2            dw      ?

i_a2_delay_z1      dw      ?
              i_a2_delay   dw    delay_length-1 dup(?)
              i_a2_delay_end0    dw      ?
              i_a2_delay_end1    dw      ?

i_b2_delay_z1      dw      ?
              i_b2_delay   dw    delay_length-1 dup(?)
              i_b2_delay_end0    dw      ?
              i_b2_delay_end1    dw      ?

i_a3_delay_z1      dw      ?
              i_a3_delay   dw    delay_length-1 dup(?)
              i_a3_delay_end0    dw      ?
              i_a3_delay_end1    dw      ?

.code

FILTER_PQ   PROC   NEAR

; filter and phase split 8 or 16 samples
              mov   ch,4         ; four times through the loop mov   es,rx_sample_segment
              mov   si,rx_out    ; filter sample pointer
       ;      mov   di,equalizer_in  ; equalizer delay line pointer ; filter 4 or 2 samples until we have a sample ready for the second
       ; stage. Execute the second stage and then do the same for the
       ; imaginary filter_loop:

;*********************************************************
       ;
       ; THE FIRST STAGE OF THE RECV FILTER IS:
       ;
       ; IN ——[ X ]————————————[ + ]————————————————— OUT
       ;         |              |
       ;       COS or           |
       ;       -SIN  [ Z ]——————|——————[ Z ]
       ;              |                   |
       ;              |_____|
       ;
```

74

```
        ;                              ┌───┐
        ;                              │ Z │
        ;                          ┌───┤───┘
        ;                          │ X │
        ;                          └───┘
 5      ;                           -1/4
        ;
        ;       COS = 1/4,0,-1/4,0,...    -SIN = 0,-1/4,0,1/4,...
        ;****************************************************
                mov     ax,es:[si]
                add     si,4            ; skip the next sample because cos = 0
                sar     ax,2

                test    recv_flags,b0
                jnz     hi_stage1 low_stage1:
                test    ch,1
                jz      no_neg
                neg     ax
        no_neg:
                mov     dx,r_b1_z1      ; out1 = 1/4X0 + Z1 - 1/4*Z2
                add     dx,ax
                sar     r_b1_z2,2
                sub     dx,r_b1_z2      ; out1
                mov     r_b1_z2,dx
                add     ax,dx           ; out2 = 1/4X0 + out1 - 1/4*Z1
                sar     r_b1_z1,2
                sub     ax,r_b1_z1
                mov     r_b1_z1,ax      ; first stage pass two done
                jmp     short stage2 hi_stage1:
                mov     bx,ax           ; 1/4 X0 --> BX
                add     ax,r_b1_z1      ; 1/4 X0 + z1
                sar     r_b1_z2,2
                sub     ax,r_b1_z2      ; out1 = 1/4X0 + Z1 + (-1/4*Z2)
                mov     dx,ax           ; dx = out1
                add     ax,bx           ; + 1/4 X0
                sar     r_b1_z1,2
                sub     ax,r_b1_z1      ; out2 = 1/4X0 + out1 + (-1/4*Z1)
                mov     bx,ax           ; bx = out2
                mov     ax,es:[si]      ; get X2 * -1/4
                add     si,4
                sar     ax,2
                neg     ax
                sar     dx,2            ; -1/4 * out1
                neg     dx
                xchg    ax,dx           ; dx = -1/4 * X2
```

75

```
            add     ax,bx               ; -1/4 X2 + B2/2 - B3
            add     ax,dx               ; out3
            mov     r_b1_z2,ax          ; save in Z2
            add     ax,dx               ; out4 = -1/4X2 + out3 - 1/4out2
            mov     dx,bx
            sar     dx,2
            sub     ax,dx
            mov     r_b1_z1,ax
            add     ax,bx               ; input to second stage = out4 + out2
            sar     ax,1                ; 1/2 stage2:
            sar     ax,3                ; second stage scalar 1/8

            mov     bx,delay_ptr
            mov     r_a2_delay[bx+2],ax ; store input into the delay line mov     dx,r_a2_delay[bx]   ; scalar * OUT + ( 2 * r_a2_z1)
            sal     dx,1
            add     ax,dx
            add     ax,r_a2_delay[bx-2] ; + r_a2_z2

; calculate OUT1
            add     ax,r_b2_delay[bx]   ; add Z1
            mov     dx,r_b2_delay[bx-2]
            sar     dx,1                ; + ( -.5 * B2 )
            sub     ax,dx
            mov     r_b2_delay[bx+2],ax ; store result into the delay line
            sar     ax,2                ; 1/4
            mov     dx,r_b2_delay[bx]   ; + ( 1/2 * Z1 )
            sar     dx,1
            add     ax,dx
            mov     dx,r_b2_delay[bx-2] ; + Z2/4
            sar     dx,2
            add     ax,dx sar     ax,1
            mov     r_a3_delay[bx+2],ax
            add     ax,r_a3_delay[bx-2] ; + Z3
            mov     temp_x,ax real_done:
    ; AX holds the filter and phase split real output
            push    ax
            test    agc_speed,b4
            jz      not_narrow
            sar     ax,3                ; /128 total
    not_narrow:
            sar     ax,4                ; /16
```

```
        ; get the absolute value
                jns     r_positive
                neg     ax
        r_positive:
                add     agc_average,ax
                pop     ax ; AGC AX here
                imul    agc_mant
10              mov     cl,agc_xsube
                sal     dx,cl comment     !
                test    ch,b0
                jnz     no_save
                mov     eqr_delay[di],dx
                jmp     short do_imaginary no_save:
        ; do baud loop integrator calculations
                or      dx,dx            ; set the sign bit
                jns     pos_real
                neg     dx
        pos_real:
                sar     dx,5             ; /32
                test    ch,bl            ; are we at RX1 or RX0
                jz      add_it
                neg     dx               ; -RX1
        add_it:
                add     baud_sum,dx
                !

mov     di,dx            ; save in DI
        do_imaginary:
        ; have completed 4 ( or 2 ) input samples for the real delay line.
        ; Now do the same for the imaginary.

                mov     si,rx_out        ; filter sample pointer add     si,2             ; skip the fist sample because sin = 0
                mov     ax,es:[si]
                add     si,2
                sar     ax,2 test    recv_flags,b0
                jnz     hi_stage1_i
                test    ch,b0
```

```
                jnz     no_neg2
                neg     ax
        no_neg2:
                mov     dx,i_al_z1          ; A1
 5              mov     i_al_z1,ax          ; save for the next loop
                add     dx,i_bl_z1
                sar     i_bl_z2,2
                sub     dx,i_bl_z2
                mov     i_bl_z2,dx          ; out1
10              add     ax,dx               ; + X0 * 1/4 - OUT
                sar     i_bl_z1,2
                sub     ax,i_bl_z1
                mov     i_bl_z1,ax 15      ; first stage pass two done
                jmp     short stage2_i hi_stage1_i:
                neg     ax                  ; the first sample is a 0
                mov     dx,ax               ; save for the next loop
                mov     ax,i_al_z1
                add     ax,i_bl_z1          ; out1 = in_z1 + out_z1 + (-1/4*out_z2)
                sar     i_bl_z2,2
                sub     ax,i_bl_z2
                mov     bx,ax               ; out1
                add     ax,dx               ; out2 = in + out1 + (-1/4*out_z1)
                sar     i_bl_z1,2
                sub     ax,i_bl_z2          ; out2
                add     dx,ax               ; out3 = in + out2 + (-1/4*out1)
                sar     bx,2
                sub     dx,bx               ; out3
                mov     i_bl_z2,dx          ; save out3 in out_z2
                mov     dx,ax               ; dx = out2
                mov     bx,ax
                add     si,2                ; skip sample 2
                mov     ax,es:[si]          ; get sample 3
                add     si,2
                sar     ax,2                ; in3
                mov     i_al_z1,ax          ; save for next loop
                add     ax,i_bl_z2          ; out3
                sar     bx,2
                sub     ax,bx               ; out4
                mov     i_bl_z1,ax
                add     ax,dx               ; input to second stage = out4 + out2
                sar     ax,1 stage2_i:
                sar     ax,3                ; scaler for second stage
                mov     bx,delay_ptr
```

78

```
              mov    i_a2_delay[bx+2],ax      ; store input into the delay line mov    dx,i_a2_delay[bx]  ; scalar * OUT + ( 2 * i_a2_z1)
              sal    dx,1
              add    ax,dx
              add    ax,i_a2_delay[bx-2]      ; + i_a2_z2

; calculate OUT1
              add    ax,i_b2_delay[bx] ; add Z1
              mov    dx,i_b2_delay[bx-2]
              sar    dx,1                    ; + ( -.5 * B2 )
              sub    ax,dx
              mov    i_b2_delay[bx+2],ax      ; store result into the delay line
             sar    ax,2                    ; 1/4
              mov    dx,i_b2_delay[bx] ; + ( 1/2 * Z1 )
              sar    dx,1
              add    ax,dx
              mov    dx,i_b2_delay[bx-2]     ; + Z2
              sar    dx,2
              add    ax,dx sar    ax,1
              mov    i_a3_delay[bx+2],ax
              add    ax,i_a3_delay[bx-2]     ; + Z3
              mov    temp_y,ax imag_done:
      ; AX holds the filter and phase split imaginary output
              push   ax
              test   agc_speed,b4
              jz     wideband_agc
              sar    ax,3             ; /128 total
      wideband_agc:
              sar    ax,4             ; /16
      ; get the absolute value
              jns    i_positive
              neg    ax
      i_positive:
              add    agc_average,ax
              pop    ax ; AGC AX here
              imul   agc_mant
 45           mov    cl,agc_xsube
              sal    dx,cl comment     !
              test ch,b0
              jnz    no_save_i
```

```
            mov     eqi_delay[di],dx
            add     di,2
            jmp     short update_ptr
    no_save_i:
    ; do the baud loop integrator calculations
            or      dx,dx
            jns     pos_imaginary
            neg     dx
    pos_imaginary:
            sar     dx,5            ; /32
            test    ch,bl
            jz      add_imaginary   ; RX0 or RX1?
            neg     dx              ; RX1
    add_imaginary:
            add     baud_sum,dx
            !

mov     ax,baudlp_vector
            call    ax
    update_ptr:
            add     delay_ptr,2 mov     rx_out,si
            dec     ch
            jz      baud_time_done
            jmp     filter_loop baud_time_done:
    ;       add     equalizer_in,4          ; set for the next baud time
            cmp     si,rx_samples_length
            jne     chk_end_delay mov     rx_out,0
    chk_end_delay:
            cmp     delay_ptr,(delay_length * 2 )
            jne     no_delay_shift mov     delay_ptr,0
    ; shift the delay lines from the end to the beginning
            mov     ax,r_a2_delay_end0
            mov     r_a2_delay_z1,ax
            mov     ax,r_a2_delay_end1
            mov     r_a2_delay,ax
            mov     ax,r_b2_delay_end0
            mov     r_b2_delay_z1,ax
            mov     ax,r_b2_delay_end1
            mov     r_b2_delay,ax
```

```
            mov     ax,r_a3_delay_end0
            mov     r_a3_delay_z1,ax
            mov     ax,r_a3_delay_end1
            mov     r_a3_delay,ax ; IMAGINARY DELAY LINES
            mov     ax,i_a2_delay_end0
            mov     i_a2_delay_z1,ax
            mov     ax,i_a2_delay_end1
            mov     i_a2_delay,ax mov     ax,i_b2_delay_end0
            mov     i_b2_delay_z1,ax
            mov     ax,i_b2_delay_end1
            mov     i_b2_delay,ax mov     ax,i_a3_delay_end0
            mov     i_a3_delay_z1,ax
            mov     ax,i_a3_delay_end1
            mov     i_a3_delay,ax no_delay_shift:
            ret FILTER_PQ    ENDP
    ;
    ;%%%%%%%%%%%%%%%%%%%%%%%%%%%%%%%%%%%%%%%%%%%%%%
    ;
    INTERPOLATOR_ROUTINES    PROC    NEAR save_s1:
            mov     imag_s1,dx
            mov     real_s1,di
            mov     baudlp_vector,offset save_s0
            ret save_s0:
    ; imaginary sample is in DX
    ; real sample is in DI
            mov     baudlp_vector,offset save_s1
            dec     quad_count
            jz      new_coeff
    compute_equalizer:
            mov     bx,buffer_in
    ; compute imaginary first
            push    cx
            mov     ax,dx
            imul    interp_a0           ; A0 * S0
            mov     cx,dx
            mov     ax,imag_s1
```

```
              imul    interp_a1           ; A1 * S1
              add     cx,dx
              sal     cx,1
              mov     imag_buffer[bx],cx
5     ; compute the real
              mov     ax,di
              imul    interp_a0           ; A0 * S0
              mov     cx,dx
              mov     ax,real_s1
10            imul    interp_a1           ; A1 * S1
              add     cx,dx
              sal     cx,1
              mov     real_buffer[bx],cx   ; store in the real buffer
              add     buffer_in,2
              and     buffer_in,07h
              pop     cx
              ret new_coeff:
              mov     quad_count,32
              mov     ax,old_x
              xor     ax,baud_x
              jns     same_sign           ; if old and new have the same
                                          ; sign then no rollover
      ; could have rolled over --- or passed through zero so find out
              mov     ax,baud_x           ; if baud_x < .7 then no rollover
              cmp     ax,0
              jge     pos_int
              neg     ax
              jns     pos_int             ; special case when baud_x - 8000h
              dec     ax
      pos_int:
              cmp     ax,5998h            ; .7
              jl      same_sign cmp     baud_x,0
              jge     zero_to_one
      ; compute an extra P
              mov     bx,buffer_in
      ; compute imaginary first
              push    cx
              push    dx
              mov     ax,dx
              imul    interp_a0           ; A0 * S0
              mov     cx,dx
              mov     ax,imag_s1
              imul    interp_a1           ; A1 * S1
50            add     cx,dx
```

82

```
              sal    cx,1
              mov    imag_buffer[bx],cx
       ; compute the real
              mov    ax,di
 5            imul   interp_a0           ; A0 * S0
              mov    cx,dx
              mov    ax,real_s1          ; A1 * S1
              imul   interp_a1
              add    cx,dx
              sal    cx,1
              mov    real_buffer[bx],cx  ; store in the real buffer
              add    buffer_in,2
              and    buffer_in,07h
              pop    dx
              pop    cx zero_to_one:
              mov    imag_s1,dx
              mov    real_s1,di
              mov    baudlp_vector,offset save_s0
       ; compute A0 and A1
              mov    ax,baud_x
              mov    old_x,ax
              sar    ax,1
              add    ax,4000h            ; 1/2
              mov    interp_a1,ax
              neg    ax
              add    ax,7fffh
              mov    interp_a0,ax
              ret same_sign:
       ; compute A0 and A1
              mov    ax,baud_x
35            mov    old_x,ax
              sar    ax,1
              add    ax,4000h            ; 1/2
              mov    interp_a1,ax
              neg    ax
              add    ax,7fffh
              mov    interp_a0,ax
              jmp    compute_equalizer
       INTERPOLATOR_ROUTINES    ENDP
              END
       .model small
       .286
       ;%%%%%%%%%%%%%%%%%%%%%%%%%%%%%%%%%%%%%%%%%%%%%%%%%
       ;
```

```
;       Main demodulator
;
;       This program is the main demodulator algorithm for 1200
;       and 2400 baud operation.
;
;       The receive samples are stored in RX_SAMPLE_BUF and are filtered,
;       AGCed, and split into equalizer samples by the file RECVFIL.asm .
;
;$$$$$$$$$$$$$$$$$$$$$$$$$$$$$$$$$$$$$$$$$$$$$$$$$$$$$

bleed_tap   macro
            lodsw           ; 5
            cwd             ; 2
            and     dl,bl   ; 2
            or      dl,bh   ; 2
            sub     ax,dx   ; 2
            stosw           ; 3
            endm absolute    macro cwd
            xor     ax,dx
            sub     ax,dx
            sar     ax,5 endm include equates public      equalizer_in,recv_flags,demod
            public      agc_average,agc_speed,recv_sample_count
            public      eqr_delay,eqi_delay
            public      init_recv,rx_char_out,rx_char_in
            public      rx_char_buf_start,rx_char_buf_end
            public      dbox_address,baud_count
            public      agc_xsube,agc_mant
            public      temp_x,temp_y,loop2_int,baud_x extrn filter_pq:near,save_s1:near
            extrn init_dbox:near,plot_point:near,get_tx_data:near
            extrn buffer_in:word,buffer_out:word
            extrn delay_ptr:word,baudlp_vector
            extrn cosine_table:word,sine_table:word
            extrn rx_out:word,rx_in:word
            extrn i_a2_delay:word,r_a2_delay:word
            extrn ds_segment:word,rx_dma_ala16:word
            extrn tx_flags:word
            extrn buffer_in:word,buffer_out:word
            extrn interp_a0:word,interp_a1:word,quad_count:word
```

```
            extrn   real_buffer:word,imag_buffer:word extrn   vid_mode:byte,x:byte,y:byte
            extrn   reverse_table:byte
            extrn   processed:byte rx_buf_len          equ     8192
            equalizer_length    equ     2048
            Cbeta1                      equ     -3072
            Cbeta2                      equ     1096
            Calpha                      equ     -3072
            receive_low_thresh          equ     0000h
            receive_high_thresh         equ     0000h
    .data
            tap_offset  dw      ?
            temp_x      dw      ?
            temp_y      dw      ?

            recv_sample_count dw ?      ; number of samples per baud time
            processed_cnt     dw  ?

eqr_delay   dw      equalizer_length dup(?) ; real equalizer delay
            eqr_end     label word
            eqi_delay   dw      equalizer_length dup(?) ; imaginary equalizer
            eqi_end     label word real_taps       dw  14 dup(?)
            imaginary_taps  dw  14 dup(?)
            equalizer_in    dw  ?       ; equalizer delay line input pointer
            baud_count  dw      ?       ; increment every baud time rzn         dw      ?       ; equalizer real output
            izn         dw      ?       ; eqiulizer imaginary output rym         dw      ?       ; rotated equalizer output
            iym         dw      ?

            r_error         dw  ?       ; real error vector
            i_error         dw  ?       ; imaginary error vector dec_r       dw      ?       ; closest V22 point - real
            dec_i       dw      ?       ; V22 point - imaginary
            alpha       dw      ?       ; tap update speed aren        dw      ?       ; alpha * ren
            aien        dw      ?       ; alpha * ien
```

```
             ierr        dw    ?       ; counter rotated error vector imag.

recv_flags  dw    ?
       ;     bit 0       1 = recv high band
       ;     bit 1       1 = recv 2400 baud
       ;     bit 2       1 = got 1200 recv data
       ;     bit 3       1 = receive data on
       ;     bit 4       1 = detected 1100 ( S1 )
       ;     bit 5       1 = 10Ms timer expired
       ;     bit 6       1 = got energy
       ;     bit 7       1 = call progress timed out
       ;     bit 8       1 = looking for the end of the answer tone phi         dw    ?       ; carrier loop angle
             phase_corr  dw    ?       ; phase corrector integrator cosine      dw    ?       ; cosine(phi)
             sine        dw    ?       ; sine(phi)

recv_data   db    ?       ; demodulated data dbox_routine dw   ?

s1_counter  db    ?

decision_table  db   0bh
                             db   0ah
                             db   0dh
                             db   0fh
                             db   09h
                             db   08h
                             db   0ch
                             db   0eh
                             db   06h
                             db   04h
                             db   00h
                             db   01h
                             db   07h
                             db   05h
                             db   02h
                             db   03h prev_y3y2   db    ?
             descram_0   db    ?
             descram_1_17 dw   ?
             data_1200   db    ?

eye_menu    db    '1. equalizer output',cr,lf
                         db    '2. equalizer 0 input',cr,lf
                         db    '3. equalizer 1 input',cr,lf
```

```
            db      '4. tap 5',cr,lf
            db      '5. S1 detector',cr,lf
            db      '6. Interpolator A1',cr,lf
            db      '7. PHI',cr,lf
            db      '8. 1st order baud loop integrator',cr,lf
            db      '9. 2nd order baud loop integrator',cr,lf,'$' tap_question       db      cr,lf,'Enter tap number ( 0 - 9, A - D ):','$' rx_char_in    dw    ?
rx_char_out   dw    ?

rx_char_buf_start  label byte
rx_char_buf   db    2000 dup(?)
rx_char_buf_end    label byte r_parse_jmp   dw    ?
r_parse_data        dw    ?

agc_coeff0    dw    1460h
agc_coeff1    dw    50b7h
agc_coeff2    dw    4f50h
agc_coeff3    dw    27e1h
agc_coeff4    dw    887h energy_threshold dw ?
agc_average   dw    ?        ; agc sum
old_agc             dw    ?
agc_speed     dw    ?        ; agc countdown
agc_mant      dw    ?
agc_xsube     db    ?

baud_sum      dw    ?
loop2_int     dw    ?
loop2_cnt     db    ?
baud_x              dw    ?

baud_loop2_table db    60
            db      60
            db      30
            db      20
            db      15
            db      12
            db      10
            db      9
            db      8
            db      7
            db      6
            db      5
            db      4
```

```
                            db    3
                            db    2
            .code
            DEMOD PROC NEAR
              IF board
                   mov   dx,wr_clr_byte_ptr       ; init flag to low byte
                   out   dx,al
                   jmp   $+2
10
            ; how many words are there in the receive buffer?
                   mov   dx,dma_6_address   ; get RX in
                   in    al,dx
                   mov   cl,al
15                 jmp   $+2
                   in    al,dx
                   mov   ch,al
                   jmp   $+2

20                 mov   dx,wr_clr_byte_ptr       ; init flag to low byte
                   out   dx,al
                   jmp   $+2 mov   dx,dma_6_address
25                 in    al,dx
                   cmp   cl,al
                   je    read_ok
                   mov   cl,al
                   in    al,dx
30                 mov   ch,al
            read_ok:
                   mov   ax,rx_out
                   shr   ax,1
                   add   ax,rx_dma_alal6
35                 sub   cx,ax
                   jns   pos_diff
                   add   cx,rx_buf_len
            pos_diff:
            ;      shr   ax,1                ; word count
                   cmp   cx,recv_sample_count
                   jge   demodulate_it
                   ret
              ELSE
                   call  get_tx_data
                   jnc   demodulate_it           ; data available
                   ret
              ENDIF
            ;*******************************************************************
            *
            ;
```

```
;       DEMODULATION CODE
;
;*******************************************************************
*
demodulate_it:
        cmp     cx,processed_cnt    ; more than 1 1/2 baud times samples?
        jle     not_enough_samples  ; this will prevent further calls to
        or      processed,01h       ; demod by the interrrupt
not_enough_samples:
        inc     baud_count
        call    filter_pq           ; filter the next baud times samples
                                    ; insert into the equalizer delay lines equalizer_buf_check:                ; are there two samples in the
        mov     ax,buffer_in        ; equilizer buffer ?
        sub     ax,buffer_out
        jns     no_adj
        add     ax,08h
no_adj:
        cmp     ax,4
        jge     get_equ
        ret get_equ:
        mov     di,equalizer_in
        mov     bx,buffer_out mov     ax,real_buffer[bx]  ; RX1
        mov     eqr_delay[di],ax
        absolute                    ; take care of the baud loop integrator
        sub     baud_sum,ax mov     ax,imag_buffer[bx]  ; IX1
        mov     eqi_delay[di],ax
        absolute
        sub     baud_sum,ax add     bx,2
        and     bx,07h
        mov     ax,real_buffer[bx]  ; RX0
        mov     eqr_delay[di+2],ax
        absolute
        add     baud_sum,ax mov     ax,imag_buffer[bx]  ; IX0
        mov     eqi_delay[di+2],ax
        absolute
        add     baud_sum,ax add     equalizer_in,4
```

```
                add     bx,2
                and     bx,07h
                mov     buffer_out,bx
                test    recv_flags,b6
                jnz     got_energy mov     ax,baud_count
                and     ax,agc_speed
                jz      energy_check
        no_energy:
                jmp     equalizer_full_check
        energy_check:
                mov     ax,agc_average
                sub     ax,energy_threshold
                js      no_energy
                or      recv_flags,b6
                mov     baud_count,1
                jmp     short new_level
        got_energy:
                mov     ax,baud_count
                and     ax,agc_speed            ; every 4 or 32 baud times
                jz      check_alpha
                jmp     display_box ;**********************************************************************
        *
        ;       AGC code
        ;**********************************************************************
        * check_alpha:
                cmp     baud_count,100h
                jne     agc_tests
                mov     alpha,800h              ; slow down to 1/16 after 2 sec
        agc_tests:
                test    agc_speed,b4
                jz      wideband_agc
        ; AGC test 1
                mov     ax,old_agc
                sar     ax,1                    ; .5
                sub     ax,agc_average          ; new < .5 old then compute all new AGC
                jns     new_level ; AGC test 2
                mov     ax,old_agc
                sar     ax,1
                add     ax,old_agc              ; 1.5 old
```

90

```
            sub     ax,agc_average
            jns     wideband_agc            ; if new > 1/5 old then compute new AGC new_level:
            mov     ax,agc_average
            mov     old_agc,ax
            jmp     short compute_agc wideband_agc:
    ; get ( ALPHA * NEW ) + (( 1 - ALPHA ) * OLD )
    ; ALPHA = 1/8
            mov     ax,old_agc
            mov     bx,ax
            sar     bx,3                    ; 1/8
            sub     ax,bx                   ; 7/8 old
            mov     bx,agc_average
            sar     bx,3                    ; + 1/8 new
            add     ax,bx
            mov     old_agc,ax
    compute_agc:
            mov     agc_average,0
            mov     cl,1
    ; AX is > 0
    ; subtract one from cl because the reference is /4 but during the actual
    ; AGCing of the sample we need a * 2
    normalize:
            inc     cl
            test    ax,b14
            jnz     normalize_done
            sal     ax,1
            jmp     short normalize
    normalize_done:
            mov     agc_xsube,cl
            push    ax                      ; M
            mov     bx,ax
            imul    bx
            sal     dx,1
            push    dx                      ; M^2
            mov     ax,bx
            imul    dx
            sal     dx,1
            push    dx                      ; M^3
            mov     ax,bx
            imul    dx
            sal     dx,1                    ; M^4
            mov     bx,agc_coeff0
            mov     ax,agc_coeff4
            imul    dx                      ; A(4) * M^4
50          add     bx,dx
```

91

```
                pop     ax
                imul    agc_coeff3      ; A(3) * M^3
                sub     bx,dx
                pop     ax
                imul    agc_coeff2      ; A(2) * M^2
                add     bx,dx
                pop     ax
                imul    agc_coeff1      ; A(1) * M
                sub     bx,dx
                sal     bx,3            ; * 8 because of equation plus a * 2 because
                                        ; of the multiplies and a /2 for reference
                mov     agc_mant,bx cmp     baud_count,32   ; slow the AGC down after 32 baud times
                jne     display_box
                mov     agc_speed,1fh display_box:
                test    recv_flags,b3
                jnz     baud_loop mov     ax,dbox_routine
                call    ax
                mov     x,ah
                mov     y,bh
                call    plot_point ;*****************************************************************
        *
        ;*****************************************************************
        *

; equation is | RX0 | + | IX0 | - | RX1 | - | IX1 | + | RX2 | + ...
        ; over eight baud times
        baud_loop:
        ; do first order baud loop every 8 baud times
                mov     ax,baud_count
                and     ax,7h
                jnz     baud_loop2 cmp     baud_sum,0
                mov     ax,160
                jns     shorten
                neg     ax
        shorten:
                add     baud_x,ax mov     ax,baud_sum
                mov     baud_sum,0
```

92

```
              sar     ax,7                    ; /128
              add     loop2_int,ax
              jns     check_upper
              cmp     loop2_int,0f200h
              jge     baud_loop2
              mov     loop2_int,0f200h
              jmp     short baud_loop2
      check_upper:
              cmp     loop2_int,0f00h
              jl      baud_loop2
              mov     loop2_int,0effh baud_loop2:
              dec     loop2_cnt
              jnz     equalizer_output mov     ax,loop2_int
              or      ax,ax                   ; set sign bit
              js      add_time
              cmp     ax,0ffh
              jle     get_new_count
              add     baud_x,160
              jmp     short get_new_count add_time:
              sub     baud_x,160
              neg     ax get_new_count:
              xor     bh,bh
              mov     bl,ah
              mov     al,baud_loop2_table[bx]
              mov     loop2_cnt,al equalizer_output:
      ;****************************************************
      ;*
      ;*    equalizer update ( calculate rzn + j izn )
      ;*
      ;*    rzn = ( rx * rw ) - ( ix * iw ) summed over all taps
      ;*    izn = ( rx * iw ) + ( ix * rw )
      ;*
      ;****************************************************
              mov     bx,equalizer_in
              lea     si,real_taps ; CALCULATE ( REAL EQUALIZER DELAY 0 - 13 ) * ( REAL TAP 0 - 13 )
              lodsw                           ; rtap0
              imul    word ptr eqr_delay[bx-2]
              mov     cx,dx
```

```
        lodsw                   ; rtap1
        imul    word ptr eqr_delay[bx-4]
        add     cx,dx
        lodsw                   ; rtap2
        imul    word ptr eqr_delay[bx-6]
        add     cx,dx
        lodsw                   ; rtap3
        imul    word ptr eqr_delay[bx-8]
        add     cx,dx
        lodsw                   ; rtap4
        imul    word ptr eqr_delay[bx-10]
        add     cx,dx
        lodsw                   ; rtap5
        imul    word ptr eqr_delay[bx-12]
        add     cx,dx
        lodsw                   ; rtap6
        imul    word ptr eqr_delay[bx-14]
        add     cx,dx
        lodsw                   ; rtap7
        imul    word ptr eqr_delay[bx-16]
        add     cx,dx
        lodsw                   ; rtap8
        imul    word ptr eqr_delay[bx-18]
        add     cx,dx
        lodsw                   ; rtap9
        imul    word ptr eqr_delay[bx-20]
        add     cx,dx
        lodsw                   ; rtap10
        imul    word ptr eqr_delay[bx-22]
        add     cx,dx
        lodsw                   ; rtap11
        imul    word ptr eqr_delay[bx-24]
        add     cx,dx
        lodsw                   ; rtap12
        imul    word ptr eqr_delay[bx-26]
        add     cx,dx
        lodsw                   ; rtap13
        imul    word ptr eqr_delay[bx-28]
        add     cx,dx
; CALCULATE ( IMAGINARY EQUALIZER DELAY 0 - 13 ) * ( IMAGINARY TAP 0 - 13 )
; si already pointing to the imaginary taps
        lodsw                   ; itap0
        imul    word ptr eqi_delay[bx-2]
        sub     cx,dx
        lodsw                   ; itap1
        imul    word ptr eqi_delay[bx-4]
        sub     cx,dx
        lodsw                   ; itap2
```

```
        imul    word ptr eqi_delay[bx-6]
        sub     cx,dx
        lodsw                           ; itap3
        imul    word ptr eqi_delay[bx-8]
        sub     cx,dx
        lodsw                           ; itap4
        imul    word ptr eqi_delay[bx-10]
        sub     cx,dx
        lodsw                           ; itap5
        imul    word ptr eqi_delay[bx-12]
        sub     cx,dx
        lodsw                           ; itap6
        imul    word ptr eqi_delay[bx-14]
        sub     cx,dx
        lodsw                           ; itap7
        imul    word ptr eqi_delay[bx-16]
        sub     cx,dx
        lodsw                           ; itap8
        imul    word ptr eqi_delay[bx-18]
        sub     cx,dx
        lodsw                           ; itap9
        imul    word ptr eqi_delay[bx-20]
        sub     cx,dx
        lodsw                           ; itap10
        imul    word ptr eqi_delay[bx-22]
        sub     cx,dx
        lodsw                           ; itap11
        imul    word ptr eqi_delay[bx-24]
        sub     cx,dx
        lodsw                           ; itap12
        imul    word ptr eqi_delay[bx-26]
        sub     cx,dx
        lodsw                           ; itap13
        imul    word ptr eqi_delay[bx-28]
        sub     cx,dx sal     cx,2            ; adjust for the multiply plus 1/2 tap
        mov     rzn,cx
        lea     si,real_taps ; CALCULATE ( IMAGINARY equalIZER DELAY 0 - 13 ) * ( REAL TAP 0 - 13 )
        lodsw                           ; rtap0
        imul    word ptr eqi_delay[bx-2]
        mov     cx,dx
        lodsw                           ; rtap1
        imul    word ptr eqi_delay[bx-4]
        add     cx,dx
        lodsw                           ; rtap2
        imul    word ptr eqi_delay[bx-6]
```

```
        add    cx,dx
        lodsw                    ; rtap3
        imul   word ptr eqi_delay[bx-8]
        add    cx,dx
        lodsw                    ; rtap4
        imul   word ptr eqi_delay[bx-10]
        add    cx,dx
        lodsw                    ; rtap5
        imul   word ptr eqi_delay[bx-12]
        add    cx,dx
        lodsw                    ; rtap6
        imul   word ptr eqi_delay[bx-14]
        add    cx,dx
        lodsw                    ; rtap7
        imul   word ptr eqi_delay[bx-16]
        add    cx,dx
        lodsw                    ; rtap8
        imul   word ptr eqi_delay[bx-18]
        add    cx,dx
        lodsw                    ; rtap9
        imul   word ptr eqi_delay[bx-20]
        add    cx,dx
        lodsw                    ; rtap10
        imul   word ptr eqi_delay[bx-22]
        add    cx,dx
        lodsw                    ; rtap11
        imul   word ptr eqi_delay[bx-24]
        add    cx,dx
        lodsw                    ; rtap12
        imul   word ptr eqi_delay[bx-26]
        add    cx,dx
        lodsw                    ; rtap13
        imul   word ptr eqi_delay[bx-28]
        add    cx,dx ; CALCULATE ( REAL EQUALIZER DELAY 0 - 13 ) * ( IMAGINARY TAP 0 - 13 )
; si already pointing to the imaginary taps
        lodsw                    ; itap0
        imul   word ptr eqr_delay[bx-2]
        add    cx,dx
        lodsw                    ; itap1
        imul   word ptr eqr_delay[bx-4]
        add    cx,dx
        lodsw                    ; itap2
        imul   word ptr eqr_delay[bx-6]
        add    cx,dx
        lodsw                    ; itap3
        imul   word ptr eqr_delay[bx-8]
        add    cx,dx
```

```
            lodsw                           ; itap4
            imul    word ptr eqr_delay[bx-10]
            add     cx,dx
            lodsw                           ; itap5
            imul    word ptr eqr_delay[bx-12]
            add     cx,dx
            lodsw                           ; itap6
            imul    word ptr eqr_delay[bx-14]
            add     cx,dx
            lodsw                           ; itap7
            imul    word ptr eqr_delay[bx-16]
            add     cx,dx
            lodsw                           ; itap8
            imul    word ptr eqr_delay[bx-18]
            add     cx,dx
            lodsw                           ; itap9
            imul    word ptr eqr_delay[bx-20]
            add     cx,dx
            lodsw                           ; itap10
            imul    word ptr eqr_delay[bx-22]
            add     cx,dx
            lodsw                           ; itap11
            imul    word ptr eqr_delay[bx-24]
            add     cx,dx
            lodsw                           ; itap12
            imul    word ptr eqr_delay[bx-26]
            add     cx,dx
            lodsw                           ; itap13
            imul    word ptr eqr_delay[bx-28]
            add     cx,dx sal     cx,2            ; adjust for the multiply
            mov     izn,cx
        phase_rotation:
        ;************************************************
        ;*
        ;*      phase rotation
        ;*
        ;*      rym = ( rzn * cosphi ) - ( izn * sinphi )
        ;*      iym = ( rzn * sinphi ) + ( izn * cosphi )
        ;*
        ;************************************************
            mov     ax,rzn
            imul    cosine
            mov     bx,dx
            mov     ax,izn
            imul    sine
            sub     bx,dx
            sal     bx,2            ; sine and cosine are 1/2 scale
```

97

```
                mov     rym,bx mov     ax,rzn
                imul    sine
                mov     bx,dx
                mov     ax,izn
                imul    cosine
                add     bx,dx
                sal     bx,2        ; sine and cosine are 1/2 scale
                mov     iym,bx ;***********************************************
        ;*
        ;*      derive the error vector and the v22 point
        ;*
        ;*      error vector --- r_error + j i_error
        ;*      v22 point    --- dec_r   + j dec_i
        ;*
        ;***********************************************
                xor     bx,bx
                mov     ax,rym
                test    recv_flags,bl
                jnz     decision_2400
                jmp     decision_1200
        decision_2400:
                or      ax,ax
                js      r_negative_24

                mov     bl,2
                cmp     ax,( 44 * 256 )
                jge     big_positive_24

; real is less than 44
                sub     ax,( 22 * 256 )
                mov     r_error,ax mov     dec_r,( 22 * 256 )
                jmp     short i_decision
        big_positive_24:
        ; real is above 44
                sub     ax,( 66 * 256 )
                mov     r_error,ax
                mov     dec_r,( 66 * 256 )
                inc     bx
                jmp     short i_decision
        r_negative_24:
```

```
        xor     bl,bl
        cmp     ax,( -44 * 256 )
        jle     big_negative_24 add     ax,( 22 * 256 )
        mov     r_error,ax mov     dec_r,( -22 * 256 )
        inc     bx
        jmp     short i_decision big_negative_24:
        add     ax,( 66 * 256 )
        mov     r_error,ax mov     dec_r,( -66 * 256 )

i_decision:
        mov     ax,iym or      ax,ax
        js      i_negative_24 cmp     ax,( 44 * 256 )
        jge     imag_big

; imaginary is less than 44
        sub     ax,( 22 * 256 )
        mov     i_error,ax mov     dec_i,( 22 * 256 )
        or      bl,8
        jmp     short read_decision imag_big:
; real is above 44
        sub     ax,( 66 * 256 )
        mov     i_error,ax mov     dec_i,( 66 * 256 )
        or      bl,0ch
        jmp     short read_decision i_negative_24:
        cmp     ax,( -44 * 256 )
        jle     imag_li1 add     ax,( 22 * 256 )
        mov     i_error,ax
```

```
                mov     dec_i,( -22 * 256 )
                or      bl,4
                jmp     short read_decision 5      imag_lil:
                add     ax,( 66 * 256 )
                mov     i_error,ax mov     dec_i,( -66 * 256 )
                jmp     short read_decision decision_1200:
                or      ax,ax
                js      r_neg_1200
                sub     ax,( 49 * 256 )
                mov     r_error,ax mov     dec_r,( 49 * 256 )
                mov     bl,3
                jmp     short i_1200 r_neg_1200:
                add     ax,( 49 * 256 )
                mov     r_error,ax mov     dec_r,( -49 * 256 )
                xor     bl,bl
        i_1200:
                mov     ax,iym
                or      ax,ax
                js      i_neg_1200

                sub     ax,( 49 * 256 )
                mov     i_error,ax mov     dec_i,( 49 * 256 )
                or      bl,0ch
                jmp     short read_decision i_neg_1200:
                add     ax,( 49 * 256 )
                mov     i_error,ax
                mov     dec_i,( -49 * 256 )

read_decision:
                mov     al,decision_table[bx]
                mov     recv_data,al
```

100

```
;*****************************************************
;*
;*    counter rotate the error vector and multiply
;*    by alpha
;*
;*    equation = alpha * (( r_error + j i_error ) * ( cosphi - j sinphi))
;*
;*    aren = alpha * (( r_error * cosphi ) + ( i_error * sinphi ))
;*    aien = alpha * (( i_error * cosphi ) - ( r_error * sinphi ))
;*
;*****************************************************
        mov    cx,alpha          ; CX = alpha mov    ax,r_error
        imul   cosine
        mov    bx,dx
        mov    ax,i_error
        imul   sine
        add    bx,dx
        sal    bx,1
        mov    ax,bx
        imul   cx
        sal    dx,1
        mov    aren,dx mov    ax,i_error
        imul   cosine
        mov    bx,dx
        mov    ax,r_error
        imul   sine
        sub    bx,dx
        sal    bx,1
        mov    ax,bx
        imul   cx
        sal    dx,1
        mov    aien,dx ;*****************************************************
;*
;*    tap update loop
;*
;*    equation = rw - (( rx * aren ) + ( ix * aien ))
;*               iw - (( rx * aien ) - ( ix * aren ))
;*
;*****************************************************

; SI = Real delay line
; DI = Imaginary delay line
; BX = aren
; CX = aien
```

```
        mov     ax,baud_count
        and     ax,0fh
        jz      bleed
        jmp     do_tap_update
bleed:
        push    ds
        pop     es
        lea     si,real_taps
        mov     di,si
        mov     bl,0f8h
        mov     bh,04h REPT 28
        bleed_tap
    ENDM
        jmp     rotate do_tap_update:
        mov     cx,aien
        mov     bx,aren
        mov     si,equalizer_in
        mov     di,si
        add     si,offset eqr_delay
        add     di,offset eqi_delay ; real tap 0
        mov     ax,ds:[si-2]            ; eqr
        imul    bx                      ; * aren
        mov     bp,dx
        mov     ax,ds:[di-2]            ; eqi
        imul    cx                      ; * aien
        add     dx,bp
        sal     dx,1
        sub     real_taps[0],dx ; real tap 1
        mov     ax,ds:[si-4]            ; eqr
        imul    bx                      ; * aren
        mov     bp,dx
        mov     ax,ds:[di-4]            ; eqi
        imul    cx                      ; * aien
        add     dx,bp
        sal     dx,1
        sub     real_taps[2],dx ; real tap 2
        mov     ax,ds:[si-6]            ; eqr
        imul    bx                      ; * aren
        mov     bp,dx
```

102

```
                mov     ax,ds:[di-6]            ; eqi
                imul    cx                      ; * aien
                add     dx,bp
                sal     dx,1
                sub     real_taps[4],dx ; real tap 3
                mov     ax,ds:[si-8]            ; eqr
                imul    bx                      ; * aren
                mov     bp,dx
                mov     ax,ds:[di-8]            ; eqi
                imul    cx                      ; * aien
                add     dx,bp
                sal     dx,1
                sub     real_taps[6],dx ; real tap 4
                mov     ax,ds:[si-10]           ; eqr
                imul    bx                      ; * aren
                mov     bp,dx
                mov     ax,ds:[di-10]           ; eqi
                imul    cx                      ; * aien
                add     dx,bp
                sal     dx,1
                sub     real_taps[8],dx ; real tap 5
                mov     ax,ds:[si-12]           ; eqr
                imul    bx                      ; * aren
                mov     bp,dx
                mov     ax,ds:[di-12]           ; eqi
                imul    cx                      ; * aien
                add     dx,bp
                sal     dx,1
                sub     real_taps[10],dx ; real tap 6
                mov     ax,ds:[si-14]           ; eqr
                imul    bx                      ; * aren
                mov     bp,dx
                mov     ax,ds:[di-14]           ; eqi
                imul    cx                      ; * aien
                add     dx,bp
                sal     dx,1
                sub     real_taps[12],dx ; real tap 7
                mov     ax,ds:[si-16]           ; eqr
                imul    bx                      ; * aren
                mov     bp,dx
```

```
        mov     ax,ds:[di-16]           ; eqi
        imul    cx                      ; * aien
        add     dx,bp
        sal     dx,1
        sub     real_taps[14],dx ; real tap 8
        mov     ax,ds:[si-18]           ; eqr
        imul    bx                      ; * aren
        mov     bp,dx
        mov     ax,ds:[di-18]           ; eqi
        imul    cx                      ; * aien
        add     dx,bp
        sal     dx,1
        sub     real_taps[16],dx ; real tap 9
        mov     ax,ds:[si-20]           ; eqr
        imul    bx                      ; * aren
        mov     bp,dx
        mov     ax,ds:[di-20]           ; eqi
        imul    cx                      ; * aien
        add     dx,bp
        sal     dx,1
        sub     real_taps[18],dx ; real tap 10
        mov     ax,ds:[si-22]           ; eqr
        imul    bx                      ; * aren
        mov     bp,dx
        mov     ax,ds:[di-22]           ; eqi
        imul    cx                      ; * aien
        add     dx,bp
        sal     dx,1
        sub     real_taps[20],dx comment    !
    ; real tap 11
        mov     ax,ds:[si-24]           ; eqr
        imul    bx                      ; * aren
        mov     bp,dx
        mov     ax,ds:[di-24]           ; eqi
        imul    cx                      ; * aien
        add     dx,bp
        sal     dx,1
        sub     real_taps[22],dx ; real tap 12
        mov     ax,ds:[si-26]           ; eqr
        imul    bx                      ; * aren
```

```
                mov     bp,dx
                mov     ax,ds:[di-26]           ; eqi
                imul    cx                      ; * aien
                add     dx,bp
                sal     dx,1
                sub     real_taps[24],dx ; real tap 13
                mov     ax,ds:[si-28]           ; eqr
                imul    bx                      ; * aren
                mov     bp,dx
                mov     ax,ds:[di-28]           ; eqi
                imul    cx                      ; * aien
                add     dx,bp
                sal     dx,1
                sub     real_taps[26],dx
                !

; Process the imaginary taps
        ;               iw - (( rx * aien ) - ( ix * aren ))

; imaginary tap 0
                mov     ax,ds:[di-2]            ; eqi
                imul    bx                      ; * aren
                mov     bp,dx
                mov     ax,ds:[si-2]            ; eqr
                imul    cx                      ; * aien
                sub     dx,bp
                sal     dx,1
                sub     imaginary_taps[0],dx ; imaginary tap 1
                mov     ax,ds:[di-4]            ; eqi
                imul    bx                      ; * aren
                mov     bp,dx
                mov     ax,ds:[si-4]            ; eqr
                imul    cx                      ; * aien
                sub     dx,bp
                sal     dx,1
                sub     imaginary_taps[2],dx ; imaginary tap 2
                mov     ax,ds:[di-6]            ; eqi
                imul    bx                      ; * aren
                mov     bp,dx
                mov     ax,ds:[si-6]            ; eqr
                imul    cx                      ; * aien
                sub     dx,bp
                sal     dx,1
50              sub     imaginary_taps[4],dx
```

105

```
; imaginary tap 3
        mov   ax,ds:[di-8]            ; eqi
        imul  bx                      ; * aren
        mov   bp,dx
        mov   ax,ds:[si-8]            ; eqr
        imul  cx                      ; * aien
        sub   dx,bp
        sal   dx,1
        sub   imaginary_taps[6],dx ; imaginary tap 4
        mov   ax,ds:[di-10]           ; eqi
        imul  bx                      ; * aren
        mov   bp,dx
        mov   ax,ds:[si-10]           ; eqr
        imul  cx                      ; * aien
        sub   dx,bp
        sal   dx,1
        sub   imaginary_taps[8],dx ; imaginary tap 5
        mov   ax,ds:[di-12]           ; eqi
        imul  bx                      ; * aren
        mov   bp,dx
        mov   ax,ds:[si-12]           ; eqr
        imul  cx                      ; * aien
        sub   dx,bp
        sal   dx,1
        sub   imaginary_taps[10],dx ; imaginary tap 6
        mov   ax,ds:[di-14]           ; eqi
        imul  bx                      ; * aren
        mov   bp,dx
        mov   ax,ds:[si-14]           ; eqr
        imul  cx                      ; * aien
        sub   dx,bp
        sal   dx,1
        sub   imaginary_taps[12],dx ; imaginary tap 7
        mov   ax,ds:[di-16]           ; eqi
        imul  bx                      ; * aren
        mov   bp,dx
        mov   ax,ds:[si-16]           ; eqr
        imul  cx                      ; * aien
        sub   dx,bp
        sal   dx,1
        sub   imaginary_taps[14],dx
```

106

```
; imaginary tap 8
        mov     ax,ds:[di-18]           ; eqi
        imul    bx                      ; * aren
        mov     bp,dx
        mov     ax,ds:[si-18]           ; eqr
        imul    cx                      ; * aien
        sub     dx,bp
        sal     dx,1
        sub     imaginary_taps[16],dx ; imaginary tap 9
        mov     ax,ds:[di-20]           ; eqi
        imul    bx                      ; * aren
        mov     bp,dx
        mov     ax,ds:[si-20]           ; eqr
        imul    cx                      ; * aien
        sub     dx,bp
        sal     dx,1
        sub     imaginary_taps[18],dx ; imaginary tap 10
        mov     ax,ds:[di-22]           ; eqi
        imul    bx                      ; * aren
        mov     bp,dx
        mov     ax,ds:[si-22]           ; eqr
        imul    cx                      ; * aien
        sub     dx,bp
        sal     dx,1
        sub     imaginary_taps[20],dx comment !
; imaginary tap 11
        mov     ax,ds:[di-24]           ; eqi
        imul    bx                      ; * aren
        mov     bp,dx
        mov     ax,ds:[si-24]           ; eqr
        imul    cx                      ; * aien
        sub     dx,bp
        sal     dx,1
        sub     imaginary_taps[22],dx ; imaginary tap 12
        mov     ax,ds:[di-26]           ; eqi
        imul    bx                      ; * aren
        mov     bp,dx
        mov     ax,ds:[si-26]           ; eqr
        imul    cx                      ; * aien
        sub     dx,bp
        sal     dx,1
        sub     imaginary_taps[24],dx
```

```
; imaginary tap 13
      mov   ax,ds:[di-28]         ; eqi
      imul  bx                    ; * aren
      mov   bp,dx
      mov   ax,ds:[si-28]         ; eqr
      imul  cx                    ; * aien
      sub   dx,bp
      sal   dx,1
      sub   imaginary_taps[26],dx
      !
```

```
;******************************************************
;*
;*    rotate the imaginary eye to the real plane
;*
;*    equation = ( rym + j iym ) * ( dec_r - j dec_i )
;*    ierr = j (( iym * dec_r ) - ( rym * dec_i )) * 2
;*
;******************************************************
rotate:
; IERR is used in the phase corrector
      mov   ax,iym
      imul  dec_r
      mov   bx,dx
      mov   ax,rym
      imul  dec_i
      sub   bx,dx
      sal   bx,2        ; adjust for the multiply and add a gain of 2
      mov   ierr,bx
```

```
;***********************************************************************
*
;*
;*    new phase corrector (carrier pll update) aln 9/23/88
;*
;*    equations:
;*          phcor = phcor + (ierr * Cbeta1)
;*          phi = phi + (phcor*Cbeta2 + ierr*Calpha)
;*       Cbeta1- input coefficient to loop's 2nd order integrator
;*       Cbeta2- output coefficient of 2nd int for frequency lock limit
;*       Calpha- 1st order loop coefficent. 2nd order term is not nested
;*       inside 1st order term in this configuration.
;*       NOTE: Cbeta1 and Calpha must be negative values for stable loop
;***********************************************************************
* phase_update:
;* for V.22bis mode only. loop parameters can be determined with PLL2.BAS
;* current choices for variables are:
```

```
              mov    ax,Cbeta1
              imul   bx              ; ierr * Cbeta1
              sal    dx,1
              add    phase_corr,dx   ; phase_corr + ( ierr * Cbeta1 )
              mov    ax,Calpha
              imul   bx              ; ierr * Calpha
              mov    bx,dx
              mov    ax,Cbeta2
              imul   phase_corr      ; phase_corr * Cbeta2
              add    bx,dx
              sal    bx,1
              add    bx,phi
              mov    phi,bx
       ; sine and cosine routine
              mov    bl,bh
              xor    bh,bh
              sal    bx,1
              mov    ax,cosine_table[bx]
              mov    cx,sine_table[bx]
              sar    ax,1
              mov    cosine,ax
              sar    cx,1
              mov    sine,cx
25
      ;*********************************************************************
      *
      ;*********************************************************************
      *
30
      s1_detect:
              mov    bx,equalizer_in
              mov    ax,eqr_delay[bx-2]    ; z0
              sub    ax,eqr_delay[bx-10]   ; z4
              jns    band_pass_pos
              neg    ax
      band_pass_pos:
              sub    ax,(20 * 256)
              js     add_one
40            sub    s1_counter,4
              jns    data_decode
              mov    s1_counter,0
      add_one:
              inc    s1_counter
45            cmp    s1_counter,20
              jl     data_decode
              mov    s1_counter,20
              or     recv_flags,b4
```

;*********************************************************************
*
;*********************************************************************
*

```
data_decode:
; do differential decode
        xor     ax,ax
        mov     al,recv_data
        ror     ax,2
        mov     bl,al           ; save top two bits
        sub     al,prev_y3y2
        mov     prev_y3y2,bl
; gray decode
        test    al,bl
        jnz     no_gray
        xor     al,1
no_gray:
        and     al,3 test    recv_flags,b2        ; is there 1200 baud data from
        jnz     combine_1200_data ; the prev.baud time rol     ax,2            ; restore bl,b0 test    recv_flags,bl        ; are we at 2400 baud?
        jnz     descramble_4 and     al,0ch
        mov     data_1200,al
        or      recv_flags,4
        jmp     equalizer_full_check combine_1200_data:
        and     recv_flags,0fffbh
        or      al,data_1200
        xor     ah,ah
descramble_4:
        mov     bx,ax
        xor     dx,dx
        mov     al,reverse_table[bx]    ; put oldest bit in ax.0
        mov     dh,al           ; save for delay line
        mov     bx,descram_1_17
        xor     ax,bx
        shr     bx,3
        xor     ax,bx
        shr     bx,1
        or      bh,descram_0
        and     ax,0fh          ; descrambled data
        rol     dx,5            ; dx.0 is the last bit
```

110

```
            and     bx,1fffh
            or      bh,dh
            mov     descram_1_17,bx
            mov     descram_0,0
            test    dx,b0
            jz      no_bit_0
            mov     descram_0,10h
      no_bit_0:
            comment   !
            cmp     al,09h
            jg      hex_nums
            or      al,30h
            jmp     short print_it
      hex_nums:
            sub     al,0ah
            add     al,'A'
      print_it:
            mov     dl,al
            mov     ah,02h
            int     21h
            !

receive_parser:
            cmp     r_parse_jmp,0
            je      check_for_start mov     bx,r_parse_jmp
            jmp     bx
     check_for_start:
            cmp     ax,0fh
            jne     got_start_bit
            jmp     equalizer_full_check
     got_start_bit:
            mov     r_parse_data,ax
            mov     r_parse_jmp,offset parse_8
            jmp     equalizer_full_check
     parse_8:
            shl     ax,4
            or      r_parse_data,ax
            mov     r_parse_jmp,offset parse_12
            jmp     equalizer_full_check
      parse_12:
            mov     r_parse_jmp,0      ; default
            shl     ax,8
            or      ax,r_parse_data    ; last three baud times of data
            mov     cx,3               ; number of bits left in the high nybble
```

111

```
                shr     ax,1
                jnc     got_start
                dec     cx
                shr     ax,1
5               jnc     got_start
                dec     cx
                shr     ax,1
                jnc     got_start
                shr     ax,1
                dec     cx
        got_start:                      ; the parsed character is in al
                mov     di,rx_char_in
                mov     es,ds_segment
                stosb
                cmp     di,offset rx_char_buf_end
                jne     no_rollover
                mov     di,offset rx_char_buf_start
        no_rollover:
                cmp     di,rx_char_out   ; is the buffer full
                je      no_update
                mov     rx_char_in,di
        no_update:
                jcxz    equalizer_full_check
                dec     cx
                jcxz    test_one_bit
                dec     cx
                jcxz    test_two_bits
        test_three_bits:
                test    ah,1h
                jz      insert_bit
                test    ah,2h
                jz      insert_bit      ; AH = xxxxxd01
                test    ah,4h
                jnz     equalizer_full_check
        insert_bit:
                shl     ah,1            ; AH = xxxxxdd0
                or      ah,1h
                mov     al,ah
                xor     ah,ah
                mov     r_parse_data,ax
                mov     r_parse_jmp,offset parse_8
                jmp     equalizer_full_check test_one_bit:
                test    ah,1h
                jnz     equalizer_full_check
                mov     r_parse_data,07h ; AH = xxxxxxx0
                mov     r_parse_jmp,offset parse_8
                jmp     short equalizer_full_check
```

```
        test_two_bits:
                test    ah,1h
                jz      insert_two_bits         ; AH = xxxxxxd0
                test    ah,2h
                jnz     equalizer_full_check
                                                ; AH = xxxxxx01
        insert_two_bits:
                shl     ah,2
                or      ax,3h
                mov     al,ah
                xor     ah,ah
                mov     r_parse_data,ax
                mov     r_parse_jmp,offset parse_8

        equalizer_full_check:
                cmp     equalizer_in,( equalizer_length * 2 )
                jne     not_full ; shift the last eight samples in the equalizer delay line to the beginning
        ; and reset the input pointer.

mov     es,ds_segment
                mov     di,offset eqr_delay
        ;       mov     si,offset ( eqr_end - 16 )
                mov     si,offset ( eqr_end - 24 )
                mov     cx,12
                rep     movsw mov     di,offset eqi_delay
        ;       mov     si,offset ( eqi_end - 16 )
                mov     si,offset ( eqi_end - 24 )
                mov     cx,12
                rep     movsw
                mov     equalizer_in,24 not_full:
                jmp     equalizer_buf_check

        DEMOD ENDP
        ;
        ;************************************************************
        ;
        INIT_RECV  PROC  NEAR
                mov     agc_average,0
                mov     agc_speed,3h            ; 4 baud times
                mov     equalizer_in,24         ; 12 into the delay line at start
                mov     rx_out,0
                mov     rx_in,0
```

```
        mov     delay_ptr,0
        mov     alpha,1000h mov     recv_sample_count,16
        mov     processed_cnt,24
        mov     energy_threshold,receive_high_thresh
        test    recv_flags,b0
        jnz     clr_taps
        mov     recv_sample_count,8
        mov     processed_cnt,12
        mov     energy_threshold,receive_low_thresh
clr_taps:
; clear the taps
        push    ds
        pop     es
        lea     di,real_taps
        mov     cx,28
        xor     ax,ax
        rep     stosw mov     baud_count,ax ; zero the baud loop out
        mov     baud_sum,ax
        mov     loop2_int,ax
        mov     loop2_cnt,10
        mov     buffer_in,ax
        mov     buffer_out,ax
        mov     interp_a1,ax
        mov     interp_a0,7fffh
        mov     quad_count,32
        mov     baudlp_vector,offset save_s1 mov     dbox_routine,offset send_eye
        mov     tap_offset,10
;       mov     dbox_routine,offset tap_routine
        mov     real_taps+12,0100000000000000b      ; center tap to 1/2 mov     rx_char_in,offset rx_char_buf
        mov     rx_char_out,offset rx_char_buf mov     r_parse_jmp,0 ret

INIT_RECV  ENDP
;
;***********************************************************
;
DBOX_ROUTINES       PROC    NEAR
```

```
    send_eye:
            mov     ax,rym
            mov     bx,iym
            ret
    equ_in0:
            mov     bx,equalizer_in
            mov     ax,eqr_delay[bx-2]
            mov     bx,eqi_delay[bx-2]
            ret equ_in1:
            mov     bx,equalizer_in
            mov     ax,eqr_delay[bx-4]
            mov     bx,eqi_delay[bx-4]
            ret tap_routine:
            mov     bx,tap_offset
            mov     ax,real_taps[bx]
            mov     bx,imaginary_taps[bx]
            ret sl_routine:
            mov     bx,aien
            sal     bx,6
            mov     ax,aren
            sal     ax,6
        ;   mov     ah,al
            ret p_routine:
            mov     bx,interp_al
            mov     ax,baud_count
            mov     ah,al
            ret phi_routine:
            mov     bx,sine
            mov     ax,cosine
            ret baud_loop1_routine:
            mov     bx,baud_sum
            sal     bx,3
            mov     ax,baud_count
            mov     ah,al
            ret
    baud_loop2_routine:
```

```
                mov     bx,loop2_int
                sal     bx,2
                mov     ax,baud_count
                mov     ah,al
                ret send_temp:
                mov     ax,temp_x
                mov     bx,temp_y
                ret baud_loop_routine:
                mov     bx,equalizer_in
                mov     bx,eqr_delay[bx-2]
                mov     ax,baud_count
                mov     ah,al
                ret DBOX_ROUTINES      ENDP
        ;
        ;***********************************************************
        ;
        DBOX_ADDRESS       PROC    NEAR 25              mov     al,vid_mode ; restore the initial video mode
                mov     ah,0
                int     10h mov     dx,offset eye_menu
                mov     ah,09h
                int     21h get_key_in:
                mov     ah,0          ; get a key
                int     16h cmp     al,31h
                jne     chk_2

                mov     dbox_routine,offset send_eye
                jmp     address_done chk_2:
                cmp     al,32h
                jne     chk_3 mov     dbox_routine,offset equ_in0
                jmp     short address_done
        chk_3:
```

```
                cmp     al,33h
                jne     chk_4 mov     dbox_routine,offset equ_inl
                jmp     short address_done chk_4:
                cmp     al,34h
                jne     chk_5
        get_again:
                mov     ah,09
                mov     dx,offset tap_question
                int     21h mov     ah,0
                int     16h mov     ah,'0'
                cmp     al,'0'
                jl      get_again
                cmp     al,'9'+1
                jb      got_num
                and     al,0dfh             ; convert to upper case
                cmp     al,'A'
                jb      get_again
                cmp     al,'D'
                ja      get_again
                mov     ah,'A'-10
        got_num:
                sub     al,ah
                sal     al,1
                xor     ah,ah
                mov     tap_offset,ax mov     dbox_routine,offset tap_routine
                jmp     short address_done chk_5:
                cmp     al,35h
                jne     chk_6
                mov     dbox_routine,offset sl_routine
                jmp     short address_done chk_6:
                cmp     al,36h
                jne     chk_7
                mov     dbox_routine,offset p_routine
                jmp     short address_done
```

```
        chk_7:
                cmp     al,37h
                jne     chk_8 mov     dbox_routine,offset phi_routine
                jmp     short address_done chk_8:
                cmp     al,38h
                jne     chk_9 mov     dbox_routine,offset baud_loop1_routine
                jmp     short address_done chk_9:
                cmp     al,39h
                je      send_loop2
                jmp     get_key_in
        send_loop2:
                mov     dbox_routine,offset baud_loop2_routine address_done:
                call    init_dbox ret

DBOX_ADDRESS    ENDP
                END

.model small
        .286

;%%%%%%%%%%%%%%%%%%%%%%%%%%%%%%%%%%%%%%%%%%%%%%%%%%
;
;       DBOX --- Display box routines
;
;       DBOX initializes the screen to 640 X 350 graphics mode and
;       draws a picture of an oscilloscope display.  The routine plot_point
;       is then used to place a point on the oscilloscope.
;
;%%%%%%%%%%%%%%%%%%%%%%%%%%%%%%%%%%%%%%%%%%%%%%%%%% include    equates
        BLACK       equ     0
        BLUE        equ     1
        GREEN       equ     2
        CYAN        equ     3
        RED         equ     4
```

```
        MAGENTA             equ     5
        BROWN       equ     6
        LIGHTGRAY   equ     7
        DARKGRAY    equ     8
        LIGHTBLUE   equ     9
        LIGHTGREEN  equ     10
        LIGHTCYAN   equ     11
        LIGHTRED    equ     12
        LIGHTMAGENTA        equ     13
        YELLOW              equ     14
        WHITE       equ     15 public      init_dbox,plot_point,x,y set_color   macro new_color push    ax
        push    dx
        mov     dx,3ceh         ; clear mode 0 using set/reset
        xor     al,al
        mov     ah,new_color    ; init SET/RESET to color
        out     dx,ax
        pop     dx
        pop     ax endm scope_point struc
center              dw      0ffffh
xy          dw      0               ; the point
bit_position        db      0 center_lg   db      0               ; light gray
up_lg       db      0
down_lg             db      0
side_center_lg      db      0
side_up_lg  db      0
side_down_lg        db      0 center_dg   db      0               ; dark gray
up_dg       db      0
down_dg             db      0
side_center_dg      db      0
side_up_dg  db      0
side_down_dg        db      0 center_b    db      0               ; blue
up_b        db      0
```

119

```
        down_b           db     0
        side_center_b    db     0
        side_up_b   db   0
        side_down_b db   0
        scope_point ends .data
        color            db     ?

; defines the display box
                left             dw     ?
                top              dw     ?
                right            dw     ?
                bottom                  dw     ?
                vert_top         dw     ?
                vert_dif         dw     ?

        ; x - horizontal point   y - vertical
                x                db     ?
                y                db     ?

delta_x                 db     ?
                delta_y                 db     ?
                point_ptr   dw   ?

point0           scope_point <>
                point1           scope_point <>
                point2           scope_point <>
                point3           scope_point <>
                point4           scope_point <>
                point5           scope_point <>
                point6           scope_point <>
                point7           scope_point <> dbox_menu_start  label byte
                dbox_menu   db   ' F1   --- Display Menu',cr,lf
                            db   ' F2   --- Terminal Mode',cr,lf
                            db   ' F10  --- Hangup'
                dbox_menu_end    label byte dbox_label_start label byte
                dbox_label  db   'SOFTMODEM DISPLAY BOX'
                dbox_label_end   label byte .code
        ;
        ;**************************************************
```

```
;
        INIT_DBOX   PROC   NEAR mov     cx,8
            call    zero_points
            mov     point_ptr,0 call    scope           ; display the oscilloscope

        ;   mov     dx,3ceh
        ;   mov     ax,1005h
        ;   out     dx,ax mov     dx,3ceh         ; enable set/reset all planes
            mov     ax,0001h
            out     dx,ax mov     ax,1300h
            mov     bh,0
            mov     bl,(YELLOW XOR LIGHTGRAY OR 80h )
            mov     cx,dbox_menu_end-dbox_menu_start
            mov     dx,0000h
            push    ds
            pop     es
            mov     bp,offset dbox_menu
            int     10h mov     cx,dbox_label_end-dbox_label_start
            mov     dx,171dh
            mov     bp,offset dbox_label
            int     10h mov     dx,3ceh         ; enable set/reset all planes
            mov     ax,0f01h
            out     dx,ax mov     color,YELLOW
            ret
        INIT_DBOX   ENDP
        ;
        ;$$$$$$$$$$$$$$$$$$$$$$$$$$$$$$$$$$$$$$$$$$$$$$$$$$$$$
        ;
        SQUARE      PROC   NEAR
            push    ax
            push    bx
            push    cx
            push    dx
            push    di
```

```
        mov     dx,3ceh         ; clear mode 0 using set/reset
        xor     al,al
        mov     ah,color        ; init SET/RESET to color
        out     dx,ax
        mov     bx,top          ; up two from the corner
        sub     bx,2
        mov     ax,80           ; convert top to byte address
        imul    bx
        mov     di,ax
        mov     ax,left
        shr     ax,3            ; /8
        dec     ax              ; left corner begins one byte earlier
        add     di,ax
        mov     vert_top,di     ; save for double line mov     dx,03ceh        ; enable right two pixels
        mov     ax,0308h
        out     dx,ax ; put in the two pixels that make up the upper left corner of the box
        mov     bl,es:[di]
        stosb
        push    di              ; di is the start of the solid line
        add     di,79           ; go to next line
        mov     bl,es:[di]
; second line
        stosb
        pop     di mov     ax,0ff08h       ; enable all pixels  dx = 03ceh
        out     dx,ax mov     cx,right        ; get the number of bytes across
        sub     cx,left
        shr     cx,3            ; /8
        mov     vert_dif,cx     ; save for double line
        inc     vert_dif push    di
        push    cx
        rep     stosb           ; top line
        pop     cx
        pop     di push    cx
        add     di,80
```

```
        rep     stosb           ; next line
        pop     cx mov     dx,03ceh        ; enable left two pixels
        mov     ax,0c008h
        out     dx,ax ; put in the two pixels that make up the upper right corner of the box
        mov     dl,es:[di]
        stosb
        sub     di,81
        mov     dl,es:[di]
; second line
        stosb mov     bx,bottom
        inc     bx              ; one past the bottom of the box
        mov     ax,80           ; get the bottom left point
        imul    bx
        mov     di,ax
        mov     ax,left
        shr     ax,3
        dec     ax              ; one byte left of the box
        add     di,ax mov     dx,03ceh        ; enable right two pixels
        mov     ax,0308h
        out     dx,ax mov     dl,es:[di]
        stosb
        add     di,79           ; next line
        mov     dl,es:[di]
; second line
        stosb mov     dx,03ceh        ; enable all the pixels
        mov     ax,0ff08h
        out     dx,ax push    di              ; second bottom line
        push    cx
        rep     stosb
        pop     cx
        pop     di sub     di,80           ; second bottom line
        rep     stosb mov     dx,03ceh        ; enable left two pixels
```

123

```
              mov     ax,0c008h
              out     dx,ax mov     dl,es:[di]
              stosb
              add     di,79      ; one line down
              mov     dl,es:[di]
      ; second line
              stosb
      ; set up the map mask register to RED and also the set/reset register to reset ; the 0 and 3 planes
              mov     dx,03ceh   ; enable pixels 1 and 0
              mov     ax,0308h
              out     dx,ax ; to change the pixels to a new color must enable them in
      ; the MAP MASK register.  Use SET/RESET reg to clear or set the new color.
      ; Use the bit mask to enable the correct bits ;       mov     dx,3c4h            ; set map mask to the three planes
      ;                                  ; that need to change
      ;       mov     ax,0f02h   ; color - 4 ... RED
      ;       out     dx,ax ;       mov     dx,3ceh            ; ENABLE SET/RESET 3 planes that are zero
      ;       mov     ax,0f01h
      ;       out     dx,ax ;       mov     ah,color
      ;       xor     al,al      ; set the SET/RESET register to clear
      ;       out     dx,ax      ; the enabled planes
              add     vert_top,160    ; point to first line under top/left
              mov     di,vert_top
              mov     bx,vert_top
              mov     ax,bottom  ; line count
              sub     ax,top
              inc     ax
              mov     cx,ax
              add     bx,vert_dif ; get first line under top/right
              push    cx
      vert_loop1:
              mov     dl,es:[di]
              mov     es:[di],al
              add     di,80
              loop    vert_loop1
50
```

124

```
                mov     dx,03ceh    ; change bit mask to the two left bits
                mov     ax,0c008h
                out     dx,ax
                pop     cx
                mov     al,03h
        vert_loop2:
                mov     dh,es:[bx]
                mov     es:[bx],al
                add     bx,80
                loop    vert_loop2 pop     di
                pop     dx
                pop     cx
                pop     bx
                pop     ax ret
20
        SQUARE      ENDP
        ;
        ;$$$$$$$$$$$$$$$$$$$$$$$$$$$$$$$$$$$$$$$$$$$$$$$$$$$$$
        ;
        HORIZ_LINE  PROC    NEAR push    ax
                push    bx
                push    cx
                push    dx
                push    di mov     dx,03ceh    ; enable all the pixels
                mov     ax,0ff08h
                out     dx,ax mov     ah,color    ; enable SET/RESET to the color
                xor     al,al
                out     dx,ax
40
                mov     ax,0f01h    ; enable SET/RESET all planes
                out     dx,ax mov     ax,80       ; convert top to byte address
45              imul    top
                mov     di,ax
                mov     ax,left
                shr     ax,3        ; /8
                add     di,ax
```

```
                mov     ax,right        ; get the number of bytes across
                sub     ax,left
                shr     ax,3            ; /8
                mov     cx,ax           ; byte count rep     stosb           ; draw the line pop     di
                pop     dx
                pop     cx
                pop     bx
                pop     ax ret HORIZ_LINE      ENDP
        ;
        ;%%%%%%%%%%%%%%%%%%%%%%%%%%%%%%%%%%%%%%%%%%%%%%%%%%%
        ;
VERT_LINE       PROC    NEAR push    ax
                push    bx
                push    cx
                push    dx
                push    di mov     dx,03ceh        ; enable the left most pixel
                mov     ax,08008h
                out     dx,ax mov     ah,color        ; enable SET/RESET to the color
                xor     al,al
                out     dx,ax mov     ax,0f01h        ; enable SET/RESET all planes
                out     dx,ax mov     ax,80           ; convert top to byte address
                imul    top
                mov     di,ax
                mov     ax,left
                shr     ax,3
                add     di,ax mov     cx,bottom       ; get the number of bytes down
                sub     cx,top
                inc     cx vert_loop3:
```

```
                mov     dl,es:[di]
                mov     es:[di],al
                add     di,80
                loop    vert_loop3 mov     dx,03ceh        ; enable all the pixels
                mov     ax,0ff08h
                out     dx,ax pop     di
                pop     dx
                pop     cx
                pop     bx
                pop     ax ret VERT_LINE  ENDP
        ;
        ;%%%%%%%%%%%%%%%%%%%%%%%%%%%%%%%%%%%%%%%%%%%%%%%%
        ;
        SCOPE PROC   NEAR push    ax
                push    bx
                push    cx
                push    dx
                push    di
                push    es mov     ax,16           ; 640 x 350 graphics mode
                int     10h mov     dx,0a000h       ; segment for diaplay adapter
                mov     es,dx ; This routine changes the color of the screen using SET/RESET REGISTERS mov     dx,3ceh         ; enable set/reset all planes
                mov     ax,0f01h
                out     dx,ax xor     al,al           ; clear mode 0 using set/reset
                mov     ah,LIGHTGRAY
                out     dx,ax mov     ax,1005h        ; set to mode 0
                out     dx,ax

; CLS
```

```
        xor     di,di
        xor     ax,ax           ; write to each location
        mov     cx,14000
        rep     stosw comment !
; insert a grid
        mov     dx,03ceh        ; enable all the pixels
        mov     ax,08008h
        out     dx,ax mov     ah,RED          ; enable SET/RESET to the color
        xor     al,al
        out     dx,ax mov     ax,0f01h        ; enable SET/RESET all planes
        out     dx,ax mov     cx,28000
        mov     di,0
vert_loop4:
        mov     dl,es:[di]
        stosb
        loop    vert_loop4
        !

; center the display box on the screen
        mov     left,64
        mov     right,64+512
        mov     top,48
        mov     bottom,48+255 mov     color,BLUE
        call    square mov     bx,bottom
        inc     bx
        sub     bx,top
        shr     bx,3            ; 1/8
        mov     cx,7
        push    top             ; save top for the square
        mov     color,DARKGRAY line_loop:
        add     top,bx
        cmp     cx,4            ; skip the center line
        je      no_line1
        call    horiz_line      ; line uses top,left,right
no_line1:
        loop    line_loop
```

128

```
            pop     top
            push    left        ; save left
            mov     bx,right
            sub     bx,left
            shr     bx,3        ; 1/8
            mov     cx,7
    vline_loop:
            add     left,bx
            cmp     cx,4        ; skip the center line
            je      no_line2
            call    vert_line   ; vline uses top, bottom, and left
    no_line2:
            loop    vline_loop
     ; write the center lines
            pop     left
            mov     color,BLUE
            push    top
            mov     bx,top
            mov     ax,bottom
            sub     ax,top
            sar     ax,1        ; 1/2
            add     ax,bx
            mov     top,ax
            call    horiz_line
            pop     top mov     bx,left
            mov     ax,right
            sub     ax,bx
            sar     ax,1        ; 1/2
            add     ax,bx
            push    left
            mov     left,ax
            call    vert_line
            pop     left pop     es
            pop     di
            pop     dx
            pop     cx
            pop     bx
            pop     ax 45       ret SCOPE ENDP
    ;
    ;%%%%%%%%%%%%%%%%%%%%%%%%%%%%%%%%%%%%%%%%%%%%%%
        ;
```

```
PLOT_POINT  PROC  NEAR push    ax
            push    bx
            push    cx
            push    dx
            push    di
            push    es 10      mov     dx,0a000h   ; segment for diaplay adapter
            mov     es,dx call    restore_old
        mov     ax,127
            sub     al,y
            add     ax,top
            mov     bx,80
            imul    bx
            mov     di,ax       ; row byte count mov     ax,128
            add     al,x
            sal     ax,1        ; 512 pixels accross
            add     ax,left
    ; divide by eight and leave the remainder in dl
            mov     dl,al
            and     dl,7h
            shr     ax,3        ; /8
            add     di,ax       ; offset to correct byte ; upon entry di has the pixel address and dl has the bit position
            call    save_new    ; save the new one
            add     point_ptr,2
            and     point_ptr,0fh set_color color ; write the new pixel
        ; dl has the bit count in the correct byte
            xor     bh,bh
            mov     bl,dl
            mov     ch,dl       ; save ch = 0,2,4,6
            mov     ah,center_0[bx]
            mov     al,8
            mov     dx,03ceh    ; enable the pixel
            out     dx,ax
        mov     cl,es:[di]  ; center line
```

130

```
                mov     es:[di],cl mov     ah,center_0[bx+1]
                out     dx,ax
                add     di,80
                cmp     y,-128
                je      skip_bottom
                mov     cl,es:[di]    ; lower line
                mov     es:[di],cl skip_bottom:
                sub     di,160
                cmp     y,127
                je      skip_top
                mov     cl,es:[di]    ; upper line
                mov     es:[di],cl skip_top:
        ; If the center pixel is near the left or right side then we
        ; must fill in the pixels in the adjoining byte
        ; Because we only plot on even pixels...ch can equal 0,2,4,6
        ; pixels 2 and 4 are in the center of the byte so no extra work.

                cmp     x,-128        ; if on the left edge of the display box...skip
                je      not_left_side cmp     ch,0
                jne     not_left_side
                mov     ah,00000001b  ; setup right most pixel
                out     dx,ax dec     di            ; one left of upper row
                cmp     y,127
                je      skip_top1
                mov     cl,es:[di]    ; upper line
                mov     es:[di],cl
        skip_top1:
                add     di,160
                cmp     y,-128
                je      skip_bottom1
                mov     cl,es:[di]    ; lower line
                mov     es:[di],cl
        skip_bottom1:
                sub     di,80
                mov     ah,00000011b
                out     dx,ax
                mov     cl,es:[di]    ; center line
                mov     es:[di],cl
```

131

```
                jmp     short not_right_side not_left_side:
                cmp     x,127           ; if on right edge....skip
                je      not_right_side cmp     ch,6
                jne     not_right_side
               cmp     y,-128
                je      not_right_side mov     ah,10000000b    ; setup left most pixel
                out     dx,ax
                add     di,81           ; one row down one right
                mov     cl,es:[di]      ; lower line
                mov     es:[di],cl
       not_right_side:
                pop     es
                pop     di
                pop     dx
                pop     cx
                pop     bx
                pop     ax ret
       .data center_0        db      11100000b       ; first line is center row of the dot
                        db      11000000b       ; second is the upper and lower lines
       center_2        db      11111000b
                        db      01110000b center_4        db      00111110b
                        db      00011100b
        center_6        db      00001111b
                        db      00000111b .code
        PLOT_POINT      ENDP
        ;
        ;******************************************************
        ;
        RESTORE_OLD     PROC    NEAR
```

```
        push    ax
        push    bx
        push    cx
        push    dx
        push    di
        push    si lea     si,points
        add     si,point_ptr
        mov     ax,ds:[si]
        mov     si,ax
        lodsw
        mov     di,ax
        lodsw                   ; get the point
        mov     cx,ax           ; scope point lodsb
        xor     bh,bh
        mov     bl,al           ; bit position set_color LIGHTGRAY
        call    do_color
        set_color DARKGRAY
        call    do_color set_color BLUE
        call    do_color
no_point:
        pop     si
        pop     di
        pop     dx
35      pop     cx
        pop     bx
        pop     ax ret
        .data
        points      dw    offset point0
                    dw    offset point1
                    dw    offset point2
                    dw    offset point3
                    dw    offset point4
                    dw    offset point5
                    dw    offset point6
                    dw    offset point7
```

```
        .code
        RESTORE_OLD ENDP
        ;
        ;***********************************************
        ;
        DO_COLOR    PROC   NEAR
        ; upon entry:
        ;       DI - center byte address
        ;       SI - center byte color content address
        ;       CH - x
        ;       CL - y
        ;       BL - bit position within byte push  di           ; save center location
                push  si ; check all six sides for any dots.... if not exit
                push  si
                push  cx
                xor   ah,ah
                mov   cx,6
        any_color_loop:
                lodsb
                cmp   al,0
                jne   yes_restore
                loop  any_color_loop pop   cx
                pop   si           ; leave si at next address
                jmp   restore_exit yes_restore:
                pop   cx
                pop   si mov   dx,03ceh     ; graphics 1 and 2 address lodsb              ; center pixels
                cmp   al,0
                je    no_center mov   ah,al
                mov   al,08h
                out   dx,ax mov   al,es:[di]   ; center restore
                mov   es:[di],al no_center:
                sub   di,80        ; upper line
```

134

```
        lodsb cmp     al,0
        je      no_up cmp     cl,127          ; upper edge?
        je      no_up mov     ah,al
        mov     al,08h
        out     dx,ax           ; enable the LIGHTGRAY pixels mov     al,es:[di]      ; upper restore
        mov     es:[di],al no_up:
        add     di,160
        lodsb cmp     al,0
        je      no_down cmp     cl,-128
        je      no_down mov     ah,al
        mov     al,08h
        out     dx,ax           ; enable the LIGHTGRAY pixels mov     al,es:[di]      ; lower restore
        mov     es:[di],al no_down:
        lodsb                   ; side center byte
        cmp     bl,0            ; left edge
        je      left_3_bytes cmp     bl,6
        jne     restore_exit
; since the old dot is at location 6 just restore the right center byte
        sub     di,79           ; one line up, one right cmp     al,0
        je      restore_exit cmp     ch,127
        je      restore_exit mov     ah,al
        mov     al,08h
```

135

```
        out     dx,ax mov     al,es:[di]   ; lower restore
        mov     es:[di],al jmp     short restore_exit ; here the dot is on the leftmost side so restore the left three bytes
left_3_bytes:
        cmp     ch,-128
        je      restore_exit sub     di,81        ; one row up, one byte left
        cmp     al,0
        je      left_up mov     ah,al
        mov     al,08h
        out     dx,ax mov     al,es:[di]   ; lower restore
        mov     es:[di],al left_up:
        sub     di,80
        lodsb cmp     cl,127
        je      no_side_up cmp     al,0
        je      no_side_up mov     ah,al
        mov     al,08h
        out     dx,ax mov     al,es:[di]   ; lower restore
        mov     es:[di],al no_side_up:
        add     di,160
        lodsb cmp     cl,-128
        je      restore_exit cmp     al,0
        je      restore_exit
```

```
                mov     ah,al
                mov     al,08h
                out     dx,ax
               mov     al,es:[di]      ; lower restore
                mov     es:[di],al restore_exit:
                pop     si
                add     si,6            ; next color block
                pop     di
                ret DO_COLOR        ENDP
        ;
        ;$$$$$$$$$$$$$$$$$$$$$$$$$$$$$$$$$$$$$$$$$$$$$$$$$
        ;
        SAVE_NEW        PROC    NEAR
        ; upon entry:
        ;       DI - center byte address
        ;       DL - bit offset inside the byte lea     bx,points
                add     bx,point_ptr
                mov     ax,ds:[bx]
                mov     bx,ax
                mov     ds:[bx],di      ; center address
                mov     ah,x
                mov     al,y
                mov     ds:[bx+2],ax            ; xy
                mov     ds:[bx+4],dl            ; bit offset lea     si,center_0     ; SI - the bit pattern
                xor     dh,dh
                add     si,dx
        ; zero out all the color information
                add     bx,5            ; start of the color information
                mov     cx,18
                xor     al,al
                push    bx
        zero_loop:
                mov     ds:[bx],al
                inc     bx
                loop    zero_loop
                pop     bx push    dx
                mov     dx,3ceh
                mov     ax,1805h
```

```
                out     dx,ax
        ;       mov     al,05
        ;       out     dx,al
        ;       inc     dx
        ;       in      al,dx
        ;       or      al,08h
        ;       mov     ah,al
        ;       mov     al,05h
        ;       dec     dx
        ;       out     dx,ax
        ;       mov     ax,1005h        ; read mode 1... color compare
        ;       out     dx,ax mov     ax,0f07h
                out     dx,ax           ; color don't care register mov     ah,LIGHTGRAY    ; set the color compare register
                mov     al,02
                out     dx,ax
                pop     dx ;       jmp     exit
                call    get_color push    dx
                mov     dx,03ceh
                mov     ah,DARKGRAY     ; set the color compare register
                mov     al,02
                out     dx,ax
                pop     dx call    get_color push    dx
                mov     dx,03ceh
                mov     ah,BLUE         ; set the color compare register
                mov     al,02
                out     dx,ax
                pop     dx call    get_color exit:
                ret SAVE_NEW        ENDP
        ;
        ;%%%%%%%%%%%%%%%%%%%%%%%%%%%%%%%%%%%%%%%%%%%%%%%%
        ;
        GET_COLOR       PROC    NEAR
```

```
                push    bx              ; save the address
                push    di mov     al,es:[di]      ; get the pixels whixh are the desired color
                and     al,ds:[si]      ; only save the bits that will change
                mov     ds:[bx],al sub     di,80
                cmp     y,127
                je      no_upper mov     al,es:[di]
                and     al,ds:[si+1]
                mov     ds:[bx+1],al
        no_upper:
                add     di,160
                cmp     y,-128
                je      chk_bit_cnt
                mov     al,es:[di]
                and     al,ds:[si+1]
                mov     ds:[bx+2],al
        chk_bit_cnt:
                cmp     dl,0
                je      get_left_3 cmp     dl,6
                jne     save_exit cmp     x,127
                je      save_exit
                sub     di,79           ; up one, right one mov     al,es:[di]
                and     al,10000000b
                mov     ds:[bx+3],al
                jmp     short save_exit get_left_3:
                cmp     x,-128
                je      save_exit sub     di,81           ; up one, left one mov     al,es:[di]
                and     al,00000011b
```

```
               mov     ds:[bx+3],al sub     di,80 cmp     y,127
       je      no_left_up mov     al,es:[di]
               and     al,00000001b
               mov     ds:[bx+4],al no_left_up:
               add     di,160
               cmp     y,-128
       je      save_exit mov     al,es:[di]
               and     al,00000001b
               mov     ds:[bx+5],al save_exit:
               pop     di
               pop     bx
               add     bx,6 ret

GET_COLOR       ENDP
       ;
       ;$$$$$$$$$$$$$$$$$$$$$$$$$$$$$$$$$$$$$$$$$$$$$$$$$$$$$
       ;
       ZERO_POINTS PROC  NEAR
       ; upon entry CX = number of points to zero
               push    es
               push    ds
               pop     es cld
               lea     di,point0
               xor     ax,ax
       point_loop:
               push    cx
               mov     cx,23
               rep     stosb
               pop     cx
               loop    point_loop pop     es
               ret
```

140

```
        ZERO_POINTS ENDP

END
        .MODEL SMALL
        .286
        ;%%%%%%%%%%%%%%%%%%%%%%%%%%%%%%%%%%%%%%%%%%%%%
        ;
        ;       Main transmitter
        ;
        ;       This code checks to see if the baud time is done.  If it is
        ;       then it modulates either marks or user data.  It uses a transmit
        ;       buffer which is 8K long.
        ;
        ;%%%%%%%%%%%%%%%%%%%%%%%%%%%%%%%%%%%%%%%%%%%%% include     equates public      init_tx,tx1224,tx_flags
                public      get_tx_data,reverse_table
                public      tx_char_in,tx_char_buf_start
                public      tx_char_buf_end,tx_char_out
                public      tx_in_ptr,tx_out_ptr
                public      setup_sample_cnt,sample_count extrn tx_dma_on:near extrn rx_sample_cnt:word
                extrn rx_in:word,recv_flags:word
                extrn recv_sample_count:word
                extrn tx_sample_segment:word
                extrn rx_sample_segment:word
                extrn tx_dma_ala16:word
                extrn aic_cmd1:word,aic_cmd2:word extrn processed:byte .data
                data_count    db    ?
                data_1200     db    ?
                prev_qlq0     db    ?
                tx_baud_count       dw    ?
                baud_data     dw    ?      ; data to transmit tx_flags      dw    ?
        ;
        ;       tx_flags.0 = 1      tx high band
        ;       tx_flags.1 = 1  tx 2400
        ;       tx_flags.2 = 1      scrambler is on
```

```
;       tx_flags.3 = 1    1200 baud data available
;       tx_flags.4 = 1    send marks
;       tx_flags.5 = 1    send S1 ( 1100 )
;       tx_flags.8 = 1    send AIC cmds
;       tx_flags.9 = 1    AIC cmds went out
;
        tx_bit_count       db     ?

scrambler_1_16     dw     ?
        scrambler_0 db     ?

tx_in_ptr    dw    ?
        tx_out_ptr   dw    ?

sample_count       dw     ?     ; if number of samples is less
                                        ; than this then compute more sample_num   dw    ?     ; number of samples to calculate
                                 ; per baud time an0_ptr            dw    ?     ; an sample pointers
        an1_ptr            dw    ?
        an2_ptr            dw    ?

bn0_ptr            dw    ?     ; bn sample pointers
        bn1_ptr            dw    ?
        bn2_ptr            dw    ?

temp_tx_buf0       dw    16 dup(?)

t_parse_jmp dw     ?
        tx_char_in  dw     ?
        tx_char_out dw     ?

tx_char_buf_start label byte
        tx_char_buf db     2000 dup(?)
        tx_char_buf_end         label byte send_data    db    ?
        .code

INIT_TX    PROC   NEAR

; don't affect which band to transmit in
        and    tx_flags,1h
        or     tx_flags,4h         ; turn on the scrambler
        mov    tx_char_in,offset tx_char_buf
        mov    tx_char_out,offset tx_char_buf xor    ax,ax
```

```
                mov     tx_in_ptr,ax
                mov     tx_out_ptr,ax
                mov     t_parse_jmp,ax
                mov     an0_ptr,ax
                mov     an1_ptr,ax
                mov     an2_ptr,ax
                mov     bn0_ptr,ax
                mov     bn1_ptr,ax
                mov     bn2_ptr,ax
                mov     tx_baud_count,ax call    setup_sample_cnt ret
        INIT_TX     ENDP
        ;
        ;**********************************************************
        ;
        SETUP_SAMPLE_CNT  PROC  NEAR test    tx_flags,b0
                jnz     high_band
                mov     sample_num,8
        ;       mov     sample_count,12
        ;       test    recv_flags,b0
        ;       jnz     counts_done
        ;       mov     sample_count,20         ; use larger count for tones and also
                                                ; safety at 12 and 2400 baud
                mov     sample_count,100  ; 20 ms delay for safety
                ret high_band:
                mov     sample_num,16
        ;       mov     sample_count,24
        ;       test    recv_flags,b0
        ;       jnz     counts_done
        ;       mov     sample_count,40
                mov     sample_count,200
        ;counts_done:
                ret SETUP_SAMPLE_CNT  ENDP
        ;
        ;**********************************************************
        ;
        GET_TX_DATA PROC  NEAR mov     ax,tx_in_ptr
                sub     ax,tx_out_ptr
```

```
                jns     not_neg
                add     ax,buf_len
        not_neg:
                shr     ax,1                    ; word count
                cmp     ax,recv_sample_count
                stc
                jle     no_data                 ; doesn't use the Carry flag... so OK mov     di,rx_in
                mov     si,tx_out_ptr
                mov     cx,recv_sample_count    ; transfer just the samples needed mov     ax,rx_sample_segment
                mov     bx,tx_sample_segment
                push    ds
                push    es
                mov     ds,bx
                mov     es,ax
                rep     movsw
                pop     es
                pop     ds cmp     si,buf_len
                jne     no_tx_wrap
                xor     si,si
        no_tx_wrap:

cmp     di,buf_len
                jne     no_rx_wrap
                xor     di,di
        no_rx_wrap:
                mov     tx_out_ptr,si
                mov     rx_in,di
                clc                             ; flag got data no_data:
                ret 40
        GET_TX_DATA ENDP
        ;
        ;**************************************************
        ;
        TX1224          PROC    NEAR IF board
                mov     dx,wr_clr_byte_ptr      ; init flag to low byte
                out     dx,al
50              jmp     $+2
```

144

```
                mov     dx,dma_5_address
                in      al,dx
                mov     cl,al
                jmp     $+2
                in      al,dx
                mov     ch,al
                jmp     $+2

; check to see if the low byte rolled over
                mov     dx,wr_clr_byte_ptr      ; init flag to low byte
                out     dx,al
                jmp     $+2 mov     dx,dma_5_address
        15      in      al,dx
                cmp     al,cl
                je      no_roll
                mov     cl,al
                jmp     $+2
        20      in      al,dx
                mov     ch,al
                jmp     $+2 no_roll:
        25      mov     ax,tx_in_ptr            ; calculate the tx buffer address
                shr     ax,1                    ; word address
                add     ax,tx_dma_ala16
                sub     ax,cx
                jns     pos_diff
        30      add     ax,( buf_len / 2 )
        pos_diff:
                cmp     ax,sample_count
                jl      do_tx
                ret
        35
                ELSE
                mov     ax,tx_in_ptr
                sub     ax,tx_out_ptr
                jns     pos_diff
                add     ax,buf_len
        pos_diff:
                shr     ax,1                    ; word count
                cmp     ax,sample_count
                jl      do_tx
                ret
                ENDIF do_tx:
                add     ax,sample_num           ; this will prevent further calls to TX
                cmp     ax,sample_count
```

145

```
                jge     no_processed
                or      processed,02h
        no_processed:
                and     tx_flags,NOT b9
                test    tx_flags,(b4 OR b5)
                jnz     send_marks test    tx_flags,b3
                jnz     get_1200_data
        check_tx_data:
        ; parse next data here
                cmp     t_parse_jmp,0           ; any data left to parse
                je      check_tx_char
                mov     ax,t_parse_jmp
                call    ax
                jmp     short scrambler check_tx_char:
                mov     ax,tx_char_in
                mov     si,tx_char_out
                cmp     ax,si
                je      send_marks
        get_tx_char:
                lodsb                           ; get the character to transmit
                cmp     si,offset tx_char_buf_end
                jne     save_tx_ptr
                lea     si,tx_char_buf_start
        save_tx_ptr:
                mov     tx_char_out,si
                shl     ax,1                    ; insert start bit
                mov     bl,al
                and     bx,0fh
                shr     ax,4
                mov     send_data,al
                mov     t_parse_jmp,offset parse_4_2_data
                jmp     short scrambler get_1200_data:
                and     tx_flags,0fff7h
                mov     al,data_1200
                shl     al,2
                and     al,0ch
                or      al,01h
                jmp     short gray_encode send_marks:
                mov     bx,0fh
                test    tx_flags,b5             ; send 1100 ?
                jz      scrambler
```

```
                mov     bx,0c0h scrambler:
        ; data to be scrambled should be in the lower 4 bits of BX
        ; THERE IS NO SCRAMBLER LOCKUP DETECTOR
                and     bx,0fh
                test    tx_flags,b2
                jz      no_scrambler
                mov     ax,scrambler_1_16
                xor     bx,ax
                shr     ax,3
                xor     bx,ax           ; scrambled data is in BX.0 to BX.3

                or      ah,scrambler_0
                shr     ax,1
                and     bx,0fh
                mov     cx,bx           ; save in CX
                shl     bx,13
                or      ax,bx           ; shift scrambled data into the delay
                mov     scrambler_1_16,ax ; line
                mov     bx,cx           ; restore data
                mov     scrambler_0,0
                test    bx,b3
                jz      no_scrambler
                mov     scrambler_0,20h
        no_scrambler:
                mov     al,reverse_table[bx]

        check_1200:
                test    tx_flags,b1
                jnz     gray_encode mov     data_1200,al
                and     al,0ch
                or      al,01h
                or      tx_flags,08h gray_encode:
                test    al,b3
                jnz     diff_encode
                xor     al,4
        diff_encode:
                and     prev_qlq0,0ch
45              add     al,prev_qlq0
                and     ax,0fh           ; clear AH also
                mov     prev_qlq0,al filter_routine:
                shl     ax,1            ; word offset
```

```
              mov     bx,ax
              test    tx_flags,b0
              jz      low_band_filter
              jmp     high_band_filter
       low_band_filter:
              mov     ax,low_band_bn[bx]
              mov     bn0_ptr,ax
              mov     ax,low_band_an[bx]
              mov     an0_ptr,ax mov     si,ax              ; SI - AN0 pointer
              mov     di,an1_ptr         ; DI - AN1 pointer
              mov     bx,an2_ptr         ; BX - AN2 pointer ; take care of the AIC and the receivers baud loop
              mov     cx,0fffch          ; AIC
              mov     ax,n0_low_p1[si]   ; cosine sample 0
              add     ax,n1_low_p1[di]
              add     ax,n2_low_p1[bx]
              mov     temp_tx_buf0,ax         ; cos = +1

              mov     ax,n0_low_p1[si+2]      ; cosine sample 1
              add     ax,n1_low_p1[di+2]
              add     ax,n2_low_p1[bx+2]
              neg     ax                 ; cos = -1
              mov     temp_tx_buf0+2,ax
              mov     ax,n0_low_p1[si+4]      ; cosine sample 2
              add     ax,n1_low_p1[di+4]
              add     ax,n2_low_p1[bx+4]
              neg     ax                 ; cos = -1
              mov     temp_tx_buf0+4,ax mov     ax,n0_low_p1[si+6]      ; cosine sample 3
              add     ax,n1_low_p1[di+6]
              add     ax,n2_low_p1[bx+6]
              mov     temp_tx_buf0+6,ax  ; cos = +1 mov     ax,n0_low_p1[si+8]      ; cosine sample 4
              add     ax,n1_low_p1[di+8]
              add     ax,n2_low_p1[bx+8]
              mov     temp_tx_buf0+8,ax  ; cos = +1 mov     ax,n0_low_p1[si+10]     ; cosine sample 5
              add     ax,n1_low_p1[di+10]
              add     ax,n2_low_p1[bx+10]
              neg     ax                 ; cos = -1
```

```
        mov     temp_tx_buf0+10,ax mov     ax,n0_low_pl[si+12]     ; cosine sample 6
        add     ax,n1_low_pl[di+12]
 5      add     ax,n2_low_pl[bx+12]
        neg     ax                      ; cos = -1
        mov     temp_tx_buf0+12,ax mov     ax,n0_low_pl[si+14]     ; cosine sample 7
10      add     ax,n1_low_pl[di+14]
        add     ax,n2_low_pl[bx+14]
        mov     temp_tx_buf0+14,ax      ; cos = +1 mov     si,bn0_ptr              ; SI = BN0 pointer
        mov     di,bn1_ptr              ; DI = BN1 pointer
        mov     bx,bn2_ptr              ; BX = BN2 pointer mov     ax,n0_low_pl[si]        ; sine sample 0
        add     ax,n1_low_pl[di]
20      add     ax,n2_low_pl[bx]
        sub     temp_tx_buf0,ax         ; sine = -1
        and     temp_tx_buf0,cx mov     ax,n0_low_pl[si+2]      ; sine sample 1
25      add     ax,n1_low_pl[di+2]
        add     ax,n2_low_pl[bx+2]
        sub     temp_tx_buf0+2,ax       ; sine = -1
        and     temp_tx_buf0+2,cx
        mov     ax,n0_low_pl[si+4]      ; sine sample 2
        add     ax,n1_low_pl[di+4]
        add     ax,n2_low_pl[bx+4]
        add     temp_tx_buf0+4,ax       ; sine = +1
        and     temp_tx_buf0+4,cx
        mov     ax,n0_low_pl[si+6]      ; sine sample 3
        add     ax,n1_low_pl[di+6]
        add     ax,n2_low_pl[bx+6]
        add     temp_tx_buf0+6,ax       ; sine = +1
        and     temp_tx_buf0+6,cx mov     ax,n0_low_pl[si+8]      ; sine sample 4
        add     ax,n1_low_pl[di+8]
        add     ax,n2_low_pl[bx+8]
45      sub     temp_tx_buf0+8,ax       ; sine = -1
        and     temp_tx_buf0+8,cx mov     ax,n0_low_pl[si+10]     ; sine sample 5
        add     ax,n1_low_pl[di+10]
50      add     ax,n2_low_pl[bx+10]
```

```
            sub     temp_tx_buf0+10,ax      ; sine = -1
            and     temp_tx_buf0+10,cx mov     ax,n0_low_p1[si+12]     ; sine sample 6
            add     ax,n1_low_p1[di+12]
            add     ax,n2_low_p1[bx+12]
            add     temp_tx_buf0+12,ax      ; sine = +1
            and     temp_tx_buf0+12,cx
            mov     ax,n0_low_p1[si+14]     ; sine sample 7
            add     ax,n1_low_p1[di+14]
            add     ax,n2_low_p1[bx+14]
            add     temp_tx_buf0+14,ax      ; sine = +1
            and     temp_tx_buf0+14,cx
        ;
        ;   All the transmit samples are in the temp buffer.
        ;   Now shift them over to the transmit buffer.
        ;
            lea     si,temp_tx_buf0
            mov     es,tx_sample_segment
            mov     di,tx_in_ptr cmp     di,(buf_len-16)         ; near the end of the buffer?
            jl      no_wrap
            mov     cx,buf_len
            sub     cx,di
            sar     cx,1                    ; number of samples to fill buffer
            mov     bx,8
            sub     bx,cx                   ; number left rep     movsw xor     di,di
            mov     cx,bx rep     movsw jmp     short save_ptr
        ; This routine is for the switch from 7200 to 9600 recv sample rate during
        ; call progress
        send_aic_cmds:
            cmp     di,(buf_len-22)         ; near the end of the buffer?
            jge     move_data or      tx_flags,b9
            and     tx_flags,NOT b8

            lodsw
```

```
                or      ax,3
                stosw
                mov     ax,aic_cmd1
                stosw
                lodsw
                or      ax,3
                stosw
                mov     ax,aic_cmd2
                stosw
                mov     cx,6
                rep     movsw
                jmp     short save_ptr no_wrap:
                test    tx_flags,b8     ; any AIC cmds?
                jnz     send_aic_cmds
        move_data:
                mov     cx,8
                rep     movsw
        save_ptr:
                mov     tx_in_ptr,di ; shift the an,bn delay lines
25              mov     ax,an1_ptr
                mov     an2_ptr,ax
                mov     ax,an0_ptr
                mov     an1_ptr,ax 30              mov     ax,bn1_ptr
                mov     bn2_ptr,ax
                mov     ax,bn0_ptr
                mov     bn1_ptr,ax
                inc     tx_baud_count
                cmp     tx_baud_count,2
                jl      ok_leave_low ; enable DMA channel 1
                call    tx_dma_on ok_leave_low:
                ret
        ;$$$$$$$$$$$$$$$$$$$$$$$$$$$$$$$$$$$$$$$$$$$$$$$$$$$$
        high_band_filter:
                mov     ax,high_band_bn[bx]
                mov     bn0_ptr,ax
                mov     ax,high_band_an[bx]
```

151

```
        mov     an0_ptr,ax mov     si,ax           ; SI - AN0 pointer
        mov     di,an1_ptr      ; DI - AN1 pointer
        mov     bx,an2_ptr      ; BX - AN2 pointer
    ; AIC and baud loop variables
        mov     cx,0fffch
        mov     ax,n0_high_pl[si]   ; cosine sample 0
        add     ax,n1_high_pl[di]
        add     ax,n2_high_pl[bx]
        and     ax,cx
        mov     temp_tx_buf0,ax     ; cos = +1
        mov     ax,n0_high_pl[si+4]  ; cosine sample 2
        add     ax,n1_high_pl[di+4]
        add     ax,n2_high_pl[bx+4]
        neg     ax                   ; cos = -1
        and     ax,cx
        mov     temp_tx_buf0+4,ax   ; skip sample 1 mov     ax,n0_high_pl[si+8]  ; cosine sample 4
        add     ax,n1_high_pl[di+8]
        add     ax,n2_high_pl[bx+8]
        and     ax,cx
        mov     temp_tx_buf0+8,ax  ; cos = +1 mov     ax,n0_high_pl[si+12] ; cosine sample 6
        add     ax,n1_high_pl[di+12]
        add     ax,n2_high_pl[bx+12]
        neg     ax                   ; cos = -1
        and     ax,cx
        mov     temp_tx_buf0+12,ax
        mov     ax,n0_high_pl[si+16] ; cosine sample 8
        add     ax,n1_high_pl[di+16]
        add     ax,n2_high_pl[bx+16]
        and     ax,cx
        mov     temp_tx_buf0+16,ax   ; cos = +1 mov     ax,n0_high_pl[si+20] ; cosine sample 10
        add     ax,n1_high_pl[di+20]
        add     ax,n2_high_pl[bx+20]
        neg     ax                   ; cos = -1
        and     ax,cx
        mov     temp_tx_buf0+20,ax mov     ax,n0_high_pl[si+24] ; cosine sample 12
        add     ax,n1_high_pl[di+24]
```

```
        add     ax,n2_high_pl[bx+24]
        and     ax,cx
        mov     temp_tx_buf0+24,ax      ; cos = +1 mov     ax,n0_high_pl[si+28]    ; cosine sample 14
        add     ax,n1_high_pl[di+28]
        add     ax,n2_high_pl[bx+28]
        neg     ax                      ; cos = -1
        and     ax,cx
        mov     temp_tx_buf0+28,ax mov     si,bn0_ptr              ; SI = BN0 pointer
        mov     di,bn1_ptr              ; DI = BN1 pointer
        mov     bx,bn2_ptr              ; BX = BN2 pointer mov     ax,n0_high_pl[si+2]     ; sine sample 0
        add     ax,n1_high_pl[di+2]
        add     ax,n2_high_pl[bx+2]
        neg     ax
        and     ax,cx
        mov     temp_tx_buf0+2,ax mov     ax,n0_high_pl[si+6]     ; sine sample 1
        add     ax,n1_high_pl[di+6]
        add     ax,n2_high_pl[bx+6]
        and     ax,cx
        mov     temp_tx_buf0+6,ax mov     ax,n0_high_pl[si+10]    ; sine sample 2
        add     ax,n1_high_pl[di+10]
        add     ax,n2_high_pl[bx+10]
        neg     ax
        and     ax,cx
        mov     temp_tx_buf0+10,ax mov     ax,n0_high_pl[si+14]    ; sine sample 3
        add     ax,n1_high_pl[di+14]
        add     ax,n2_high_pl[bx+14]
        and     ax,cx
        mov     temp_tx_buf0+14,ax mov     ax,n0_high_pl[si+18]    ; sine sample 4
        add     ax,n1_high_pl[di+18]
        add     ax,n2_high_pl[bx+18]
        neg     ax
        and     ax,cx
        mov     temp_tx_buf0+18,ax mov     ax,n0_high_pl[si+22]    ; sine sample 5
        add     ax,n1_high_pl[di+22]
```

```
                add     ax,n2_high_p1[bx+22]
                and     ax,cx
                mov     temp_tx_buf0+22,ax
                mov     ax,n0_high_p1[si+26]    ; sine sample 6
                add     ax,n1_high_p1[di+26]
                add     ax,n2_high_p1[bx+26]
                neg     ax
                and     ax,cx
                mov     temp_tx_buf0+26,ax mov     ax,n0_high_p1[si+30]    ; sine sample 7
                add     ax,n1_high_p1[di+30]
                add     ax,n2_high_p1[bx+30]
                and     ax,cx
                mov     temp_tx_buf0+30,ax ;       All the transmit samples are in the temp buffer.
        ;       Now shift them over to the transmit buffer.
        ;
                mov     cx,16
                lea     si,temp_tx_buf0
                mov     es,tx_sample_segment
                mov     di,tx_in_ptr
                rep     movsw cmp     di,buf_len
                jne     save_in_ptr
                xor     di,di
        save_in_ptr:
                mov     tx_in_ptr,di ; shift the an,bn delay lines
                mov     ax,an1_ptr
                mov     an2_ptr,ax
                mov     ax,an0_ptr
                mov     an1_ptr,ax 40              mov     ax,bn1_ptr
                mov     bn2_ptr,ax
                mov     ax,bn0_ptr
                mov     bn1_ptr,ax
                inc     tx_baud_count
                cmp     tx_baud_count,2
                jl      ok_leave_high ; enable DMA channel 1
                call    tx_dma_on
```

```
ok_leave_high:
        ret

.data
        reverse_table   db      00h
                        db      08h
                        db      04h
                        db      0ch
                        db      02h
                        db      0ah
                        db      06h
                        db      0eh
                        db      01h
                        db      09h
                        db      05h
                        db      0dh
                        db      03h
                        db      0bh
                        db      07h
                        db      0fh
;
;****************************************************
;
high_band_an    dw      n0_high_p1 - n0_high_p1
                dw      n0_high_p3 - n0_high_p1
                dw      n0_high_p1 - n0_high_p1
                dw      n0_high_p3 - n0_high_p1
                dw      n0_high_m1 - n0_high_p1
                dw      n0_high_m1 - n0_high_p1
                dw      n0_high_m3 - n0_high_p1
                dw      n0_high_m3 - n0_high_p1
                dw      n0_high_m1 - n0_high_p1
                dw      n0_high_m3 - n0_high_p1
                dw      n0_high_m1 - n0_high_p1
                dw      n0_high_m3 - n0_high_p1
                dw      n0_high_p1 - n0_high_p1
                dw      n0_high_p1 - n0_high_p1
                dw      n0_high_p3 - n0_high_p1
                dw      n0_high_p3 - n0_high_p1 high_band_bn    dw      n0_high_p1 - n0_high_p1
                dw      n0_high_p1 - n0_high_p1
                dw      n0_high_p3 - n0_high_p1
                dw      n0_high_p3 - n0_high_p1
                dw      n0_high_p1 - n0_high_p1
                dw      n0_high_p3 - n0_high_p1
                dw      n0_high_p1 - n0_high_p1
                dw      n0_high_p3 - n0_high_p1
                dw      n0_high_m1 - n0_high_p1
```

```
                dw      n0_high_m1 - n0_high_p1
                dw      n0_high_m3 - n0_high_p1
                dw      n0_high_m3 - n0_high_p1
                dw      n0_high_m1 - n0_high_p1
                dw      n0_high_m3 - n0_high_p1
                dw      n0_high_m1 - n0_high_p1
                dw      n0_high_m3 - n0_high_p1 low_band_an     dw      n0_low_p1 - n0_low_p1
                dw      n0_low_p3 - n0_low_p1
                dw      n0_low_p1 - n0_low_p1
                dw      n0_low_p3 - n0_low_p1
                dw      n0_low_m1 - n0_low_p1
                dw      n0_low_m1 - n0_low_p1
                dw      n0_low_m3 - n0_low_p1
                dw      n0_low_m3 - n0_low_p1
                dw      n0_low_m1 - n0_low_p1
                dw      n0_low_m3 - n0_low_p1
                dw      n0_low_m1 - n0_low_p1
                dw      n0_low_m3 - n0_low_p1
                dw      n0_low_p1 - n0_low_p1
                dw      n0_low_p1 - n0_low_p1
                dw      n0_low_p3 - n0_low_p1
                dw      n0_low_p3 - n0_low_p1 low_band_bn     dw      n0_low_p1 - n0_low_p1
                dw      n0_low_p1 - n0_low_p1
                dw      n0_low_p3 - n0_low_p1
                dw      n0_low_p3 - n0_low_p1
                dw      n0_low_p1 - n0_low_p1
                dw      n0_low_p3 - n0_low_p1
                dw      n0_low_p1 - n0_low_p1
                dw      n0_low_p3 - n0_low_p1
                dw      n0_low_m1 - n0_low_p1
                dw      n0_low_m1 - n0_low_p1
                dw      n0_low_m3 - n0_low_p1
                dw      n0_low_m3 - n0_low_p1
                dw      n0_low_m1 - n0_low_p1
                dw      n0_low_m3 - n0_low_p1
                dw      n0_low_m1 - n0_low_p1
                dw      n0_low_m3 - n0_low_p1

;
;%%%%%%%%%%%%%%%%%%%%%%%%%%%%%%%%%%%%%%%%%%%%%%%%
;
n0_high_p1      dw      -4              ; high band +1 point
                dw      -12
                dw      -28
                dw      -52
                dw      -84
                dw      -120
```

```
            dw   -152
            dw   -180
            dw   -192
            dw   -180
            dw   -140
            dw   -56
            dw   68
            dw   244
            dw   464
            dw   728 n0_high_m1  dw   4              ; high band -1 point
            dw   12
            dw   28
            dw   52
            dw   84
            dw   120
            dw   152
            dw   180
            dw   192
            dw   180
            dw   140
            dw   56
            dw   -68
            dw   -244
            dw   -464
            dw   -728 n0_high_p3  dw   3 * -4          ; high band +3 point
            dw   3 * -12
            dw   3 * -28
            dw   3 * -52
            dw   3 * -84
            dw   3 * -120
            dw   3 * -152
            dw   3 * -180
            dw   3 * -192
            dw   3 * -180
            dw   3 * -140
            dw   3 * -56
            dw   3 * 68
            dw   3 * 244
            dw   3 * 464
            dw   3 * 728 n0_high_m3  dw   3 * 4           ; high band -3 point
            dw   3 * 12
            dw   3 * 28
            dw   3 * 52
            dw   3 * 84
```

```
            dw      3 * 120
            dw      3 * 152
            dw      3 * 180
            dw      3 * 192
            dw      3 * 180
            dw      3 * 140
            dw      3 * 56
            dw      3 * -68
            dw      3 * -244
            dw      3 * -464
            dw      3 * -728
;
;**********************************************
;
nl_high_p1  dw      1028            ; high band anl +1 point
            dw      1344
            dw      1668
            dw      1976
            dw      2248
            dw      2472
            dw      2628
            dw      2712
            dw      2712
            dw      2628
            dw      2472
            dw      2248
            dw      1976
            dw      1668
            dw      1344
            dw      1028 nl_high_m1  dw      -1028           ; high band anl -1 point
            dw      -1344
            dw      -1668
            dw      -1976
            dw      -2248
            dw      -2472
            dw      -2628
            dw      -2712
            dw      -2712
            dw      -2628
            dw      -2472
            dw      -2248
            dw      -1976
            dw      -1668
            dw      -1344
            dw      -1028 nl_high_p3  dw      3 * 1028        ; high band anl +3 point
            dw      3 * 1344
```

158

```
              dw      3 * 1668
              dw      3 * 1976
              dw      3 * 2248
              dw      3 * 2472
              dw      3 * 2628
              dw      3 * 2712
              dw      3 * 2712
              dw      3 * 2628
              dw      3 * 2472
              dw      3 * 2248
              dw      3 * 1976
              dw      3 * 1668
              dw      3 * 1344
              dw      3 * 1028 n1_high_m3    dw      3 * -1028       ; high band an1 -3 point
              dw      3 * -1344
              dw      3 * -1668
              dw      3 * -1976
              dw      3 * -2248
              dw      3 * -2472
              dw      3 * -2628
              dw      3 * -2712
              dw      3 * -2712
              dw      3 * -2628
              dw      3 * -2472
              dw      3 * -2248
              dw      3 * -1976
              dw      3 * -1668
              dw      3 * -1344
              dw      3 * -1028
;
;$$$$$$$$$$$$$$$$$$$$$$$$$$$$$$$$$$$$$$$$$$$$$$$$$$$$$$$$
;
n2_high_p1    dw      728             ; an2,bn2 +1 points
              dw      464
              dw      244
              dw      68
              dw      -56
              dw      -140
              dw      -180
              dw      -192
              dw      -180
              dw      -152
              dw      -120
              dw      -84
              dw      -52
              dw      -28
              dw      -12
              dw      -4
```

```
        n2_high_m1    dw      -728            ; an2,bn2 -1 points
                      dw      -464
                      dw      -244
                      dw      -68
                      dw      56
                      dw      140
                      dw      180
                      dw      192
                      dw      180
                      dw      152
                      dw      120
                      dw      84
                      dw      52
                      dw      28
                      dw      12
                      dw      4 n2_high_p3    dw      3 * 728         ; an2,bn2 +3 points
                      dw      3 * 464
                      dw      3 * 244
                      dw      3 * 68
                      dw      3 * -56
                      dw      3 * -140
                      dw      3 * -180
                      dw      3 * -192
                      dw      3 * -180
                      dw      3 * -152
                      dw      3 * -120
                      dw      3 * -84
                      dw      3 * -52
                      dw      3 * -28
                      dw      3 * -12
                      dw      3 * -4 n2_high_m3    dw      3 * -728        ; an2,bn2 -3 points
                      dw      3 * -464
                      dw      3 * -244
                      dw      3 * -68
                      dw      3 * 56
                      dw      3 * 140
                      dw      3 * 180
                      dw      3 * 192
                      dw      3 * 180
                      dw      3 * 152
                      dw      3 * 120
                      dw      3 * 84
                      dw      3 * 52
                      dw      3 * 28
                      dw      3 * 12
                      dw      3 * 4
```

```
;
;%%%%%%%%%%%%%%%%%%%%%%%%%%%%%%%%%%%%%%%%%%%%
;
n0_low_p1   dw      -8              ; an0,bn0 +1 points
            dw      -40
            dw      -100
            dw      -168
            dw      -188
            dw      -104
            dw      152
            dw      592 n0_low_m1   dw      8               ; an0,bn0 -1 points
            dw      40
            dw      100
            dw      168
            dw      188
            dw      104
            dw      -152
            dw      -592 n0_low_p3   dw      3 * -8          ; an0,bn0 +3 points
            dw      3 * -40
            dw      3 * -100
            dw      3 * -168
            dw      3 * -188
            dw      3 * -104
            dw      3 * 152
            dw      3 * 592 n0_low_m3   dw      3 * 8           ; an0,bn0 -3 points
            dw      3 * 40
            dw      3 * 100
            dw      3 * 168
            dw      3 * 188
            dw      3 * 104
            dw      3 * -152
            dw      3 * -592
;
;%%%%%%%%%%%%%%%%%%%%%%%%%%%%%%%%%%%%%%%%%%%%
;
n1_low_p1   dw      1184            ; an1,bn1 +1 points
            dw      1824
            dw      2368
            dw      2680
            dw      2680
            dw      2368
            dw      1824
            dw      1184
```

```
        n1_low_m1   dw      -1184           ; an1,bn1 -1 points
                    dw      -1824
                    dw      -2368
                    dw      -2680
                    dw      -2680
                    dw      -2368
                    dw      -1824
                    dw      -1184 n1_low_p3   dw      3 * 1184        ; an1,bn1 +3 points
                    dw      3 * 1824
                    dw      3 * 2368
                    dw      3 * 2680
                    dw      3 * 2680
                    dw      3 * 2368
                    dw      3 * 1824
                    dw      3 * 1184 n1_low_m3   dw      3 * -1184       ; an1,bn1 -3 points
                    dw      3 * -1824
                    dw      3 * -2368
                    dw      3 * -2680
                    dw      3 * -2680
                    dw      3 * -2368
                    dw      3 * -1824
                    dw      3 * -1184
        ;
        ;************************************************
        ;
        n2_low_p1   dw      592             ; an2,bn2 +1 points
                    dw      152
                    dw      -104
                    dw      -188
                    dw      -168
                    dw      -100
                    dw      -40
                    dw      -8 n2_low_m1   dw      -592            ; an2,bn2 -1 points
                    dw      -152
                    dw      104
                    dw      188
                    dw      168
                    dw      100
                    dw      40
                    dw      8 n2_low_p3   dw      3 * 592         ; an2,bn2 +3 points
                    dw      3 * 152
                    dw      3 * -104
```

```
                dw      3 * -188
                dw      3 * -168
                dw      3 * -100
                dw      3 * -40
                dw      3 * -8 n2_low_m3   dw      3 * -592    ; an2,bn2 -3 points
                dw      3 * -152
                dw      3 * 104
                dw      3 * 188
                dw      3 * 168
                dw      3 * 100
                dw      3 * 40
                dw      3 * 8

TX1224      ENDP
    ;
    ;%%%%%%%%%%%%%%%%%%%%%%%%%%%%%%%%%%%%%%%%%%%%%%%%
    ;
    .code
    PARSE_DATA  PROC    NEAR parse_4_0_data:
            mov     t_parse_jmp,0
            jmp     short parse_it
    parse_4_2_data:
            mov     t_parse_jmp,offset parse_2_data
            jmp     short parse_it
    parse_4_4_data:
            mov     t_parse_jmp,offset parse_4_0_data
            jmp     short parse_it
    parse_it:
            mov     al,send_data
            mov     bl,al
            shr     al,4
            or      al,0f0h
            mov     send_data,al
            ret parse_2_data:
            mov     al,send_data
            or      al,0eh              ; insert stop bits
            mov     bl,al
            mov     ax,tx_char_in       ; any more chars to go out?
            mov     si,tx_char_out
            sub     ax,si
            jnz     get_next_char
            mov     t_parse_jmp,0
            ret
    get_next_char:
```

```
                lodsb                           ; get the character to transmit
                cmp     si,offset tx_char_buf_end
                jne     ok_done
                lea     si,tx_char_buf_start
        ok_done:
                mov     tx_char_out,si
                and     bl,03h
                shl     ax,3                    ; insert start bit into ax.2
                or      bl,al
                shr     ax,4
                or      al,80h                  ; insert the stop bit
                mov     send_data,al
                mov     t_parse_jmp,offset parse_4_4_data
                ret PARSE_DATA ENDP
        ;
        ;*************************************************************
        ;
        TX_COMMANDS PROC    NEAR send_s1:
                and     tx_flags,1111111111001001b    ; 1200, no_scrambler, no marks
                or      tx_flags,0000000000100000b
                ret send_scr_marks:
                and     tx_flags,1111111111001011b    ; no S1
                or      tx_flags,0000000000010100b    ; scrambler on , send marks
                ret tx_data_on:
                and     tx_flags,1111111111001111b
                ret

TX_COMMANDS ENDP
                END

.model small
        .286
        ;*************************************************************
        ;
        ;       Tone generation
        ;
        ;       This program generates all sine waves.
        ;       The cosine and sine are read from two tables each 256
        ;       words long.
        ;
        ;*************************************************************
```

```
          include   equates public    cosine_table,sine_table
          public    send_tones,freq,dial,freq_sum,tone_int
          public    freq2,freq_sum2,dtmf_int,dtmf extrn set_aic_bands:near,init_dma:near
          extrn setup_sample_cnt:near,init_timer:near
          extrn speaker_on:near,speaker_off:near
          extrn on_hook:near,off_hook:near
          extrn tx_dma_off:near,nul_routine:near
          extrn window_flip:near,tx_dma_on:near extrn tx_flags:word,tx_vector:word
          extrn tx_in_ptr:word,tx_sample_segment:word
          extrn sample_count:word,tx_dma_ala16:word
          extrn timer_10ms:word,recv_flags:word
          extrn display_segment:word,tx_out_ptr:word
       extrn dial_menu:byte
          extrn processed:byte .data
                freq       dw    ?
                freq2      dw    ?
                freq_sum   dw    ?
                freq_sum2  dw    ?
      .code
       ;
      ;%%%%%%%%%%%%%%%%%%%%%%%%%%%%%%%%%%%%%%%%%%%%%%%%%%
      ;
      SEND_TONES  PROC  NEAR
      ; upon entry freq will hold the desired frequency to be sent
            push    ax
            mov     freq_sum,0
            or      tx_flags,1        ; high band
            call    setup_sample_cnt
         mov     tx_in_ptr,0

IF board
            call    set_aic_bands
            call    init_dma
            pop     ax
            call    init_timer
            mov     tx_vector,offset tone_int
         ELSE
            pop     ax
```

```
                ENDIF tone_loop:
                IF board
                    test    recv_flags,b5
                    jnz     end_tone
                ELSE
                    call    tone_int
                ENDIF
                    mov     ah,1
                    int     16h
                    jz      tone_loop mov     ah,0
                    int     16h
                IF board
            end_tone:
                    call    tx_dma_off
                    mov     tx_vector,offset nul_routine
                ENDIF
                    ret SEND_TONES  ENDP
                ;
25          ;%%%%%%%%%%%%%%%%%%%%%%%%%%%%%%%%%%%%%%%%%%%%%%%%%%
                ;
            TONE_INT    PROC    NEAR IF board
                    call    tx_buf_cnt
                    jc      do_tone
                    ret
                ELSE
                    mov     ax,tx_in_ptr
                    sub     ax,tx_out_ptr
                    jns     no_rollover
                    add     ax,buf_len
            no_rollover:
                    shr     ax,1
                    cmp     ax,16
                    jl      do_tone
                    ret
                ENDIF
            do_tone:
                mov     processed,0ffh mov     es,tx_sample_segment
                    mov     di,tx_in_ptr
                    mov     cx,16           ; loop counter
                    mov     dx,0fffch
```

```
sample_loop:
        mov     bx,freq_sum
        add     bx,freq
        mov     freq_sum,bx
        mov     bl,bh
        xor     bh,bh
        sal     bx,1
        mov     ax,cosine_table[bx]
        sar     ax,1
        and     ax,dx
        stosw
        loop    sample_loop cmp     di,buf_len
        jne     save_ptr
        xor     di,di
save_ptr:
        mov     tx_in_ptr,di IF board
; enable DMA channel 1
        call    tx_dma_on
    ENDIF ret TONE_INT    ENDP
;
;%%%%%%%%%%%%%%%%%%%%%%%%%%%%%%%%%%%%%%%%%%%%%%%%
;
DTMF  PROC  NEAR
; BX contains the digit to send
; AX contains the time to send the tone in 10ms counts
; This routine will abort if a key is hit and Carry will be set
        push    ax
        sal     bx,1
        mov     ax,low_table[bx]
        mov     freq,ax
        mov     ax,high_table[bx]
        mov     freq2,ax
        mov     freq_sum,0
        mov     freq_sum2,0 or      tx_flags,1      ; high band
        call    setup_sample_cnt mov     tx_in_ptr,0

IF board
        call    set_aic_bands
```

167

```
                call    init_dma
                pop     ax                      ; get the timer value
                call    init_timer
                mov     tx_vector,offset dtmf_int
        ENDIF wait_loop:
                test    recv_flags,b5
                jnz     timed_out
        IFE board
                call    dtmf_int
        ENDIF
                mov     ah,1
                int     16h
                jz      wait_loop mov     ah,0
                int     16h
                stc
                jmp     short dtmf_done
        timed_out:
                clc dtmf_done:
        IF board
                call    tx_dma_off
                mov     tx_vector,offset nul_routine    ; turn off the tone
        ENDIF
                ret
        .data
        low_table       dw      1941            ; 0
                        dw      1697            ; 1
                        dw      1697            ; 2
                        dw      1697            ; 3
                        dw      1770            ; 4
                        dw      1770            ; 5
                        dw      1770            ; 6
                        dw      1852            ; 7
                        dw      1852            ; 8
                        dw      1852            ; 9
                        dw      1941            ; #
                        dw      1941            ; *
                        dw      1697            ; a
                        dw      1770            ; b
                        dw      1852            ; c
                        dw      1941            ; d high_table      dw      h1336           ; 0
                        dw      h1209           ; 1
                        dw      h1336           ; 2
```

```
                dw      h1477           ; 3
                dw      h1209           ; 4
                dw      h1336           ; 5
                dw      h1477           ; 6
                dw      h1209           ; 7
                dw      h1336           ; 8
                dw      h1477           ; 9
                dw      h1477           ; #
                dw      h1209           ; *
                dw      h1663           ; a
                dw      h1663           ; b
                dw      h1663           ; c
                dw      h1663           ; d

DTMF    ENDP
;
;*************************************************
;
        .code
DTMF_INT        PROC    NEAR IF board
                call    tx_buf_cnt
                jc      do_dtmf
                ret
do_dtmf:
        ENDIF
                mov     processed,0ffh mov     es,tx_sample_segment
                mov     di,tx_in_ptr
                mov     cx,16           ; loop counter dtmf_loop:
                mov     bx,freq_sum
                add     bx,freq
                mov     freq_sum,bx
                mov     bl,bh
                xor     bh,bh
                sal     bx,1
                mov     dx,cosine_table[bx]
                sar     dx,1            ; 1/2
                mov     bx,freq_sum2
                add     bx,freq2
                mov     freq_sum2,bx
                mov     bl,bh
                xor     bh,bh
                sal     bx,1
                mov     ax,cosine_table[bx]
                sar     ax,1            ; 1/2
```

```
                add     ax,dx
                and     ax,0fffch
                stosw
                loop    dtmf_loop
                cmp     di,buf_len
                jne     save_in_ptr
                xor     di,di
        save_in_ptr:
10              mov     tx_in_ptr,di IF board
        ; enable DMA channel 1
                call    tx_dma_on
15          ENDIF ret DTMF_INT    ENDP
20      ;
        ;%%%%%%%%%%%%%%%%%%%%%%%%%%%%%%%%%%%%%%%%%%%%%%%%
        ;
        TX_BUF_CNT  PROC    NEAR 25          IF board
                mov     dx,wr_clr_byte_ptr      ; init flag to low byte
                out     dx,al
                jmp     $+2

30              mov     dx,dma_5_address
                in      al,dx
                mov     cl,al
                jmp     $+2
                in      al,dx
                mov     ch,al
                jmp     $+2

; check for low byte roll over
                mov     dx,wr_clr_byte_ptr      ; init flag to low byte
                out     dx,al
                jmp     $+2 mov     dx,dma_5_address
                in      al,dx
45              cmp     al,cl
                je      no_roll
                mov     cl,al
                jmp     $+2
                in      al,dx
                mov     ch,al
```

```
                jmp     $+2 no_roll:
                mov     ax,tx_in_ptr        ; calculate the tx buffer address
                shr     ax,1                ; word address
                add     ax,tx_dma_ala16
                sub     ax,cx
                jns     pos_diff
                add     ax,( buf_len / 2 )
        pos_diff:
                cmp     ax,sample_count
                jl      do_buf
                clc
                ret
        do_buf:
                stc
                ret
            ENDIF TX_BUF_CNT  ENDP
        ;
        ;%%%%%%%%%%%%%%%%%%%%%%%%%%%%%%%%%%%%%%%%%%%%%
        ;
        .data
        cosine_table    dw      32767,32757,32728,32678,32609,32521
                        dw      32412,32285,32137,31971,31785
                        dw      31580,31356,31113,30852,30571
                        dw      30273,29956,29621,29268,28898
                        dw      28510,28105,27683,27245,26790
                        dw      26319,25832,25329,24811,24279
                        dw      23731,23170,22594,22005,21403
                        dw      20787,20159,19519,18868,18204
                        dw      17530,16846,16151,15446,14732
                        dw      14010,13279,12539,11793,11039
                        dw      10278,9512,8739,7962,7179
                        dw      6393,5602,4808,4011,3212
                        dw      2410,1608,804,0,-803
                        dw      -1607,-2410,-3211,-4010,-4807
                        dw      -5601,-6392,-7179,-7961,-8739
                        dw      -9511,-10278,-11038,-11792,-12539
                        dw      -13278,-14009,-14732,-15446,-16150
                        dw      -16845,-17530,-18204,-18867,-19519
                        dw      -20159,-20787,-21402,-22005,-22594
                        dw      -23169,-23731,-24278,-24811,-25329
                        dw      -25832,-26319,-26790,-27245,-27683
                        dw      -28105,-28510,-28898,-29268,-29621
                        dw      -29956,-30273,-30571,-30852,-31113
                        dw      -31356,-31580,-31785,-31971,-32137
                        dw      -32285,-32412,-32521,-32609,-32678
                        dw      -32728,-32757,-32767,-32757,-32728
```

171

```
            dw    -32678,-32609,-32521,-32412,-32285
            dw    -32137,-31971,-31785,-31580,-31356
            dw    -31113,-30852,-30571,-30273,-29956
            dw    -29621,-29268,-28898,-28510,-28105
            dw    -27683,-27245,-26790,-26319,-25832
            dw    -25329,-24811,-24278,-23731,-23169
            dw    -22594,-22005,-21402,-20787,-20159
            dw    -19519,-18867,-18204,-17530,-16845
            dw    -16150,-15446,-14732,-14009,-13278
            dw    -12539,-11792,-11038,-10278,-9511
            dw    -8739,-7961,-7179,-6392,-5601
            dw    -4807,-4010,-3211,-2410,-1607
            dw    -803,0,804,1608,2410
            dw    3212,4011,4808,5602,6393
            dw    7179,7962,8739,9512,10278
            dw    11039,11793,12539,13279,14010
            dw    14732,15446,16151,16846,17530
            dw    18204,18868,19519,20159,20787
            dw    21403,22005,22594,23170,23731
            dw    24279,24811,25329,25832,26319
            dw    26790,27245,27683,28105,28510
            dw    28898,29268,29621,29956,30273
            dw    30571,30852,31113,31356,31580
            dw    31785,31971,32137,32285,32412
            dw    32521,32609,32678,32728,32757 sine_table  dw    0,804,1608,2410,3212,4011
            dw    4808,5602,6393,7179,7962
            dw    8739,9512,10278,11039,11793
            dw    12539,13279,14010,14732,15446
            dw    16151,16846,17530,18204,18868
            dw    19519,20159,20787,21403,22005
            dw    22594,23170,23731,24279,24811
            dw    25329,25832,26319,26790,27245
            dw    27683,28105,28510,28898,29268
            dw    29621,29956,30273,30571,30852
            dw    31113,31356,31580,31785,31971
            dw    32137,32285,32412,32521,32609
            dw    32678,32728,32757,32767,32757
            dw    32728,32678,32609,32521,32412
            dw    32285,32137,31971,31785,31580
            dw    31356,31113,30852,30571,30273
            dw    29956,29621,29268,28898,28510
            dw    28105,27683,27245,26790,26319
            dw    25832,25329,24811,24279,23731
            dw    23170,22594,22005,21403,20787
            dw    20159,19519,18868,18204,17530
            dw    16846,16151,15446,14732,14010
            dw    13279,12539,11793,11039,10278
            dw    9512,8739,7962,7179,6393
```

```
            dw      5602,4808,4011,3212,2410
            dw      1608,804,0,-803,-1607
            dw      -2410,-3211,-4010,-4807,-5601
            dw      -6392,-7179,-7961,-8739,-9511
            dw      -10278,-11038,-11792,-12539,-13278
            dw      -14009,-14732,-15446,-16150,-16845
            dw      -17530,-18204,-18867,-19519,-20159
            dw      -20787,-21402,-22005,-22594,-23169
            dw      -23731,-24278,-24811,-25329,-25832
            dw      -26319,-26790,-27245,-27683,-28105
            dw      -28510,-28898,-29268,-29621,-29956
            dw      -30273,-30571,-30852,-31113,-31356
            dw      -31580,-31785,-31971,-32137,-32285
            dw      -32412,-32521,-32609,-32678,-32728
            dw      -32757,-32767,-32757,-32728,-32678
            dw      -32609,-32521,-32412,-32285,-32137
            dw      -31971,-31785,-31580,-31356,-31113
            dw      -30852,-30571,-30273,-29956,-29621
            dw      -29268,-28898,-28510,-28105,-27683
            dw      -27245,-26790,-26319,-25832,-25329
            dw      -24811,-24278,-23731,-23169,-22594
            dw      -22005,-21402,-20787,-20159,-19519
            dw      -18867,-18204,-17530,-16845,-16150
            dw      -15446,-14732,-14009,-13278,-12539
            dw      -11792,-11038,-10278,-9511,-8739
            dw      -7961,-7179,-6392,-5601,-4807
            dw      -4010,-3211,-2410,-1607,-803
    ;
    ;$$$$$$$$$$$$$$$$$$$$$$$$$$$$$$$$$$$$$$$$$$$$$$$$$$$
    ;
    .code
    DIAL    PROC    NEAR
    .data
            dial_buffer db      41 dup(?)
            buffer_pointer   dw     ?
    .code
            lea     si,dial_menu
            call    window_flip ; position the cursor
            mov     ah,02h
            xor     bh,bh
            mov     dh,8
            mov     dl,31
            int     10h mov     es,display_segment
            mov     di,((( 8 * 80 ) + 31 ) * 2 )
            xor     bx,bx
```

```
       key_loop:
               mov     ah,0
               int     16h
               mov     cl,al               ; for printing
               cmp     al,cr
               je      dial_string_done cmp     al,bs
               jne     no_backspace cmp     bx,0
               je      key_loop
               mov     al,' '
               sub     di,2
               mov     es:[di],al
               dec     dl
               mov     ah,02h
               int     10h
               dec     bx
               jmp     short key_loop no_backspace:
               cmp     al,'0'
               jb      not_digit
               cmp     al,'9'
               ja      not_digit
               sub     al,'0'
               jmp     short buffer_insert
       not_digit:
               cmp     al,'#'
               jne     chk_star
               mov     al,0ah
               jmp     short buffer_insert chk_star:
               cmp     al,'*'
               jne     chk_letter
               mov     al,0bh
               jmp     short buffer_insert chk_letter:
               cmp     al,'A'
               jb      key_loop
               cmp     al,'D'
               ja      chk_lower
               sub     al,'A'- 0ch
               jmp     short buffer_insert
```

174

```
chk_lower:
        cmp     al,'a'
        jb      key_loop
        cmp     al,'d'
        ja      key_loop
        sub     al,'a' - 0ch buffer_insert:
        cmp     bx,40
        je      key_loop mov     dial_buffer[bx],al
        inc     bx mov     al,cl
        stosb                   ; print the character to the screen
        inc     di ; move the cursor
        mov     ah,02h
        inc     dl
        int     10h ;       cmp     bx,40
;       jne     key_loop ;       dec     bx
;       dec     dl
;       int     10h
;       sub     di,2
        jmp     key_loop dial_string_done:
        mov     dial_buffer[bx],0ffh IF board
        call    off_hook
        call    speaker_on
        mov     ax,2 * 100      ; 2 sec.
        call    init_timer off_hook_wait:
        test    recv_flags,b5
        jz      off_hook_wait mov     buffer_pointer,0
dial_loop:
        mov     bx,buffer_pointer
        mov     bl,dial_buffer[bx]
        inc     buffer_pointer
```

```
                cmp     bl,0ffh
                je      dial_done
                mov     ax,7            ; 70 ms
                call    dtmf
                jc      dial_done mov     ax,7            ; 70 ms
                call    init_timer 10      inter_digit_wait:
                test    recv_flags,b5
                jz      inter_digit_wait jmp     short dial_loop
        dial_done:
          ENDIF
        ; clear out the input line
                mov     es,display_segment
                mov     di,((( 8 * 80 ) + 30 ) * 2 )
                mov     al,' '
                mov     cx,41
        clear_loop:
                stosb
                inc     di
                loop    clear_loop lea     si,dial_menu
                call    window_flip
30
        ; hide the cursor
                mov     ah,02h
                xor     bh,bh
                mov     dh,25
35              mov     dl,0
                int     10h ret

        DIAL    ENDP
                END

.model small
        .286
        ;****************************************************
        ;
        ;       Callp Progress
        ;
        ;       This program does all the call progress finctions.
        ;       It uses a 7200 Hz. receive sample to detect answer tone,
```

```
;        busy, ringing, voice, and dial tone.
;        This file also contains all the filter routines.
;
;$$$$$$$$$$$$$$$$$$$$$$$$$$$$$$$$$$$$$$$$$$$$$$$$$$$$

include    equates public     callp_main,touch_tone_detect
         public     aic_cmd1,aic_cmd2,init_callp,get_callp
         public     get_touch_tone extrn init_aic:near,init_dma:near
         extrn window_flip:near,nul_routine:near
         extrn tone_int:near,get_tx_data:near
         extrn tx1224:near,init_tx:near,setup_sample_cnt:near
         extrn init_tx_dma:near,tx_dma_off:near
         extrn rx_dma_on:near,rx_dma_off:near
         extrn dtmf_int:near extrn rx_sample_segment:word,rx_out:word
         extrn init_aic_tx48_rx72:word,recv_flags:word
         extrn recv_vector:word,rx_dma_ala16:word
         extrn display_segment:word,freq:word,freq_sum:word
         extrn rx_in:word,tx_in_ptr:word,tx_out_ptr:word
         extrn recv_sample_count:word,timer_10ms:word
         extrn sreg:word,tx_flags:word,tx_vector:word
         extrn freq2:word,freq_sum2:word extrn ttone_detect_win:byte
         extrn callp_win:byte
         extrn timer_tic:byte,timer_reload:byte .data
;**************** DC NOTCH COEFF
         notch0_1scalar   dw    7979h
         notch0_1b1       dw    7333h ;**************** CALL PROGRESS COEFF
         callp_1scalar    dw    0db2h
         callp_1a1        dw    -578fh
         callp_1b1        dw    5db0h      ; 1/2
         callp_1b2        dw    -4dd8h callp_2scalar    dw    1333h
         callp_2a1        dw    4240h
         callp_2b1        dw    5b20h      ; 1/2
         callp_2b2        dw    -6e18h comment    !
;**************** VOICE COEFF
```

```
        voice_1scalar     dw    4873h
        voice_1a1    dw   -6470h              ; 1/2
        voice_1b1    dw   63f8h
        voice_1b2    dw   -43bah voice_2scalar     dw    347bh
        voice_2a1    dw   -7464h              ; 1/2
        voice_2b1    dw   4ffch      ; 1/2
        voice_2b2    dw   -72b6h voice_3scalar     dw    49fch
        !

;***************** ANSWER TONE COEFF
        ans_tone_1scalar dw    251h
        ans_tone_1b1 dw   -6208h
        ans_tone_1b2 dw   -7c28h ans_tone_2scalar dw    10a4h
        ans_tone_2b1 dw   -59b0h
        ans_tone_2b2 dw   -7c28h ;***************** TOUCH TONE DETECT COEFF
        hz697_770_1scalar dw   1c29h
        hz697_770_1a1 dw  -6fc3h              ; 1/2
        hz697_770_1b1 dw  67bfh      ; 1/2
        hz697_770_1b2 dw  -7b23h hz697_770_2scalar dw   3852h
        hz697_770_2a1 dw  -5bceh              ; 1/2
        hz697_770_2b1 dw  6184h      ; 1/2
        hz697_770_2b2 dw  -7b23h hz1209_1336_1scalar dw 199ah
        hz1209_1336_1a1 dw -4db3h             ; 1/2
        hz1209_1336_1b1 dw 7df0h
        hz1209_1336_1b2 dw -799ah hz1209_1336_2scalar dw 4148h
        hz1209_1336_2a1 dw -43e0h
        hz1209_1336_2b1 dw 5f36h
        hz1209_1336_2b2 dw -799ah sample       dw   ?
; call progress delay line variables
        notch0_10    dw   ?
        notch0_11    dw   ?
        notch0_21    dw   ?

comment      !
```

```
            voice_11     dw      ?
            voice_12     dw      ?
            voice_21     dw      ?
            voice_22     dw      ?
            voice_31     dw      ?
            voice_32     dw      ?
            voice_41     dw      ?
            voice_42     dw      ?
            voice_51     dw      ?
            !

callp_11     dw      ?
            callp_12     dw      ?
            callp_21     dw      ?
            callp_22     dw      ?
            callp_31     dw      ?
            callp_32     dw      ?
            callp_41     dw      ?
            callp_42     dw      ?

ans_tone_11  dw      ?
            ans_tone_12  dw      ?
            ans_tone_21  dw      ?
            ans_tone_22  dw      ?
            ans_tone_31  dw      ?
            ans_tone_32  dw      ?
            ans_tone_41  dw      ?
            ans_tone_42  dw      ?

no_filter_sum_high      dw      ?
            no_filter_sum_low  dw   ?
        ;   voice_sum_high          dw      ?
        ;   voice_sum_low           dw      ?
            callp_sum_high          dw      ?
            callp_sum_low           dw      ?
            ans_tone_sum_high  dw   ?
            ans_tone_sum_low   dw   ?

old_no_filt_high   dw   ?
            old_no_filt_low         dw      ?
        ;   old_voice_high          dw      ?
        ;   old_voice_low           dw      ?
            old_callp_high          dw      ?
            old_callp_low           dw      ?
            old_atone_high          dw      ?
            old_atone_low           dw      ?

sample_count       dw   ?
            scount_reload      dw   ?
```

```
; Touch Tone detect variables
        hz697_770_11    dw      ?
        hz697_770_12    dw      ?
        hz697_770_21    dw      ?
        hz697_770_22    dw      ?
        hz697_770_31    dw      ?
        hz697_770_32    dw      ?
        hz697_770_41    dw      ?
        hz697_770_42    dw      ?

hz1209_1336_11  dw      ?
        hz1209_1336_12  dw      ?
        hz1209_1336_21  dw      ?
        hz1209_1336_22  dw      ?
        hz1209_1336_31  dw      ?
        hz1209_1336_32  dw      ?
        hz1209_1336_41  dw      ?
        hz1209_1336_42  dw      ?

fil697_sum_high     dw  ?
        fil697_sum_low      dw  ?
        old_fil697_high     dw  ?
        old_fil697_low      dw  ?

fil1209_sum_high  dw    ?
        fil1209_sum_low     dw  ?
        old_fil1209_high  dw    ?
        old_fil1209_low     dw  ?

ascii_converter     db      '0','1','2','3','4','5','6','7','8','9'
                    db      'A','B','C','D','E','F' aic_cmd1    dw      ?
        aic_cmd2    dw      ?

.code
;
;%%%%%%%%%%%%%%%%%%%%%%%%%%%%%%%%%%%%%%%%%%%%%%%%%%%%%%%%%
;
CALLP_FILTERS   PROC    NEAR call    chk_sample_count
        jnc     do_callp
        ret end_atone_routine:
; answer tone mean square
        mov     ax,bx           ; output ^ 2
        imul    bx
        mov     bx,dx           ; DX:AX already divided by 2
```

```
                and     bx,0fh          ; shift right by 4 to get one 32nd
                rol     bx,4
                sar     dx,4
                shr     ax,4
                or      ah,bl
                add     ans_tone_sum_low,ax
                adc     ans_tone_sum_high,dx
                jmp     count_it
        do_callp:
                mov     es,rx_sample_segment
                mov     si,rx_out       ; filter sample pointer
        filter_loop:
                mov     ax,es:[si]      ; input sample
                add     si,2 mov     sample,ax
                test    recv_flags,b8
                jnz     answer_tone_filter
        ; Remove any DC from the sample ---- NOTCH 0
                mov     bx,notch0_11
                neg     bx              ; -1
                imul    notch0_1scalar
                sal     dx,1
                mov     notch0_11,dx
                add     bx,dx
                mov     ax,notch0_21
                imul    notch0_1b1
                sal     dx,1
                add     bx,dx
                mov     notch0_21,bx
                mov     sample,bx 35      ; No filter averaging
                mov     ax,bx           ; output ^ 2
                imul    bx
                sal     ax,1            ; adjust for the multiply
                rcl     dx,1
40              mov     al,ah           ; divide by 256
                mov     ah,dl
                mov     dl,dh
                xor     dh,dh           ; result is positive
                add     no_filter_sum_low,ax
                adc     no_filter_sum_high,dx ; Answer tone filter
        answer_tone_filter:
                mov     bx,ans_tone_12
                mov     ax,ans_tone_11

181
```

```
            mov     ans_tone_12,ax
            sar     ax,2
            neg     ax
            add     ax,ans_tone_11      ; .75 * ans_tone_11
            sub     bx,ax
            mov     ax,sample
            imul    ans_tone_1scalar
            sal     dx,1
            mov     ans_tone_11,dx
            add     bx,dx
            mov     ax,ans_tone_22
            imul    ans_tone_1b2
            sal     dx,1
            add     bx,dx
            mov     ax,ans_tone_21
            mov     ans_tone_22,ax
            imul    ans_tone_1b1
            sal     dx,1
            add     bx,dx
            mov     ans_tone_21,bx      ; output of the first filter stage mov     ax,bx
            imul    ans_tone_2scalar
            sal     dx,1
            mov     bx,ans_tone_32
            mov     ax,ans_tone_31
            mov     ans_tone_32,ax
            sar     ax,2
            add     ax,ans_tone_31
            add     bx,ax
            mov     ans_tone_31,dx
            add     bx,dx
            mov     ax,ans_tone_42
            imul    ans_tone_2b2
            sal     dx,1
            add     bx,dx
            mov     ax,ans_tone_41
            mov     ans_tone_42,ax
            imul    ans_tone_2b1
            sal     dx,1
            add     bx,dx               ; second stage output  BX = output
            mov     ans_tone_41,bx test    recv_flags,b8
            jz      do_mean_square
            jmp     end_atone_routine
    do_mean_square:
    ; answer tone mean square
            mov     ax,bx               ; output ^ 2
            imul    bx
```

```
        sal     ax,1            ; adjust for the multiply
        rcl     dx,1
        mov     al,ah           ; divide by 256
        mov     ah,dl
        mov     dl,dh
        xor     dh,dh           ; result is positive
        add     ans_tone_sum_low,ax
        adc     ans_tone_sum_high,dx
        comment     !
; Voice filter
        mov     bx,voice_12
        mov     ax,voice_11
        mov     voice_12,ax
        imul    voice_1a1
        sal     dx,2            ; * 2
        add     bx,dx
        mov     ax,sample
        imul    voice_1scalar
        sal     dx,1
        mov     voice_11,dx
        add     bx,dx mov     ax,voice_22
        imul    voice_1b2
        sal     dx,1
        add     bx,dx
        mov     ax,voice_21
        mov     voice_22,ax
        imul    voice_1b1
        sal     dx,1
        add     bx,dx           ; 1st stage output
        mov     voice_21,bx
        mov     ax,bx
        imul    voice_2scalar
        sal     dx,1
        mov     bx,voice_32
        mov     ax,voice_31
        mov     voice_32,ax
        mov     voice_31,dx
        add     bx,dx
        imul    voice_2a1
        sal     dx,2            ; * 2
        add     bx,dx mov     ax,voice_42
        imul    voice_2b2
        sal     dx,1
50      add     bx,dx
```

183

```
        mov     ax,voice_41
        mov     voice_42,ax
        imul    voice_2b1
        sal     dx,2            ; * 2
        add     bx,dx           ; 2nd stage output
        mov     voice_41,bx mov     ax,bx
        imul    voice_3scalar
        sal     dx,2            ; * 2
        mov     ax,voice_51
        mov     voice_51,dx
        sub     dx,ax           ; dx = output
      ; voice mean square
        mov     ax,dx           ; output ^ 2
        imul    dx
        sal     ax,1            ; adjust for the multiply
        rcl     dx,1
        mov     al,ah           ; divide by 256
        mov     ah,dl
        mov     dl,dh
        xor     dh,dh           ; result is positive
        add     voice_sum_low,ax
        adc     voice_sum_high,dx
        !

; Call Progress filter
        mov     bx,callp_12
        mov     ax,callp_11
        mov     callp_12,ax
        imul    callp_1a1
        sal     dx,1
        add     bx,dx
        mov     ax,sample
        imul    callp_1scalar
        sal     dx,1
        mov     callp_11,dx
        add     bx,dx
        mov     ax,callp_22
        imul    callp_1b2
        sal     dx,1
        add     bx,dx
        mov     ax,callp_21
        mov     callp_22,ax
        imul    callp_1b1
        sal     dx,2
        add     bx,dx
        mov     callp_21,bx     ; 1st stage output
```

184

```
        mov     ax,bx
        imul    callp_2scalar
        sal     dx,1
        mov     bx,callp_32
        mov     ax,callp_31
        mov     callp_32,ax
        mov     callp_31,dx
        add     bx,dx
        imul    callp_2a1
        sal     dx,1
        add     bx,dx mov     ax,callp_42
        imul    callp_2b2
        sal     dx,1
        add     bx,dx
        mov     ax,callp_41
        mov     callp_42,ax
        imul    callp_2b1
        sal     dx,2
        add     bx,dx
        mov     callp_41,bx     ; BX = output ; call progress mean square
        mov     ax,bx           ; output ^ 2
        imul    bx
        sal     ax,1            ; adjust for the multiply
        rcl     dx,1
        mov     al,ah           ; divide by 256
        mov     ah,dl
        mov     dl,dh
        xor     dh,dh           ; result is positive
        add     callp_sum_low,ax
        adc     callp_sum_high,dx count_it:
        dec     sample_count
        jnz     check_samples
        or      recv_flags,b7 mov     ax,scount_reload
        mov     sample_count,ax xor     dx,dx mov     ax,no_filter_sum_low
        mov     bx,no_filter_sum_high
        mov     old_no_filt_low,ax
        mov     old_no_filt_high,bx
```

185

```
              mov     no_filter_sum_low,dx
              mov     no_filter_sum_high,dx comment   !
              mov     ax,voice_sum_low
              mov     bx,voice_sum_high
              mov     old_voice_low,ax
              mov     old_voice_high,bx
              mov     voice_sum_low,dx
              mov     voice_sum_high,dx
              !

mov     ax,callp_sum_low
              mov     bx,callp_sum_high
              mov     old_callp_low,ax
              mov     old_callp_high,bx
              mov     callp_sum_low,dx
              mov     callp_sum_high,dx
              mov     ax,ans_tone_sum_low
              mov     bx,ans_tone_sum_high
              mov     old_atone_low,ax
              mov     old_atone_high,bx
              mov     ans_tone_sum_low,dx
              mov     ans_tone_sum_high,dx check_samples:
              cmp     si,rx_samples_length
              jne     no_wrap
              xor     si,si
     no_wrap:
              dec     cx
              jcxz    no_samples
              jmp     filter_loop
     no_samples:
              mov     rx_out,si
              ret CALLP_FILTERS      ENDP
     ;
     ;%%%%%%%%%%%%%%%%%%%%%%%%%%%%%%%%%%%%%%%%%%%%%%%%
     ;
     DTMF_FILTERS       PROC   NEAR
              call    chk_sample_count
              jnc     do_ttone
              ret do_ttone:
              mov     es,rx_sample_segment
```

```
                mov     si,rx_out       ; filter sample pointer
        ttone_filter_loop:
                mov     ax,es:[si]      ; input sample
                add     si,2
                mov     sample,ax ; Remove any DC from the sample ---- NOTCH 0
                mov     bx,notch0_11
                neg     bx              ; -1
                imul    notch0_1scalar
                sal     dx,1
                mov     notch0_11,dx
                add     bx,dx
                mov     ax,notch0_21
                imul    notch0_1b1
                sal     dx,1
                add     bx,dx
                mov     notch0_21,bx
                mov     sample,bx ; No filter averaging
                mov     ax,bx           ; output ^ 2
                imul    bx
25              sal     ax,1            ; adjust for the multiply
                rcl     dx,1
                mov     al,ah           ; divide by 256
                mov     ah,dl
                mov     dl,dh
                xor     dh,dh           ; result is positive
                add     no_filter_sum_low,ax
                adc     no_filter_sum_high,dx ; 697 - 770 Hz filter
        filter_697:
                mov     bx,hz697_770_12
                mov     ax,hz697_770_11
                mov     hz697_770_12,ax
                imul    hz697_770_1a1
40              sal     dx,2            ; * 2
                add     bx,dx
                mov     ax,sample
                imul    hz697_770_1scalar
                sal     dx,1
                mov     hz697_770_11,dx
                add     bx,dx
                mov     ax,hz697_770_22
                imul    hz697_770_1b2
                sal     dx,1
50              add     bx,dx
```

187

```
            mov     ax,hz697_770_21
            mov     hz697_770_22,ax
            imul    hz697_770_1b1
            sal     dx,2            ; * 2
            add     bx,dx
            mov     hz697_770_21,bx         ; output of the first filter stage mov     ax,bx
            imul    hz697_770_2scalar
            sal     dx,1
            mov     bx,hz697_770_32
            mov     ax,hz697_770_31         ; shift the delay line
            mov     hz697_770_32,ax
            add     bx,dx
            mov     hz697_770_31,dx         ; store the input * scalar
            imul    hz697_770_2a1
            sal     dx,2            ; * 2
            add     bx,dx
            mov     ax,hz697_770_42
            imul    hz697_770_2b2
            sal     dx,1
            add     bx,dx
            mov     ax,hz697_770_41
            mov     hz697_770_42,ax
            imul    hz697_770_2b1
            sal     dx,2            ; * 2
            add     bx,dx
            mov     hz697_770_41,bx         ; second stage output  BX - output
    ; fil 697 - 770 mean square
            mov     ax,bx           ; output ^ 2
            imul    bx
            sal     ax,1            ; adjust for the multiply
35          rcl     dx,1
            mov     al,ah           ; divide by 256
            mov     ah,dl
            mov     dl,dh
            xor     dh,dh           ; result is positive
            add     fil697_sum_low,ax
            adc     fil697_sum_high,dx ; 1209 - 1336 Hz filter
    filter_1209:
            mov     bx,hz1209_1336_12
            mov     ax,hz1209_1336_11
            mov     hz1209_1336_12,ax
            imul    hz1209_1336_1a1
            sal     dx,2            ; * 2
            add     bx,dx
```

```
        mov     ax,sample
        imul    hz1209_1336_1scalar
        sal     dx,1
        mov     hz1209_1336_11,dx
        add     bx,dx mov     ax,hz1209_1336_22
        imul    hz1209_1336_1b2
        sal     dx,1
        add     bx,dx
        mov     ax,hz1209_1336_21
        mov     hz1209_1336_22,ax
        imul    hz1209_1336_1b1
        sal     dx,1
        add     bx,dx
        mov     hz1209_1336_21,bx       ; output of the first filter stage mov     ax,bx
        imul    hz1209_1336_2scalar
        sal     dx,1
        mov     bx,hz1209_1336_32
        mov     ax,hz1209_1336_31       ; shift the delay line
        mov     hz1209_1336_32,ax
        mov     hz1209_1336_31,dx       ; store the input * scalar
        add     bx,dx
        imul    hz1209_1336_2a1
        sal     dx,1
        add     bx,dx
        mov     ax,hz1209_1336_42
        imul    hz1209_1336_2b2
        sal     dx,1
        add     bx,dx
        mov     ax,hz1209_1336_41
        mov     hz1209_1336_42,ax
        imul    hz1209_1336_2b1
        sal     dx,1
        add     bx,dx                   ; second stage output  BX = output
        mov     hz1209_1336_41,bx
    ; fil 1209 - 1336 mean square
        mov     ax,bx           ; output ^ 2
        imul    bx
        sal     ax,1            ; adjust for the multiply
        rcl     dx,1
        mov     al,ah           ; divide by 256
        mov     ah,dl
        mov     dl,dh
        xor     dh,dh           ; result is positive
        add     fil1209_sum_low,ax
        adc     fil1209_sum_high,dx
```

```
count_sample:
        dec     sample_count
        jnz     check_sample_buf
        or      recv_flags,b7 mov     ax,scount_reload
        mov     sample_count,ax xor     dx,dx mov     ax,no_filter_sum_low
        mov     bx,no_filter_sum_high
        mov     old_no_filt_low,ax
        mov     old_no_filt_high,bx
        mov     no_filter_sum_low,dx
        mov     no_filter_sum_high,dx mov     ax,fil697_sum_low
        mov     bx,fil697_sum_high
        mov     old_fil697_low,ax
        mov     old_fil697_high,bx
        mov     fil697_sum_low,dx
        mov     fil697_sum_high,dx mov     ax,fil1209_sum_low
        mov     bx,fil1209_sum_high
        mov     old_fil1209_low,ax
        mov     old_fil1209_high,bx
        mov     fil1209_sum_low,dx
        mov     fil1209_sum_high,dx check_sample_buf:
        cmp     si,rx_samples_length
        jne     no_end
        xor     si,si
no_end:
        dec     cx
        jcxz    no_more_samples
        jmp     ttone_filter_loop
no_more_samples:
        mov     rx_out,si
        ret DTMF_FILTERS    ENDP
;
;$$$$$$$$$$$$$$$$$$$$$$$$$$$$$$$$$$$$$$$$$$$$$$$$$$$$$$
;
CALLP_INIT  PROC  NEAR IF board
```

190

```
                lea     si,init_aic_tx48_rx72   ; tx 4800 rx 7200
                call    init_aic
                call    init_dma
            ELSE
                xor     ax,ax
                mov     tx_in_ptr,ax
                mov     tx_out_ptr,ax
                mov     rx_in,ax
            ENDIF mov     rx_out,0
                mov     sample_count,256
                mov     scount_reload,256
                ret CALLP_INIT  ENDP
        ;
        ;****************************************************
        ;
        CALLP_MAIN  PROC  NEAR
        .data
                atone_cnt   dw    ?
        .code
                call    callp_init lea     si,callp_win
                call    window_flip IF board
                mov     ax,sreg+9
                mov     atone_cnt,ax mov     ax,sreg+7
                mov     bx,50
                mul     bx
                cli
                mov     timer_10ms,ax
                mov     timer_tic,9
                mov     timer_reload,9
                and     recv_flags,NOT( b5 OR b7 OR b8 )
                mov     recv_vector,offset callp_filters
                sti ; enable DMA channel 2  RECV DMA
                call    rx_dma_on
            ELSE
                mov     recv_sample_count,16
                mov     freq,20252     ; 2225 Hz at a 7200 Hz sample rate
        ;       mov     freq,3231      ; 1210
                mov     freq_sum,0
```

```
            ENDIF callp_loop:
            IFE     board
            mov     cx,20000
    here:
            loop    here
            call    tone_int
            call    get_tx_data
            call    callp_filters
            ELSE
            test    recv_flags,b5
            jnz     callp_exit
            ENDIF
            test    recv_flags,b7
            jz      callp_loop and     recv_flags,NOT b7

IF board
    ; check the thresholds
            cmp     old_atone_high,0
            jne     got_atone
            cmp     old_atone_low,4000h
            jb      no_atone
    got_atone:
    ; is ans_tone > no_filt/4 ?
            mov     ax,old_no_filt_high
            mov     bx,old_no_filt_low
            sar     ax,1
            rcr     bx,1
            sar     ax,1
            rcr     bx,1
            cmp     old_atone_high,ax
            jl      no_atone
            jg      got_it
            cmp     old_atone_low,bx        ; high parts are equal
            jb      no_atone
    got_it:
            dec     atone_cnt
            jz      get_end_atone
            jmp     short display_levels
    no_atone:
            mov     ax,sreg+9
            mov     atone_cnt,ax
    display_levels:
            ENDIF
            call    print_callp mov     ah,1
```

192

```
          int    16h
          jz     callp_loop mov    ah,0
          int    16h callp_exit:
          lea    si,callp_win
          call   window_flip call_exit:
        IF board
      ; disable DMA channel 2 RECV DMA
          call   rx_dma_off
          mov    recv_vector,offset nul_routine
        ENDIF stc
          ret IF board
      get_end_atone:
      ; look for 4.44 ms samples
          cli
          mov    sample_count,32
          mov    scount_reload,32
          mov    ans_tone_sum_low,0
          mov    ans_tone_sum_high,0
          or     recv_flags,b8          ; end of answer tone
          sti mov    atone_cnt,17           ; this is the success flag
          mov    ax,old_atone_low
          mov    bx,old_atone_high
          sar    bx,1
          rcr    ax,1
          sar    bx,1
          rcr    ax,1                   ; BX,AX holds end answer tone threshold push   ax
          push   bx lea    si,callp_win
          call   window_flip call   init_tx_dma
          and    tx_flags,0fffeh        ; tx low
          call   init_tx mov    tx_vector,offset tx1224 ; start the transmitter
```

193

```
                pop     bx
                pop     ax end_atone_loop:
                test    recv_flags,b5
                jnz     callp_exit
                test    recv_flags,b7
                jz      end_atone_loop
               and     recv_flags,NOT b7
                mov     dx,old_atone_high
                mov     cx,old_atone_low
                sub     cx,ax
                sbb     dx,bx
                js      got_end push    ax
                mov     ah,1
                int     16h
                pop     ax
                jz      end_atone_loop mov     ah,0
                int     16h
                mov     tx_vector,offset nul_routine
                call    tx_dma_off jmp     call_exit
        got_end:
        ; disable DMA channel 2 RECV DMA
                call    rx_dma_off
                mov     recv_vector,offset nul_routine
                mov     aic_cmd1,383ch
                mov     aic_cmd2,3c72h
                or      tx_flags,b8

       wait1:
                test    tx_flags,b8
                jnz     wait1 wait2:
                test    tx_flags,b9
                jnz     wait2 clc
                ret
```

```
        ENDIF
    CALLP_MAIN  ENDP
    ;
    ;%%%%%%%%%%%%%%%%%%%%%%%%%%%%%%%%%%%%%%%%%%%%%%%%%%%
    ;
    PRINT_WORD  PROC  NEAR
    ; upon entry DI - screen offset, CL - attribute, and DX - word to print
            mov     bl,dh
            ror     bl,4
            and     bl,0fh
            xor     bh,bh
            mov     al,byte ptr ascii_converter[bx]
            stosw
            mov     bl,dh
            and     bl,0fh
            mov     al,byte ptr ascii_converter[bx]
            stosw
            mov     bl,dl
            ror     bl,4
            and     bl,0fh
            mov     al,byte ptr ascii_converter[bx]
            stosw
            mov     bl,dl
            and     bl,0fh
            mov     al,byte ptr ascii_converter[bx]
            stosw
            ret PRINT_WORD  ENDP
    ;
    ;%%%%%%%%%%%%%%%%%%%%%%%%%%%%%%%%%%%%%%%%%%%%%%%%%%%
    ;
    PRINT_CALLP PROC  NEAR ; print the result in the callp progress window
            mov     di,((( 9 * 80 ) + 47 ) * 2 )    ; screen offset
            xor     bx,bx
            mov     es,display_segment
            mov     ah,31h                          ; attribute
            mov     dx,old_no_filt_high
            call    print_word
            mov     dx,old_no_filt_low
            call    print_word mov     di,((( 10 * 80 ) + 47 ) * 2 )
            mov     dx,old_callp_high
            call    print_word
            mov     dx,old_callp_low
            call    print_word
```

```
        comment   !
        mov    di,((( 9 * 80 ) + 44 ) * 2 )
        mov    dx,old_voice_high
        call   print_word
        mov    dx,old_voice_low
        call   print_word
        !

mov    di,((( 11 * 80 ) + 47 ) * 2 )
        mov    dx,old_atone_high
        call   print_word
        mov    dx,old_atone_low
        call   print_word
        ret
   PRINT_CALLP ENDP
   ;
   ;******************************************
   ;
   TOUCH_TONE_DETECT PROC  NEAR lea    si,ttone_detect_win
        call   window_flip
        call   setup_dtmf_detect ; main loop
   ttone_detect_loop:
      IFE board
        mov    cx,40000
   here2:
        loop   here2
        call   dtmf_int
        call   get_tx_data
        call   dtmf_filters
      ENDIF
        test   recv_flags,b7
        jz     ttone_detect_loop
        and    recv_flags,NOT b7 call   print_dtmf mov    ah,1
        int    16h
        jz     ttone_detect_loop mov    ah,0
        int    16h
50
```

196

```
                lea     si,ttone_detect_win
                call    window_flip IF board
    ; disable DMA channel 2 RECV DMA
                call    rx_dma_off
                mov     recv_vector,offset nul_routine
            ENDIF
                stc
                ret TOUCH_TONE_DETECT ENDP
        ;
        ;%%%%%%%%%%%%%%%%%%%%%%%%%%%%%%%%%%%%%%%%%%%%%%%%%%
        ;
        PRINT_DTMF  PROC    NEAR ; print the result in the callp progress window
                mov     di,((( 10 * 80 ) + 47 ) * 2 )   ; screen offset
                xor     bx,bx
                mov     es,display_segment
                mov     ah,31h                          ; attribute
                mov     dx,old_no_filt_high
                call    print_word
                mov     dx,old_no_filt_low
                call    print_word mov     di,((( 11 * 80 ) + 47 ) * 2 )   ; screen offset
                xor     bx,bx
                mov     es,display_segment
                mov     ah,31h                          ; attribute
                mov     dx,old_fil697_high
                call    print_word
                mov     dx,old_fil697_low
                call    print_word mov     di,((( 12 * 80 ) + 47 ) * 2 )   ; screen offset
                xor     bx,bx
                mov     es,display_segment
                mov     ah,31h                          ; attribute
                mov     dx,old_fil1209_high
                call    print_word
                mov     dx,old_fil1209_low
                call    print_word ret PRINT_DTMF  ENDP
        ;
        ;%%%%%%%%%%%%%%%%%%%%%%%%%%%%%%%%%%%%%%%%%%%%%%%%%%
```

```
        ;
        CHK_SAMPLE_COUNT  PROC   NEAR

IF board
            mov    dx,wr_clr_byte_ptr      ; init flag to low byte
            out    dx,al
            jmp    $+2

; how many words are there in the receive buffer?
10          mov    dx,dma_6_address    ; get RX in
            in     al,dx
            mov    cl,al
            jmp    $+2
            in     al,dx
15          mov    ch,al
            jmp    $+2 mov    dx,wr_clr_byte_ptr      ; init flag to low byte
            out    dx,al
20          jmp    $+2 mov    dx,dma_6_address
            in     al,dx
            cmp    cl,al
25          je     read_ok
            mov    cl,al
            in     al,dx
            mov    ch,al
        read_ok:
            mov    ax,rx_out
            shr    ax,1
            add    ax,rx_dma_ala16
            sub    cx,ax
            jns    pos_diff
            add    cx,(rx_samples_length/2)
        pos_diff:
            jnz    do_funct
            stc
            ret
            ELSE
            mov    cx,rx_in
            sub    cx,rx_out
            jns    no_rollover
            add    cx,rx_samples_length
        no_rollover:
            shr    cx,1           ; word count
            jnz    do_funct
            stc
            ret
```

```
                ENDIF
        do_funct:
                clc
                ret CHK_SAMPLE_COUNT  ENDP
        ;
        ;$$$$$$$$$$$$$$$$$$$$$$$$$$$$$$$$$$$$$$$$$$$$$$$$$$$
        ;
        INIT_CALLP  PROC  NEAR call    callp_init cli
                and     recv_flags,NOT( b5 OR b7 OR b8 )
                mov     recv_vector,offset callp_filters
                sti ; enable DMA channel 2   RECV DMA
                call    rx_dma_on ret
        INIT_CALLP  ENDP
        ;
        ;$$$$$$$$$$$$$$$$$$$$$$$$$$$$$$$$$$$$$$$$$$$$$$$$$$$
        ;
        GET_CALLP   PROC  NEAR answer_loop:
                test    recv_flags,b7
                jz      answer_loop and     recv_flags,NOT b7 call    print_callp xor     al,al
                mov     bx,old_callp_high
                cmp     bx,0h
                je      no_callp
                or      al,1
        no_callp:
                ret GET_CALLP   ENDP
        ;
        ;$$$$$$$$$$$$$$$$$$$$$$$$$$$$$$$$$$$$$$$$$$$$$$$$$$$
        ;
        SETUP_DTMF_DETECT PROC  NEAR
                call    callp_init
```

```
              mov     recv_sample_count,16
           IFE board
              mov     freq,1697_72s
        ;     mov     freq,0
              mov     freq2,h1336_72s
        ;     mov     freq2,0
        ;     mov     freq,tone_2225_72s
        ;     mov     freq2,tone_2225_72s-200
              mov     freq_sum,0
              mov     freq_sum2,0
           ELSE
              cli
              and     recv_flags,NOT( b5 OR b7 OR b8 )
              mov     recv_vector,offset dtmf_filters
              sti ; enable DMA channel 2  RECV DMA
              call    rx_dma_on
           ENDIF
              ret
        SETUP_DTMF_DETECT ENDP
        ;
        ;%%%%%%%%%%%%%%%%%%%%%%%%%%%%%%%%%%%%%%%%%%%%%%
        ;
        GET_TOUCH_TONE    PROC    NEAR call    setup_dtmf_detect ; main loop
        detect_loop:
              mov     ah,1
              int     16h
              jnz     abort_out
              test    recv_flags,b7
              jz      detect_loop and     recv_flags,NOT b7

; check the thresholds
40            cmp     old_fil697_high,100h
              jl      detect_loop got_ttone:
        ; is ans_tone > no_filt/4 ?
              mov     ax,old_no_filt_high
              mov     bx,old_no_filt_low
              sar     ax,1
              rcr     bx,1
              sar     ax,1
50            rcr     bx,1
```

200

```
                cmp     old_fil697_high,ax
                jl      detect_loop
        got_697:
                cmp     old_fil1209_high,ax
                jl      detect_loop end_loop:
                mov     ah,1
                int     16h
                jnz     abort_out
                test    recv_flags,b7
                jz      end_loop and     recv_flags,NOT b7

; check the thresholds
                cmp     old_fil697_high,100h
                jg      end_loop
                jmp     short ok_end abort_out:
                mov     ah,0
                int     16h
        ok_end:
            IF board
        ; disable DMA channel 2 RECV DMA
                call    rx_dma_off
                mov     recv_vector,offset nul_routine
            ENDIF
                stc
                ret

GET_TOUCH_TONE  ENDP
                END

.286
        .model  small
        ;************************************************
        ;
        ;       WIN is the pop-up window manager
        ;
        ;       WIN uses window_init to decompress the windows into RAM.
        ;       Window_flip and window_up actually print the desired window to the
        ;       screen.
        ;
        ;************************************************ include equates public  init_screen
```

```
        public    window_flip
        public    main_menu,start_message,end_message
        public    dial_menu,online_msg,window_up
        public    outgoing_msg,recording_msg,callp_win
        public    ttone_detect_win extrn display_segment:word extrn attribute:byte window      macro corner_x,corner_y,x,y db      corner_x,corner_y,x,y
        dw      x*y dup    (?)

endm

; definitions for the compress window macros

.data
        corner    dw    ?

include    sft_wins.inc

.code
;
;%%%%%%%%%%%%%%%%%%%%%%%%%%%%%%%%%%%%%%%%%%%%%%%%%%%
;
INIT_SCREEN PROC  NEAR mov    al,'#'
        mov    ah,attribute
        call   fill_screen lea    si,top_menu
        call   window_up lea    si,bottom_menu
        call   window_up ret INIT_SCREEN ENDP
;
;%%%%%%%%%%%%%%%%%%%%%%%%%%%%%%%%%%%%%%%%%%%%%%%%%%%
;
FILL_SCREEN PROC  NEAR mov    cx,2000
        mov    es,display_segment
```

202

```
                xor     di,di
                rep     stosw
                ret
       FILL_SCREEN ENDP
        ;
        ;........................
        ;
        WINDOW_FLIP PROC  NEAR
                mov     bx,si ; calculate the offset into the display
                xor     ax,ax
15              mov     al,[bx]                 ;( row + column) * 2
                mov     cl,80
                imul    cl
                mov     cl,[bx+1]
                xor     ch,ch
20              add     ax,cx
                shl     ax,1
                mov     di,ax
                mov     corner,ax
                mov     ax,display_segment
25              mov     es,ax xor     cx,cx
                mov     cl,[bx][2]              ; window rows
                add     si,4                    ; point to the window
        new_row:
                push    cx
                mov     cl,[bx][3]              ; columns
        mov_loop:
35              lodsw
                xchg    ax,es:[di]
                mov     ds:[si][-2],ax
                add     di,2
                loop    mov_loop
40
                mov     ax,corner
                add     ax,160                  ; add a line
                mov     di,ax
                mov     corner,ax
45
                pop     cx
                loop    new_row ret
50
```

203

```
        WINDOW_FLIP ENDP
        ;
        ;------------------------
        ;
        WINDOW_UP    PROC   NEAR mov    bx,si ; calculate the offset into the display
            xor    ax,ax
            mov    al,[bx]                  ;( row + column) * 2
            mov    cl,80
            imul   cl
            mov    cl,[bx+1]
            xor    ch,ch
            add    ax,cx
            shl    ax,1
            mov    di,ax
            mov    corner,ax
            mov    ax,display_segment
            mov    es,ax xor    cx,cx
            mov    cl,[bx][2]               ; window rows
            add    si,4                     ; point to the window new_row2:
            push   cx
            mov    cl,[bx][3]               ; columns
        ;mov_loop:
        ;   lodsw
        ;   xchg   ax,es:[di]
        ;   mov    ds:[si][-2],ax
        ;   add    di,2
        ;   loop   mov_loop
            rep    movsw mov    ax,corner
            add    ax,160                   ; add a line
            mov    di,ax
            mov    corner,ax pop    cx
            loop   new_row2 ret

WINDOW_UP    ENDP
                     END
```

204

```
            .data
            outfile         db      'sft_wins.inc',0 windows         label byte

; window macro format is :
    ;       input_str   --- label of compressed window
    ;       name        --- name that the application uses for the window
    ;       corner_x,y  -- upper left corner
    ;       x,y         --- rows and columns of the window
            top_menu    label byte
                window      top_menu_str,'top_menu',0,0,1,80
                                            ; format is w,x,y,z
                                            ; w,x - row,column of the
                                            ; upper left corner
                                            ; y,z - row,column of window
            bottom_menu label byte
                window      bottom_menu_str,'bottom_menu',24,0,1,80 main_menu   label byte
                window      main_menu_str,'main_menu',7,21,11,38 start_message   label byte
                window      start_message_str,'start_message',3,23,3,35 end_message label byte
                window      end_message_str,'end_message',3,23,3,34 dial_menu   label byte
                window      dial_menu_str,'dial_menu',7,7,3,66 online_msg  label byte
                window      online_msg_str,'online_msg',0,0,1,80 outgoing_msg    label byte
                window      outgoing_msg_str,'outgoing_msg',7,25,3,27 recording_msg   label byte
                window      recording_msg_str,'recording_msg',7,25,3,30 callp_win   label byte
                window      callp_win_str,'callp_win',8,24,5,33 ttone_detect_win label   byte
                window      ttone_detect_str,'ttone_detect_win',9,24,5,33
                dw      0ffffh bottom_menu_str db      attrib,05bh
                                db      ' USRobotics Softmodem (c)1989        Pate'
                                db      'nt Pending           By: Robert C. Suffern '
```

```
                    db      0ffh top_menu_str        db      attrib,05bh
                    db      '| Off Line | 8 bits  |   No Parity    | 1 '
                    db      'Stop Bit | Auto Answer Mode --- Voice |'
                    db      0ffh online_msg_str      db      attrib,05bh
                    db      '| On Line  | 8 bits  |   No Parity    | 1 '
                    db      'Stop Bit | 1200 Baud Originate Mode   |'
                    db      0ffh main_menu_str       db      attrib,01bh
                    db      '┌',copy,36,'┐'
                    db      '║    F1 --- Data Mode',copy,17,' ║'
                    db      '║    F2 --- Record a Message         ║'
                    db      '║    F3 --- Play Back a Message      ║'
                    db      '║    F4 --- Send a Tone',copy,15,' ║'
                    db      '║    F5 --- Dial a Number            ║'
                    db      '║    F6 --- Execute Call Progress    ║'
                    db      '║    F7 --- Execute Touch-Tone Detect║'
                    db      '║    F8 --- Execute Message List     ║'
                    db      '║    F10 -- Exit',copy,22,' ║'
                    db      '└',copy,36,'┘'
                    db      0ffh start_message_str   db      attrib,01bh
                    db      '┌',copy,33,'┐'
                    db      '║   Hit a Key to Begin Recording  ║'
                    db      '└',copy,33,'┘'
                    db      0ffh end_message_str     db      attrib,01bh
                    db      '┌',copy,32,'┐'
                    db      '║   Hit a Key to Stop Recording   ║'
                    db      '└',copy,32,'┘'
                    db      0ffh dial_menu_str       db      attrib,01bh
                    db      '┌',copy,64,'┐'
                    db      '║   Enter Phone Number:',copy,42,' ║'
                    db      '└',copy,64,'┘'
                    db      0ffh outgoing_msg_str    db      attrib,01bh
                    db      '┌',copy,25,'┐'
                    db      '║   Sending Your Message  ║'
                    db      '└',copy,25,'┘'
                    db      0ffh
```

```
        recording_msg_str db     attrib,01bh
                      db     'F',copy,28,'⊣'
                      db     '‖    Recording Your Message     ‖'
                      db     'L',copy,28,'⊣'
                      db     0ffh callp_win_str  db     attrib,01bh
                      db     'F',copy,31,'⊣'
                      db     '‖ No Filter Level:              ‖'
                      db     '‖ Call Progress Level:          ‖'
                      db     '‖ Answer Tone Level:            ‖'
                      db     'L',copy,31,'⊣'
                      db     0ffh ttone_detect_str db   attrib,01bh
                      db     'F',copy,31,'⊣'
                      db     '‖ No Filter:                    ‖'
                      db     '‖ 697-770 Hz Filter:            ‖'
                      db     '‖ 1209-1336 Hz Filter:          ‖'
                      db     'L',copy,31,'⊣'
                      db     0ffh ; Window output file
        .data top_menu      db     00h,00h,01h,50h
                      db     0b3h,5bh,20h,5bh,4fh,5bh,66h,5bh,66h,5bh
                      db     20h,5bh,4ch,5bh,69h,5bh,6eh,5bh,65h,5bh
                      db     20h,5bh,0b3h,5bh,20h,5bh,38h,5bh,20h,5bh
                      db     62h,5bh,69h,5bh,74h,5bh,73h,5bh,20h,5bh
                      db     0b3h,5bh,20h,5bh,20h,5bh,20h,5bh,20h,5bh
                      db     4eh,5bh,6fh,5bh,20h,5bh,50h,5bh,61h,5bh
                      db     72h,5bh,69h,5bh,74h,5bh,79h,5bh,20h,5bh
                      db     20h,5bh,20h,5bh,0b3h,5bh,20h,5bh,31h,5bh
                      db     20h,5bh,53h,5bh,74h,5bh,6fh,5bh,70h,5bh
                      db     20h,5bh,42h,5bh,69h,5bh,74h,5bh,20h,5bh
                      db     0b3h,5bh,20h,5bh,41h,5bh,75h,5bh,74h,5bh
                      db     6fh,5bh,20h,5bh,41h,5bh,6eh,5bh,73h,5bh
                      db     77h,5bh,65h,5bh,72h,5bh,20h,5bh,4dh,5bh
                      db     6fh,5bh,64h,5bh,65h,5bh,20h,5bh,2dh,5bh
                      db     2dh,5bh,2dh,5bh,20h,5bh,56h,5bh,6fh,5bh
                      db     69h,5bh,63h,5bh,65h,5bh,20h,5bh,0b3h,5bh bottom_menu   db     18h,00h,01h,50h
                      db     20h,5bh,55h,5bh,53h,5bh,52h,5bh,6fh,5bh
                      db     62h,5bh,6fh,5bh,74h,5bh,69h,5bh,63h,5bh
                      db     73h,5bh,20h,5bh,53h,5bh,6fh,5bh,66h,5bh
                      db     74h,5bh,6dh,5bh,6fh,5bh,64h,5bh,65h,5bh
                      db     6dh,5bh,20h,5bh,28h,5bh,63h,5bh,29h,5bh
```

```
           db    31h,5bh,39h,5bh,38h,5bh,39h,5bh,20h,5bh
           db    20h,5bh,20h,5bh,20h,5bh,20h,5bh,20h,5bh
           db    20h,5bh,50h,5bh,61h,5bh,74h,5bh,65h,5bh
           db    6eh,5bh,74h,5bh,20h,5bh,50h,5bh,65h,5bh
           db    6eh,5bh,64h,5bh,69h,5bh,6eh,5bh,67h,5bh
           db    20h,5bh,20h,5bh,20h,5bh,20h,5bh,20h,5bh
           db    20h,5bh,20h,5bh,20h,5bh,42h,5bh,79h,5bh
           db    3ah,5bh,20h,5bh,52h,5bh,6fh,5bh,62h,5bh
           db    65h,5bh,72h,5bh,74h,5bh,20h,5bh,43h,5bh
           db    2eh,5bh,20h,5bh,53h,5bh,75h,5bh,66h,5bh
           db    66h,5bh,65h,5bh,72h,5bh,6eh,5bh,20h,5bh
main_menu  db    07h,15h,0bh,26h
           db    0c9h,1bh,0cdh,1bh,0cdh,1bh,0cdh,1bh,0cdh,1bh
           db    0cdh,1bh,0cdh,1bh,0cdh,1bh,0cdh,1bh,0cdh,1bh
           db    0cdh,1bh,0cdh,1bh,0cdh,1bh,0cdh,1bh,0cdh,1bh
           db    0cdh,1bh,0cdh,1bh,0cdh,1bh,0cdh,1bh,0cdh,1bh
           db    0cdh,1bh,0cdh,1bh,0cdh,1bh,0cdh,1bh,0cdh,1bh
           db    0cdh,1bh,0cdh,1bh,0cdh,1bh,0cdh,1bh,0cdh,1bh
           db    0cdh,1bh,0cdh,1bh,0cdh,1bh,0cdh,1bh,0cdh,1bh
           db    0cdh,1bh,0cdh,1bh,0bbh,1bh,0bah,1bh,20h,1bh
           db    20h,1bh,20h,1bh,46h,1bh,31h,1bh,20h,1bh
           db    2dh,1bh,2dh,1bh,2dh,1bh,20h,1bh,44h,1bh
           db    61h,1bh,74h,1bh,61h,1bh,20h,1bh,4dh,1bh
           db    6fh,1bh,64h,1bh,65h,1bh,20h,1bh,20h,1bh
           db    20h,1bh,20h,1bh,20h,1bh,20h,1bh,20h,1bh
           db    20h,1bh,20h,1bh,20h,1bh,20h,1bh,20h,1bh
           db    20h,1bh,20h,1bh,20h,1bh,20h,1bh,20h,1bh
           db    0bah,1bh,0bah,1bh,20h,1bh,20h,1bh,20h,1bh
           db    46h,1bh,32h,1bh,20h,1bh,2dh,1bh,2dh,1bh
           db    2dh,1bh,20h,1bh,52h,1bh,65h,1bh,63h,1bh
           db    6fh,1bh,72h,1bh,64h,1bh,20h,1bh,61h,1bh
           db    20h,1bh,4dh,1bh,65h,1bh,73h,1bh,73h,1bh
           db    61h,1bh,67h,1bh,65h,1bh,20h,1bh,20h,1bh
           db    20h,1bh,20h,1bh,20h,1bh,20h,1bh,20h,1bh
           db    20h,1bh,20h,1bh,20h,1bh,0bah,1bh,0bah,1bh
           db    20h,1bh,20h,1bh,20h,1bh,46h,1bh,33h,1bh
           db    20h,1bh,2dh,1bh,2dh,1bh,2dh,1bh,20h,1bh
           db    50h,1bh,6ch,1bh,61h,1bh,79h,1bh,20h,1bh
           db    42h,1bh,61h,1bh,63h,1bh,6bh,1bh,20h,1bh
           db    61h,1bh,20h,1bh,4dh,1bh,65h,1bh,73h,1bh
           db    73h,1bh,61h,1bh,67h,1bh,65h,1bh,20h,1bh
           db    20h,1bh,20h,1bh,20h,1bh,20h,1bh,20h,1bh
           db    20h,1bh,0bah,1bh,0bah,1bh,20h,1bh,20h,1bh
           db    20h,1bh,46h,1bh,34h,1bh,20h,1bh,2dh,1bh
           db    2dh,1bh,2dh,1bh,20h,1bh,53h,1bh,65h,1bh
           db    6eh,1bh,64h,1bh,20h,1bh,61h,1bh,20h,1bh
           db    54h,1bh,6fh,1bh,6eh,1bh,65h,1bh,20h,1bh
           db    20h,1bh,20h,1bh,20h,1bh,20h,1bh,20h,1bh
           db    20h,1bh,20h,1bh,20h,1bh,20h,1bh,20h,1bh

```
                db      20h,1bh,20h,1bh,20h,1bh,20h,1bh,0bah,1bh
                db      0bah,1bh,20h,1bh,20h,1bh,20h,1bh,46h,1bh
                db      35h,1bh,20h,1bh,2dh,1bh,2dh,1bh,2dh,1bh
                db      20h,1bh,44h,1bh,69h,1bh,61h,1bh,6ch,1bh
                db      20h,1bh,61h,1bh,20h,1bh,4eh,1bh,75h,1bh
                db      6dh,1bh,62h,1bh,65h,1bh,72h,1bh,20h,1bh
                db      20h,1bh,20h,1bh,20h,1bh,20h,1bh,20h,1bh
                db      20h,1bh,20h,1bh,20h,1bh,20h,1bh,20h,1bh
                db      20h,1bh,20h,1bh,0bah,1bh,0bah,1bh,20h,1bh
                db      20h,1bh,20h,1bh,46h,1bh,36h,1bh,20h,1bh
                db      2dh,1bh,2dh,1bh,2dh,1bh,20h,1bh,45h,1bh
                db      78h,1bh,65h,1bh,63h,1bh,75h,1bh,74h,1bh
                db      65h,1bh,20h,1bh,43h,1bh,61h,1bh,6ch,1bh
                db      6ch,1bh,20h,1bh,50h,1bh,72h,1bh,6fh,1bh
                db      67h,1bh,72h,1bh,65h,1bh,73h,1bh,73h,1bh
                db      20h,1bh,20h,1bh,20h,1bh,20h,1bh,20h,1bh
                db      0bah,1bh,0bah,1bh,20h,1bh,20h,1bh,20h,1bh
                db      46h,1bh,37h,1bh,20h,1bh,2dh,1bh,2dh,1bh
                db      2dh,1bh,20h,1bh,45h,1bh,78h,1bh,65h,1bh
                db      63h,1bh,75h,1bh,74h,1bh,65h,1bh,20h,1bh
                db      54h,1bh,6fh,1bh,75h,1bh,63h,1bh,68

```
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0bbh,1bh
              db      0bah,1bh,20h,1bh,20h,1bh,20h,1bh,48h,1bh
              db      69h,1bh,74h,1bh,20h,1bh,61h,1bh,20h,1bh
              db      4bh,1bh,65h,1bh,79h,1bh,20h,1bh,74h,1bh
              db      6fh,1bh,20h,1bh,42h,1bh,65h,1bh,67h,1bh
              db      69h,1bh,6eh,1bh,20h,1bh,52h,1bh,65h,1bh
              db      63h,1bh,6fh,1bh,72h,1bh,64h,1bh,69h,1bh
              db      6eh,1bh,67h,1bh,20h,1bh,20h,1bh,0bah,1bh
              db      0c8h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0bch,1bh end_message   db      03h,17h,03h,22h
              db      0c9h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0bbh,1bh,0bah,1bh
              db      20h,1bh,20h,1bh,20h,1bh,48h,1bh,69h,1bh
              db      74h,1bh,20h,1bh,61h,1bh,20h,1bh,4bh,1bh
              db      65h,1bh,79h,1bh,20h,1bh,74h,1bh,6fh,1bh
              db      20h,1bh,53h,1bh,74h,1bh,6fh,1bh,70h,1bh
              db      20h,1bh,52h,1bh,65h,1bh,63h,1bh,6fh,1bh
              db      72h,1bh,64h,1bh,69h,1bh,6eh,1bh,67h,1bh
              db      20h,1bh,20h,1bh,0bah,1bh,0c8h,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0bch,1bh dial_menu     db      07h,07h,03h,42h
              db      0c9h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
```

```
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
   5         db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0bbh,1bh,0bah,1bh,20h,1bh,20h,1bh,20h,1bh
             db    45h,1bh,6eh,1bh,74h,1bh,65h,1bh,72h,1bh
             db    20h,1bh,50h,1bh,68h,1bh,6fh,1bh,6eh,1bh
             db    65h,1bh,20h,1bh,4eh,1bh,75h,1bh,6dh,1bh
             db    62h,1bh,65h,1bh,72h,1bh,3ah,1bh,20h,1bh
             db    20h,1bh,20h,1bh,20h,1bh,20h,1bh,20h,1bh
  15         db    20h,1bh,20h,1bh,20h,1bh,20h,1bh,20h,1bh
             db    20h,1bh,20h,1bh,20h,1bh,20h,1bh,20h,1bh
             db    20h,1bh,20h,1bh,20h,1bh,20h,1bh,20h,1bh
             db    20h,1bh,20h,1bh,20h,1bh,20h,1bh,20h,1bh
             db    20h,1bh,20h,1bh,20h,1bh,20h,1bh,20h,1bh
  20         db    20h,1bh,20h,1bh,20h,1bh,20h,1bh,20h,1bh
             db    20h,1bh,20h,1bh,20h,1bh,20h,1bh,20h,1bh
             db    20h,1bh,0bah,1bh,0c8h,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
  25         db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
  30         db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0cdh,1bh,0cdh,1bh,0cdh,1bh
             db    0cdh,1bh,0cdh,1bh,0bch,1bh online_msg   db    00h,00h,01h,50h
             db    0b3h,5bh,20h,5bh,4fh,5bh,6eh,5bh,20h,5bh
             db    4ch,5bh,69h,5bh,6eh,5bh,65h,5bh,20h,5bh
             db    20h,5bh,0b3h,5bh,20h,5bh,38h,5bh,20h,5bh
             db    62h,5bh,69h,5bh,74h,5bh,73h,5bh,20h,5bh
             db    0b3h,5bh,20h,5bh,20h,5bh,20h,5bh,20h,5bh
             db    4eh,5bh,6fh,5bh,20h,5bh,50h,5bh,61h,5bh
             db    72h,5bh,69h,5bh,74h,5bh,79h,5bh,20h,5bh
             db    20h,5bh,20h,5bh,0b3h,5bh,20h,5bh,31h,5bh
             db    20h,5bh,53h,5bh,74h,5bh,6fh,5bh,70h,5bh
             db    20h,5bh,42h,5bh,69h,5bh,74h,5bh,20h,5bh
             db    0b3h,5bh,20h,5bh,31h,5bh,32h,5bh,30h,5bh
             db    30h,5bh,20h,5bh,42h,5bh,61h,5bh,75h,5bh
             db    64h,5bh,20h,5bh,4fh,5bh,72h,5bh,69h,5bh
```

211

```
              db      67h,5bh,69h,5bh,6eh,5bh,61h,5bh,74h,5bh
              db      65h,5bh,20h,5bh,4dh,5bh,6fh,5bh,64h,5bh
              db      65h,5bh,20h,5bh,20h,5bh,20h,5bh,0b3h,5bh outgoing_msg  db      07h,19h,03h,1bh
              db      0c9h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0bbh,1bh,0bah,1bh,20h,1bh,20h,1bh
              db      20h,1bh,53h,1bh,65h,1bh,6eh,1bh,64h,1bh
              db      69h,1bh,6eh,1bh,67h,1bh,20h,1bh,59h,1bh
              db      6fh,1bh,75h,1bh,72h,1bh,20h,1bh,4dh,1bh
              db      65h,1bh,73h,1bh,73h,1bh,61h,1bh,67h,1bh
              db      65h,1bh,20h,1bh,20h,1bh,0bah,1bh,0c8h,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0bch,1bh recording_msg db      07h,19h,03h,1eh
              db      0c9h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0bbh,1bh
              db      0bah,1bh,20h,1bh,20h,1bh,20h,1bh,52h,1bh
              db      65h,1bh,63h,1bh,6fh,1bh,72h,1bh,64h,1bh
              db      69h,1bh,6eh,1bh,67h,1bh,20h,1bh,59h,1bh
              db      6fh,1bh,75h,1bh,72h,1bh,20h,1bh,4dh,1bh
              db      65h,1bh,73h,1bh,73h,1bh,61h,1bh,67h,1bh
              db      65h,1bh,20h,1bh,20h,1bh,20h,1bh,0bah,1bh
              db      0c8h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0bch,1bh callp_win     db      08h,18h,05h,21h
              db      0c9h,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
              db      0cdh,1bh,0cdh,1bh,0cdh,1bh,0cdh,1bh,0cdh,1bh
```

```
        db    0cdh,1bh,0cdh,1bh,0bbh,1bh,0bah,1bh,20h,1bh
        db    4eh,1bh,6fh,1bh,20h,1bh,46h,1bh,69h,1bh
        db    6ch,1bh,74h,1bh,65h,1bh,72h,1bh,20h,1bh
        db    4ch,1bh,65h,1bh,76h,1bh,65h,1bh,6ch,1bh
        db    3ah,1bh,20h,1bh,20h,1bh,20h,1bh,20h,1bh
        db    20h,1bh,20h,1bh,20h,1bh,20h,1bh,20h,1bh
        db    20h,1bh,20h,1bh,20h,1bh,20h,1bh,20h,1bh
        db    0bah,1bh,0bah,1bh,20h,1bh,43h,1bh,61h,1bh
        db    6ch,1bh,6ch,1bh,20h,1bh,50h,1bh,72h,1bh
        db    6fh,1bh,67h,1bh,72h,1bh,65h,1bh,73h,1bh
        db    73h,1bh,20h,1bh,4ch,1bh,65h,1bh,76h,1bh
        db    65h,1bh,6ch,1bh,3ah,1bh,20h,1bh,20h,1bh
        db    20h,1bh,20h,1bh,20h,1bh,20h,1bh,20h,1bh
        db    20h,1bh,20h,1bh,20h,1bh,0bah,1bh,0bah,1bh
        db    20h,1bh,41h,1bh,6eh,1bh,73h,1bh,77h,1bh
        db    65h,1bh,72h,1bh,20h,1bh,54h,1bh,6fh,1bh
        db    6eh,1bh,65h,1bh,20h,1bh,4ch,1bh,65h,1bh
        db    76h,1bh,65h,1bh,6ch,1bh,3ah,1bh,20h,1bh
        db    20h,1bh,20h,1bh,20h,1bh,20h,1bh,20h,1bh
        db    20h,1bh,20h,1bh,20h,1bh,20h,1bh,20h,1bh
        db    20h,1bh,0bah,1bh,0c8h,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0bch,1bh ttone_detect_win  db    09h,18h,05h,21h
        db    0c9h,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0cdh,1bh,0cdh,1bh,0cdh,1bh
        db    0cdh,1bh,0cdh,1bh,0bbh,1bh,0bah,1bh,20h,1bh
        db    4eh,1bh,6fh,1bh,20h,1bh,46h,1bh,69h,1bh
        db    6ch,1bh,74h,1bh,65h,1bh,72h,1bh,3ah,1bh
        db    20h,1bh,20h,1bh,20h,1bh,20h,1bh,20h,1bh
        db    20h,1bh,20h,1bh,20h,1bh,20h,1bh,20h,1bh
        db    20h,1bh,20h,1bh,20h,1bh,20h,1bh,20h,1bh
        db    20h,1bh,20h,1bh,20h,1bh,20h,1bh,20h,1bh
        db    0bah,1bh,0bah,1bh,20h,1bh,36h,1bh,39h,1bh
        db    37h,1bh,2dh,1bh,37h,1bh,37h,1bh,30h,1bh
        db    20h,1bh,48h,1bh,7ah,1bh,20h,1bh,46h,1bh
        db    69h,1bh,6ch,1bh,74h,1bh,65h,1bh,72h,1bh
        db    3ah,1bh,20h,1bh,20h,1bh,20h,1bh,20h,1bh
        db    20h,1bh,20h,1bh,20h,1bh,20h,1bh,20h,1bh
        db    20h,1bh,20h,1bh,20h,1bh,0bah,1bh,0bah,1bh
        db    20h,1bh,31h,1bh,32h,1bh,30h,1bh,39h,1bh
```

```
            db      2dh,1bh,31h,1bh,33h,1bh,33h,1bh,36h,1bh
            db      20h,1bh,48h,1bh,7ah,1bh,20h,1bh,46h,1bh
            db      69h,1bh,6ch,1bh,74h,1bh,65h,1bh,72h,1bh
            db      3ah,1bh,20h,1bh,20h,1bh,20h,1bh,20h,1bh
            db      20h,1bh,20h,1bh,20h,1bh,20h,1bh,20h,1bh
            db      20h,1bh,0bah,1bh,0c8h,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0cdh,1bh
            db      0cdh,1bh,0cdh,1bh,0cdh,1bh,0cdh,1bh,0bch,1bh .286
    .model small
;**********************************************************
;
;       Screen driver routines
;
;       This routine writes the receive data to the screen during terminal
;       mode.
;
;********************************************************** include     equates public      init_comm_screen,save_screen,restore_screen
            public      screen_out,print_parity extrn       window_up:near extrn       display_segment:word,main_flags:word extrn       online_msg:byte .data
            screen_buffer   dw      2000 dup(?)
            cursor          dw      ?
            buffer_pos  dw  ?
            out_char    db  ?

parity_msg  db      '8   No'
                        db      '      '
                        db      '      '
                        db      '      '
                        db      '7 Even'
                        db      '7  Odd'
                        db      '7Space'
                        db      '7 Mark'
    .code
```

```
;
;%%%%%%%%%%%%%%%%%%%%%%%%%%%%%%%%%%%%%%%%%%%%%
;
        INIT_COMM_SCREEN  PROC   NEAR lea    si,online_msg
        call   window_up
        call   print_parity mov    cursor,100h
        mov    buffer_pos,160
; position the cursor
        mov    dx,cursor
        mov    ah,02
        xor    bh,bh
        int    10h mov    es,display_segment
        mov    di,160
        mov    cx,(23*80)
        mov    ax,0720h         ; attribute and ' '
        cmp    display_segment,mono
        je     no_color
        mov    ax,1f20h         ; attribute and ' '
no_color:
        rep    stosw call   save_screen ret INIT_COMM_SCREEN  ENDP
;
;%%%%%%%%%%%%%%%%%%%%%%%%%%%%%%%%%%%%%%%%%%%%%
;
        SAVE_SCREEN PROC  NEAR
.data
        cursor_pos   dw    ?
.code
        mov    cx,2000
        lea    di,screen_buffer
        xor    si,si
        mov    ax,display_segment
        push   ds
        pop    es
        push   ds
        mov    ds,ax
        rep    movsw
        pop    ds
```

215

```
                mov     ah,03
                xor     bh,bh
                int     10h
                mov     cursor_pos,dx
        ret SAVE_SCREEN ENDP
        ;
        ;%%%%%%%%%%%%%%%%%%%%%%%%%%%%%%%%%%%%%%%%%%%%%%%
        ;
        RESTORE_SCREEN    PROC    NEAR mov     cx,2000
                lea     si,screen_buffer
                mov     es,display_segment
                xor     di,di
                rep     movsw mov     ah,02h
                xor     bh,bh
                mov     dx,cursor_pos
                int     10h ret RESTORE_SCREEN    ENDP
        ;
        ;%%%%%%%%%%%%%%%%%%%%%%%%%%%%%%%%%%%%%%%%%%%%%%%
        ;
        SCREEN_OUT   PROC    NEAR
        ; AL has the character to print to the screen   0 to 7fh
                cmp     al,' '
                jae     out_it
                cmp     al,cr
                jne     chk_lf ; carriage return
                mov     dx,cursor
                xor     dl,dl
                mov     al,dh
                mov     cl,160
                mul     cl
                mov     buffer_pos,ax
                jmp     no_wrap chk_lf:
                cmp     al,lf
                jne     chk_bs
```

216

```
                mov     dx,cursor
                cmp     dh,23
                je      scroll_it
                inc     dh
                add     buffer_pos,160
                jmp     no_wrap chk_bs:
                cmp     al,bs
                je      do_bs
                ret
        do_bs:
                cmp     buffer_pos,160
                jne     no_top
                ret
        no_top:
                sub     buffer_pos,2
                mov     di,buffer_pos
                mov     al,' '
                push    es
                mov     es,display_segment
                mov     es:[di],al
                pop     es
                mov     dx,cursor
                dec     dl
                jns     no_wrap
                mov     dl,79
                dec     dh
                jmp     short no_wrap
        out_it:
                push    es
                mov     es,display_segment
                mov     di,buffer_pos
                stosb
                inc     di
                mov     buffer_pos,di
                pop     es
                mov     dx,cursor
                inc     dl
                cmp     dl,80
                jne     no_wrap
                inc     dh
                cmp     dh,24
                jne     no_scroll mov     buffer_pos,( 23 * 160 )
                mov     dx,1700h
        scroll_it:
```

217

```
                mov     di,160
                mov     si,320
                mov     cx,22*80
                mov     ax,display_segment
                push    es
                push    ds
                mov     ds,ax
                mov     es,ax
                rep     movsw
                pop     ds mov     cx,80
                mov     al,' '
                clear_line:
                stosb
                inc     di
                loop    clear_line
                pop     es
                jmp     short no_wrap
        no_scroll:
                xor     dl,dl
        ; get new buffer position
                mov     al,dh
                mov     cl,160
                mul     cl
                mov     buffer_pos,ax
        no_wrap:
                mov     cursor,dx
                xor     bh,bh
                mov     ah,02
                int     10h ret SCREEN_OUT      ENDP
        40      ;
                ;%%%%%%%%%%%%%%%%%%%%%%%%%%%%%%%%%%%%%%%%%%%%%%%
                ;
                PRINT_PARITY    PROC    NEAR
        mov     ax,main_flags
                mov     al,ah
                and     ax,07h
                mov     bl,6
                imul    bl
                mov     bx,ax
```

```
                mov     es,display_segment      ; print word length
                mov     di,26
                mov     al,parity_msg[bx]
                inc     bx
                stosb mov     cx,5
                mov     di,44
        out_loop:
                mov     al,parity_msg[bx]
                stosb
                inc     di
                inc     bx
                loop    out_loop
                mov     di,70
                mov     ax,5b20h
                mov     [es:di],ax
                ret

PRINT_PARITY    ENDP
                END

; general equates

; conditional assembly
                board equ       0
                modem_board             equ     35ch buf_len         equ     8192 * 2        ; TX and RX buffers
                rx_samples_length equ   8192 * 2        ; byte size
                mono    equ     0b000h
                color_seg equ           0b800h b0      equ     1
                b1      equ     2
                b2      equ     4
                b3      equ     8
                b4      equ     10h
                b5      equ     20h
                b6      equ     40h
                b7      equ     80h
                b8      equ     100h
                b9      equ     200h
                b10     equ     400h
                b11     equ     800h
```

```
        b12       equ    1000h
        b13       equ    2000h
        b14       equ    4000h
        b15       equ    8000h cr        equ    13
        lf        equ    10
        bs        equ    8

F1        equ    3b00h
        F2        equ    3c00h
        F3        equ    3d00h
        F4        equ    3e00h
        F5        equ    3f00h
        F6        equ    4000h
        F7        equ    4100h
        F8        equ    4200h
        F9        equ    4300h
        F10       equ    4400h ALT_A  equ    1e00h
        ALT_H  equ    2300h
        ALT_P  equ    1900h
        ALT_S  equ    1f00h UP_ARROW    equ    4800h
        DOWN_ARROW  equ    5000h ; DMA channels 5 and 6 equates
        dma_5_page    equ    8bh
        dma_6_page    equ    89h dma_5_address    equ    0c4h
        dma_5_count equ    0c6h dma_6_address    equ    0c8h
        dma_6_count equ    0cah rd_status     equ    0d0h
        rd_temp              equ    0dah wr_cmd               equ    0d0h
        wr_req               equ    0d2h
        wr_single_mask       equ    0d4h
        wr_mode              equ    0d6h
        wr_clr_byte_ptr      equ    0d8h
        wr_master_clr        equ    0dah
        wr_clr_mask   equ    0dch
        wr_all_mask   equ    0deh
```

```
        tone_2225      equ    15189         ; 2 * freq / 9600
        tone_2225_72s  equ    20252

        tone_1500      equ    10240

1941    equ    6424
        1852    equ    5816
        1770    equ    5257
        1697    equ    4758 h1663   equ    11148
        h1477   equ    10083
        h1336   equ    9120
        h1209   equ    8253

1941_72s       equ    8565
        1852_72s       equ    7755
        1770_72s       equ    7009
        1697_72s       equ    6344 h1663_72s      equ    14864
        h1477_72s      equ    13444
        h1336_72s      equ    12160
        h1209_72s      equ    11004
```

END OF ASSEMBLY LANGUAGE LISTING

What is claimed is:

1. In combination with a computer of the class comprising, in combination, a microprocessor, a memory and conductors interconnecting said microprocessor and said memory, an auxiliary circuit for communicating in real time between said computer and a remote device via a voice-band telephone circuit, said remote device operating at a remote baud rate, said auxiliary circuit comprising, in combination:

a hybrid circuit having a bidirectional telephone line port for delivering an incoming voice-band analog signal and receiving an outgoing voice-band analog signal;

a telephone line adapter circuit interconnected to said voice-band telephone circuit and to said hybrid circuit, for (i) selectively connecting and disconnecting said voice-band telephone circuit, (ii) detecting when an active connection has been established with said remote device and (iii) detecting when a ringing signal has been received over said voice-band telephone circuit;

an incoming sample data register for storing incoming sample data;

an analog-to-digital converter for converting sample amplitudes of said incoming voice-band analog signal into incoming digital sample values, said analog-to-digital converter converting said sample amplitudes into a first stream of incoming digital sample values at a sampling rate synchronized to a local clock signal;

an interpolation routine executed by said microprocessor for interpolating said first stream of incoming digital sample values and thereby producing a second stream of incoming digital sample values substantially synchronized to said remote baud rate;

a modem demodulation routine executed by said microprocessor for translating said second stream of incoming digital sample values into digital data;

an outgoing sample data register for storing outgoing sample data;

a modem modulation routine stored in said memory and executed by said microprocessor for translating digital data into digital sample amplitude values; and a digital-to-analog converter for converting said digital sample amplitude values into said outgoing voice-band analog signal, whereby (i) said analog-to-digital converter samples said incoming voice-band analog signal and produces a stream of incoming digital sample values, and said microprocessor interpolates said first stream of incoming digital sample values to produce a second stream of incoming digital sample values and demodulates said second stream of incoming digital sample values to produce digital data, and (ii) said microprocessor modulates digital data to produce digital sample amplitude values, and said digital-to-analog converter converts said digital sample amplitude values into said outgoing voice-band analog signal.

2. An auxiliary circuit as claimed in claim 1, wherein said interpolation routine and said modem demodulation routine are stored in said memory.

3. An auxiliary circuit as claimed in claim 2, wherein said incoming voice-band analog signal comprises graphical data transmitted from said remote device.

4. An auxiliary circuit as claimed in claim 1, further comprising a call-answering routine executed by said microprocessor when said incoming voice-band analog signal comprises an analog voice signal from a remote caller, for (i) transmitting a voice acknowledgement over said voice-band telephone circuit by transferring a set of outgoing digital sample values from a storage medium to said digital-to-analog converter to transmit a voice signal over said voice-band telephone circuit, and (ii) recording an incoming voice message received over said voice-band telephone circuit by storing a set of digital values representative of said analog voice signal on a storage medium.

5. An auxiliary circuit as claimed in claim 4, wherein said call-answering routine is stored in said memory.

6. An auxiliary circuit as claimed in claim 1, further comprising a tone-dialing routine executed by said microprocessor for applying a sequence of outgoing digital sample values to said conductors, said sequence of outgoing digital sample values representing a sequence of dual dial-tone signals suitable for establishing a dial-up connection with said remote device.

7. An auxiliary circuit as claimed in claim 6, wherein said tone-dialing routine is stored in said memory.

8. An auxiliary circuit as claimed in claim 1, further comprising an answer-tone detection routine executed by said microprocessor for processing said incoming digital sample values to detect the presence of an answer tone received over said voice-band telephone circuit.

9. An auxiliary circuit as claimed in claim 8, wherein said answer-tone detection routine is stored in said memory.

10. An auxiliary circuit as claimed in claim 2, further comprising, in combination:

a call-answering routine executed by said microprocessor when said incoming voice-band analog signal comprises an analog voice signal from a remote caller, for (i) transmitting a voice acknowledgement over said voice-band telephone circuit by transferring a set of outgoing digital sample values from a storage medium to said digital-to-analog converter to transmit a voice signal over said voice-band telephone circuit, and (ii) recording an incoming voice message received over said voice-band telephone circuit by storing a set of digital values representative of said analog voice signal on a storage medium;

a tone-dialing routine executed by said microprocessor for applying a sequence of outgoing digital sample values to said conductors, said sequence of outgoing digital sample values representing a sequence of dual dial-tone signals suitable for establishing a dial-up connection with said remote device; and an answer-tone detection routine executed by said microprocessor for processing said incoming digital sample values to detect the presence of an answer tone received over said voice-band telephone circuit.

11. An auxiliary circuit as claimed in claim 10 wherein said call-answering routine, said tone-dialing routine and said answer-tone detection routine are stored in said memory.

12. A method for communicating between a computer system and a remote device via a voice-band telephone circuit, said remote device operating at a remote baud rate, said computer system comprising, in combination:

(i) a microprocessor, (ii) a memory, (iii) conductors interconnecting said microprocessor and said memory, (iv) a hybrid circuit having a bidirectional telephone line port for delivering an incoming voice-band analog signal and receiving an outgoing voice-band analog signal, (v) a telephone line adapter circuit interconnected to said voice-band telephone circuit and to said hybrid circuit, for (i) selectively connecting and disconnecting said voice-band telephone circuit, (ii) detecting when an active connection has been established with said remote device and (iii) detecting when a ringing signal has been received over said voice-band telephone circuit, (vi) an incoming sample data register for storing incoming sample data, (vii) an analog-to-digital converter for converting sample amplitudes of said incoming voice-band analog signal into incoming digital sample values, (viii) an outgoing sample data register for storing outgoing sample data, and (ix) a digital-to-analog converter for converting digital sample amplitude values into said outgoing voice-band analog signal, said method comprising, in combination, the following steps:

operating said analog-to-digital converter at a sampling rate synchronized to a local clock signal to convert sample amplitudes of said incoming voice-band analog signal into a first stream of incoming digital sample values;

operating said microprocessor to execute an interpolation routine stored in said memory, so as to interpolate said first stream of incoming digital sample values to thereby produce a second stream of incoming digital sample values substantially synchronized to said remote baud rate;

operating said microprocessor to execute a modem demodulation routine stored in said memory, so as to translate said second stream of incoming digital sample values into digital data;

operating said microprocessor to execute a modem modulation routine stored in said memory, so as to translate digital data into digital sample amplitude values; and operating said digital-to-analog converter to convert said digital sample amplitude values into said outgoing voice-band analog signal.

13. A method as claimed in claim 12, further comprising, in combination, the following steps:

detecting a ringing signal received over said voice-band telephone circuit from a remote caller when information being received over said voice-band telephone circuit comprises an analog voice signal; and operating said microprocessor to (i) transmit a voice acknowledgement to said remote caller by transferring a set of outgoing digital sample values from a storage medium to said digital-to-analog converter to transmit a voice signal over said voice-band telephone circuit, and to (ii) record an incoming voice message from said remote caller by storing a set of digital values representative of said analog voice signal on a storage medium.

14. A method as claimed in claim 13, further comprising, in combination, the following steps:

operating said microprocessor to execute a tone-dialing routine stored in said memory, so as to apply a sequence of outgoing digital sample values to said conductors, said sequence of outgoing digital sample values representing a sequence of dual dial tone signals suitable for establishing a dial-up connection to said remote device; and operating said microprocessor to execute an answer-tone detection routine stored in said memory, so as to process said incoming digital sample values to detect the presence of an answer tone received over said voice-band telephone circuit.

* * * * *